United States Patent
Geiger et al.

(10) Patent No.: US 10,169,897 B1
(45) Date of Patent: Jan. 1, 2019

(54) SYSTEMS AND METHODS FOR CHARACTER COMPOSITION

(71) Applicant: GENIES, INC., San Francisco, CA (US)

(72) Inventors: Matthew J. Geiger, South San Francisco, CA (US); Akash R. Nigam, San Francisco, CA (US); Evan K. Rosenbaum, San Francisco, CA (US)

(73) Assignee: Genies, Inc., San Francisco, CA (US)

( * ) Notice: Subject to any disclaimer, the term of this patent is extended or adjusted under 35 U.S.C. 154(b) by 0 days.

(21) Appl. No.: 15/864,318

(22) Filed: Jan. 8, 2018

Related U.S. Application Data

(60) Provisional application No. 62/573,593, filed on Oct. 17, 2017.

(51) Int. Cl.
*G06T 15/00* (2011.01)
*G06T 11/60* (2006.01)
(Continued)

(52) U.S. Cl.
CPC ............ *G06T 11/60* (2013.01); *G06F 3/0482* (2013.01); *G06F 3/04845* (2013.01);
(Continued)

(58) Field of Classification Search
CPC ............ G06N 3/006; A63F 2300/5553; A63F 2300/6018; A63F 13/79; G06T 11/00
(Continued)

(56) References Cited

U.S. PATENT DOCUMENTS 6,937,950 B2  8/2005  Cragun et al.
7,409,639 B2  8/2008  Dempski et al.
(Continued)

FOREIGN PATENT DOCUMENTS

EP        2391075 A2    11/2011
JP     2015-505249 A     2/2015
(Continued)

OTHER PUBLICATIONS

LaserBolt, Ark Survival Evolved Character Creation and Customization Xbox One Edition Gameplay, Dec. 2015, https://www.youtube.com/watch?v=n4acpdrBRk4.*
(Continued)

*Primary Examiner* — Phu K Nguyen
(74) *Attorney, Agent, or Firm* — Morgan, Lewis & Bockius LLP

(57) ABSTRACT

Systems and methods are disclosed for concurrently displaying an avatar, associated with a user, and a closed form composer graphic on a display. Each different position on the composer graphic provides a different value for a trait associated with the composer graphic. There is displayed on the avatar the trait set at a value associated with a respective position of the composer graphic selected by the user without user intervention responsive to the user selection of the respective position of the composer graphic. The value of the trait that is associated with the position of the composer graphic that was selected by the user is associated with the avatar. This associating displays on the avatar the trait set at the selected value of the trait.

30 Claims, 81 Drawing Sheets

(51) Int. Cl.
*G06F 3/0482* (2013.01)
*G06F 3/0488* (2013.01)
*G06F 3/0484* (2013.01)
*G06T 13/40* (2011.01)

(52) U.S. Cl.
CPC ...... *G06F 3/04847* (2013.01); *G06F 3/04883* (2013.01); *G06T 13/40* (2013.01)

(58) Field of Classification Search
USPC .......................................................... 345/619
See application file for complete search history.

(56) References Cited

U.S. PATENT DOCUMENTS

| | | | |
|---|---|---|---|
| 7,484,176 B2 | 2/2009 | Maravich et al. | |
| 8,388,442 B2 | 3/2013 | Bates et al. | |
| 8,635,637 B2 | 1/2014 | Krum et al. | |
| 8,836,706 B2 | 9/2014 | Zhao et al. | |
| 8,898,687 B2 | 11/2014 | Hulten et al. | |
| 8,996,530 B2 | 3/2015 | LuVogt et al. | |
| 9,086,776 B2 * | 7/2015 | Ye | G06F 3/048 |
| 9,652,134 B2 | 5/2017 | Goossens et al. | |
| 9,706,040 B2 | 7/2017 | Kadirvel et al. | |
| 2008/0214214 A1 | 9/2008 | Reissmueller et al. | |
| 2009/0055484 A1 | 2/2009 | Vuong et al. | |
| 2009/0144639 A1 | 6/2009 | Nims et al. | |
| 2009/0318773 A1 | 12/2009 | Jung et al. | |
| 2010/0115426 A1 | 5/2010 | Liu et al. | |
| 2010/0156909 A1 | 6/2010 | Banerjee et al. | |
| 2011/0072448 A1 | 3/2011 | Stiers et al. | |
| 2011/0098109 A1 | 4/2011 | Leake et al. | |
| 2011/0225519 A1 | 9/2011 | Glodman et al. | |
| 2011/0265018 A1 | 10/2011 | Borst et al. | |
| 2012/0130717 A1 | 5/2012 | Xu et al. | |
| 2013/0031475 A1 | 1/2013 | Maor et al. | |
| 2013/0174052 A1 | 7/2013 | Blattner et al. | |
| 2013/0194280 A1 | 8/2013 | Kwon et al. | |
| 2013/0257877 A1 | 10/2013 | Davis | |
| 2013/0290339 A1 | 10/2013 | LuVogt et al. | |
| 2014/0129343 A1 | 5/2014 | Finster et al. | |
| 2014/0160149 A1 * | 6/2014 | Blackstock | G06N 3/006 345/619 |
| 2014/0347368 A1 | 11/2014 | Kishore et al. | |
| 2016/0361653 A1 | 12/2016 | Zhang et al. | |

FOREIGN PATENT DOCUMENTS

KR 10-2015-0068509 A 6/2015
WO WO 2008/109299 A2 9/2008

OTHER PUBLICATIONS

MittGaming, How to Cut Hair in ARK: Survival Evolved, Jan. 2017, https://www.youtube.com/watch?v=EZh9WYbqgHs.*
U.S. Appl. No. 15/787,618, filed Oct. 18, 2017.
U.S. Appl. No. 15/793,236, filed Oct. 25, 2017.
Gobron, S. et al., "Impact of Nonverbal Facial Cues on Spontaneous Chatting with Virtual Humans," Journal of Virtual Reality and Broadcasting, vol. 19(2013), No. 6.

* cited by examiner

| 602 — A method of customizing a first avatar 238, comprising, in accordance with an application on a first electronic device associated with a first user 340, the first electronic device comprising one or more processors, memory, and a display: concurrently displaying the first avatar 238, associated with the first user 340, and a first closed form composer graphic on the display. Each different position of the first closed form composer graphic provides a different value 242 for a first trait 240 associated with the first closed from composer graphic.

604 — The first avatar 238 includes a pair of eyes, a nose, a set of lips, a pair of eyebrows, a pair of ears, a pair of eyelids, and a body.

606 — Execute a first procedure that comprises displaying on the first avatar 238 the first trait 240 set at a value 242 associated with a respective position of the first closed form composer graphic selected by the first user 340 without user intervention responsive to the user selection of the respective portion of the first closed form composer graphic.

608 — Associate the value 242 of the first trait 240 with the first avatar 238 that is associated with the position of the first elliptical composer graphic that was selected by the first user 340. The associating displays on the first avatar the first trait 240 set at the selected value 242 of the first trait.

610 — The displaying 606 is repeated for each position of the first closed form composer graphic contacted by the first user 340 until a first break in user contact with the first closed form composer graphic is detected. The position of the first closed form composer graphic that is selected by the first user 340 is the position of the first closed form composer graphic that was last contacted by the first user when the first break was detected.

612 — The first trait 240 is one of skin color, hair style, hair color, head shape, ear size, facial hair length, facial hair color, eyebrow length, eyebrow color, eye pupil color, eye pupil size, eye size, rotation of the eyes, distance between eyes, an amount of freckles, a nose style, a nose size, a mouth size, a mouth shape, a lip style, a lip size, a lip color, a height of the mouth on the face, a teeth style, a teeth size, a teeth color, a lower garment, an upper garment, a shoe style, a shoe color, earrings, an accessory worn by the first avatar, or a hat worn by the first avatar.

SYSTEMS AND METHODS FOR CHARACTER COMPOSITION

CROSS REFERENCE TO RELATED APPLICATION

This application claims priority to U.S. Provisional Patent Application No. 62/573,593 entitled "Systems and Methods for Distributing Customized Avatars Responsive to Events," filed Oct. 17, 2017, which is hereby incorporated by reference.

TECHNICAL FIELD

The present disclosure relates generally to systems and methods for customizing avatars.

BACKGROUND

Environments that use avatars to represent users typically provide avatar creation tools. Creation of an avatar frequently takes several steps and can be quite labor intensive. Moreover, an avatar created in one environment is often limited to that environment. Environment, in such a context, broadly means any environment where an avatar may be manifested. For example, an environment may be an avatar creation application, video game, social networking website, messaging application, smartphone address book, or any other application where a user may want to have a representation.

Despite the apparent inefficiency of creating avatars, invoking a multiplicity of avatars, each representing the same user, serves a practical purpose. As noted by Blackstock et al. in U.S. patent application Ser. No. 13/979,974, (published as US 2014/0160149 A1 and entitled "System and Method for Adaptable Avatars") just as in real life, digital users exist in multiple contexts and may require different identities in different environments.

There are tools that, once an avatar is made, enable users to use the same avatar in multiple environments, such as one disclosed by Mason et al. in U.S. patent application Ser. No. 12/279,643 (published as US 2010/0011422 A1). However, the mechanisms disclosed by Mason et al. require an avatar to be rendered identically in each environment. While Blackstock et al. in U.S. patent application Ser. No. 13/979,974 attempt to address such shortcomings, the tools for making an avatar for a user and customizing such avatars for such purposes remain unsatisfactory.

Therefore, what is needed in the art is a solution to address at least some of these limitations.

SUMMARY

The present disclosure details electronic devices and methods that provide faster, more convenient methods for customizing avatars, also termed genies. For instance, in some embodiments, the disclosed systems and methods concurrently display an avatar associated with a user and a closed form (e.g., elliptical) composer graphic on a display. Each different position on the composer graphic provides a different value for a trait associated with the composer graphic. For example, when the trait is hair length, one position on the composer graphic represents one length of hair on the avatar and another position on the composer graphic represents another length of hair. There is displayed on the avatar the trait set at a value associated with a respective position of the composer graphic selected by the user without user intervention responsive to the user selection of the respective position of the composer graphic. The value of the trait that is associated with the position of the composer graphic that was selected by the user is associated with the avatar. This associating displays on the avatar the trait set at the selected value of the trait.

Use of Closed Form Composer Graphic to Customize an Avatar.

An aspect of the present disclosure provides a method of customizing an avatar, comprising in accordance with an application on a first electronic device associated with a first user, the first electronic device comprising one or more processors, memory, and a touchscreen display: concurrently displaying a first avatar, associated with the first user, and a first closed form composer graphic on the display. Each different position on the first closed form composer graphic provides a different value for a first trait associated with the first closed form composer graphic. The method comprises executing a first procedure comprising: (i) displaying on the first avatar the first trait set at a value associated with a respective position on the first closed form composer graphic selected by the first user without user intervention responsive to the user selection of the respective position on the first composer graphic and (ii) associating the value of the first trait with the first avatar that is associated with the position of the first closed form composer graphic that was selected by the first user. This associating displays on the first avatar the first trait set at the value of the first trait selected by the first user.

In some embodiments, the displaying (i) is repeated for each position of the first closed form composer graphic contacted by the first user until a first break in user contact with the first closed form composer graphic is detected, and the position of the first closed form composer graphic that is selected by the first user is the position of the closed form elliptical composer graphic that was last contacted by the first user when the first break was detected.

In some embodiments, the method further comprises concurrently displaying the first avatar and a second closed form composer graphic on the display after the first trait is selected. Each different position of the second closed form composer graphic provides a different value for a second trait associated with the second closed form composer graphic. In such embodiments, the method further comprises executing a second procedure comprising (i) displaying on the first avatar the second trait set at a value associated with a respective position of the second elliptical composer graphic selected by the first user without user intervention responsive to the user selection of the respective position of the second elliptical composer graphic and (ii) associating the value of the first trait with the first avatar that is associated with the position of the second closed form composer graphic that was selected by the first user. This associating displays on the first avatar the second trait set at the selected value of the second trait.

In some embodiments, the displaying (i) is repeated for each position of the second closed form composer graphic contacted by the first user until a break in user contact with the second closed form composer graphic is detected, and the position of the second elliptical component that is selected by the first user is the position of the second elliptical composer graphic that was last contacted by the first user when the break with the second closed form computer graphic was detected.

In some embodiments, the first trait is one of skin color, hair style, hair color, head shape, ear size, facial hair length, facial hair color, eyebrow length, eyebrow color, eye pupil color, eye pupil size, eye size, rotation of the eyes, distance between eyes, an amount of freckles, a nose style, a nose size, a mouth size, a mouth shape, a lip style, a lip size, a lip color, a height of the mouth on the face, a teeth style, a teeth size, a teeth color, a lower garment (e.g., a pair of shorts, a pair of long pants, or a skirt), an upper garment (e.g., a shirt, a vest, or a jacket), a shoe style, a shoe color, earrings, an accessory (e.g., a pair of eye glasses, a watch, a pair of earphones, a pair of earmuffs, a scarf, a necklace, a mask, or a bracelet) worn by the first avatar, or a hat worn by the first avatar.

In some embodiments, the first trait is one of height of the eyes on the face, amount of face wrinkles, an amount of cheek indents/dimples, an amount of face pimples, stomach thickness, overall body height, an arm length, a leg length, a foot size, a height of the nose on the face, an absence or presence of a facial blush, an absence or presence of an eyeshadow, or an eye shadow color.

In some embodiments, the method further comprises receiving a specification of a gender of the first avatar. A gender layer is included on the first avatar from the set of male gender and female gender responsive to the specification of gender from the first user.

In some embodiments, the method further comprises receiving a selection of one or more topical categories by the first user from an enumerated plurality of topical categories. In such embodiments these topical categories are associated with the first avatar.

In some embodiments, the method further comprises receiving a selection of a plurality of topical categories by the first user from an enumerated plurality of topical categories. In such embodiments this plurality of topical categories is associated with the first avatar.

In some embodiments, the method further comprises receiving a selection of a subset of topical categories by the first user from an enumerated plurality of topical categories. In such embodiments this subset of topical categories is associated with the first avatar while the remainder of the topical categories in the enumerated plurality of topical categories are not associated with the first avatar.

In some embodiments the method further comprises receiving a selection of a first electronic communication within the application. The first electronic communication is associated with a sticker comprising an animated version of the first avatar responding to an event associated with the first electronic communication. Further, at the direction of the first user, the sticker is provided to one or more other users using the application. In some such embodiments the sticker comprises an animated version of the first avatar responding to an event and the animated version of the first avatar comprises one or more visible layers that are present in a version of the first avatar that is stored in a user profile associated with the first user and one or more visible layers that are not present in the version of the first avatar that is stored in the user profile associated with the first user.

In some embodiments the method further comprises receiving a selection of a first electronic communication within the application. The first electronic communication is associated with a sticker comprising a static version of the first avatar responding to an event associated with the first electronic communication. Further, at the direction of the first user, the sticker is provided to one or more other users using the application.

In some embodiments, the first electronic communication is selected from among a plurality of electronic communications by the first user, and each electronic communication in the plurality of electronic communications is associated with a category in one or more topical categories that have been associated with the first user.

In some embodiments, the forming the sticker comprises concurrently displaying the first avatar and an emotion slide bar on the display. Further, first user selection of each different portion of the emotion slide bar displays a different emotion on the first avatar from a discrete set of emotions. Responsive to receiving a user swipe of the emotion slide bar, the different emotion displayed on the first avatar is changed to the emotion associated with the different portion of the emotion slide bar in which the user swipe ended.

In some embodiments, the first avatar includes a pair of eyes, a pair of eyelids, a set of lips, and a pair of eyebrows, and each respective emotion in the discrete set of emotions specifies at least a first characteristic position for the set of lips of the first avatar and a second characteristic position for the pair of eyebrows of the first avatar.

In some embodiments, the sticker comprises an animated version of the first avatar responding to the event, the first avatar includes a pair of eyes, a pair of eyelids, a set of lips, and a pair of eyebrows, and the first avatar is animated within the sticker by relative movement of the pair of eyes, the pair of eyelids, the set of lips and the pair of eyebrows through a repeating pattern of expressions over time.

In some embodiments, the sticker comprises an animated version of the first avatar responding to the event and the first avatar is animated within the sticker by any combination of: varying an amount of facial bone deformation, varying a pupil size, varying an eyelid position, varying an eye size, varying a pupil position, varying a mouth position, varying a nose position, varying an ear position, varying a mouth size, or varying a face perspective in the first avatar over time.

In some embodiments, the sticker comprises an animated version of the first avatar responding to the event and the first avatar is animated within the sticker by any combination of: varying a position of the first avatar in the sticker over time, varying a scale of the first avatar in the sticker over time, or moving a body part of the first avatar in the sticker over time.

In some embodiments, the sticker comprises an animated version of the first avatar responding to the event and the first avatar is animated within the sticker by any combination of moving one or more body parts the first avatar in the sticker over time, wherein the one or more body parts is selected from the group consisting of the arms, the feet, the legs, the hands, the neck, or the head of the first avatar.

In some embodiments, the method further comprises providing a first affordance at a time after receiving the first electronic communication. Selection of the first affordance by the first user displays a first tool for selection from a plurality of avatars other than the first avatar. Each avatar in the plurality of avatars is associated with (i) a different user in a contact list of the first user within the application or (ii) a famous person. Responsive to receiving a selection of one or more second avatars from the plurality of avatars, the one or more second avatars are compiled into the sticker along with the first avatar.

In some embodiments, the method further comprises providing, at a time after receiving the first electronic communication, a second affordance. Selection of the second affordance by the first user displays a second tool for annotating the sticker with a user provided expression encapsulated in a bubble.

In some embodiments, the method further comprises providing, at a time after receiving the first electronic communication, a first affordance and a second affordance.

Selection of the first affordance by the first user displays a first tool for selection from a plurality of avatars other than the first avatar. Each avatar in the plurality of avatars is associated with (i) a different user in a contact list of the first user within the application or (ii) an enumerated list of avatars provided by the application where each avatar in this enumerated list represents a different public figure. Responsive to receiving a selection of one or more second avatars from the plurality of avatars, the one or more second avatars from the plurality of avatars is compiled into the sticker. Selection of the second affordance by the first user activates a second tool for annotating the sticker with a first user provided expression encapsulated in a bubble.

In some embodiments, the method further comprises providing, at a time after receiving the first electronic communication, a first affordance. Selection of the first affordance by the first user activates a first tool for selection from a plurality of second avatars other than the first avatar. Each second avatar in the plurality of avatars is associated with (i) a different user in a contact list of the first user within the application or (ii) an enumerated list of avatars provided by the application wherein each avatar in the list represents a different public figure. Responsive to receiving a selection of one or more second avatars from the plurality of avatars by the first user, the one or more second avatars are compiled from the plurality of avatars into the sticker. In such embodiments, the forming further comprises concurrently displaying the first avatar, the one or more selected second avatars, and an emotion slide bar on the display. First user selection of each different portion of the emotion slide bar provides a different emotion on the first avatar and the one or more selected second avatars from a discrete set of emotions. Responsive to receiving a user swipe of the emotion slide bar, the emotion displayed on the first avatar and the one or more selected second avatars is changed to the emotion associated with the different portion of the emotion slide bar in which the user swipe ended.

In some embodiments, the first electronic communication is a news article, blog posting, E-mail, or social media posting received from a remote publication source.

In some embodiments, the first avatar includes a pair of eyes, a nose, a set of lips, a pair of eyebrows, a pair of ears, and a body.

In some embodiments, the method further comprises providing a first affordance at a time after receiving the first electronic communication. Selection of the first affordance by the first user displays a first tool for modifying the sticker, where the modifying the sticker comprises: adding a quote bubble, provided by the first user, to the sticker using the first affordance, adding the avatar of one or more friends of the first user, and designated by the first user through the first affordance, to the sticker, changing the expression on each avatar in the sticker using the first affordance, adding or removing a prop or background scene to the sticker using the first affordance, changing an article of clothing worn by an avatar in the sticker using the affordance, repositioning or rescaling a layer that includes props/backgrounds/clothing using the affordance, changing the bone position of an avatar in the sticker using the first affordance, or changing a headline of the sticker using the first affordance.

In some embodiments, the first closed form is elliptical shaped, and the sticker is provided to the one or more other users without the first electronic communication.

In some embodiments, the first closed form is elliptical shaped, and the sticker is provided to the one or more other users with the first electronic communication.

Electronic Device Embodiments.

In accordance with some embodiments, an electronic device includes a display, one or more processors, memory, and one or more programs. The one or more programs are stored in the memory and are configured to be executed by the one or more processors. The one or more programs include instructions for performing or causing performance of the operations of any of the methods described herein.

Non-Transitory Computer Readable Media Embodiments.

In accordance with some embodiments, a non-transitory computer readable storage medium has stored therein instructions which when executed by an electronic device with a display, a memory, and one or more processors to execute one or more programs stored in the memory, cause the device to perform or cause performance of the operations of any of the methods described herein.

In accordance with some embodiments, a graphical user interface on an electronic device with a display, a memory, and one or more processors to execute one or more programs stored in the memory, includes one or more of the elements displayed in any of the methods described herein, which are updated in response to inputs, as described in any of the methods described herein.

Thus, electronic devices with displays are provided with faster, more efficient methods and interfaces for customizing and distributing avatars.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A, 6B, 6C, 6D, 6E, 6F, 6G, and 6H are flow diagrams collectively illustrating a method of customizing an avatar (genie) in accordance with some embodiments.

FIG. 22 illustrates a message that is provided to a user prior to associating a value of a trait with an avatar, where the value of the trait is associated with a corresponding position of a corresponding first closed form composer graphic, and where the corresponding position was selected by the user in accordance with an embodiment of the present disclosure.

Figure 1:
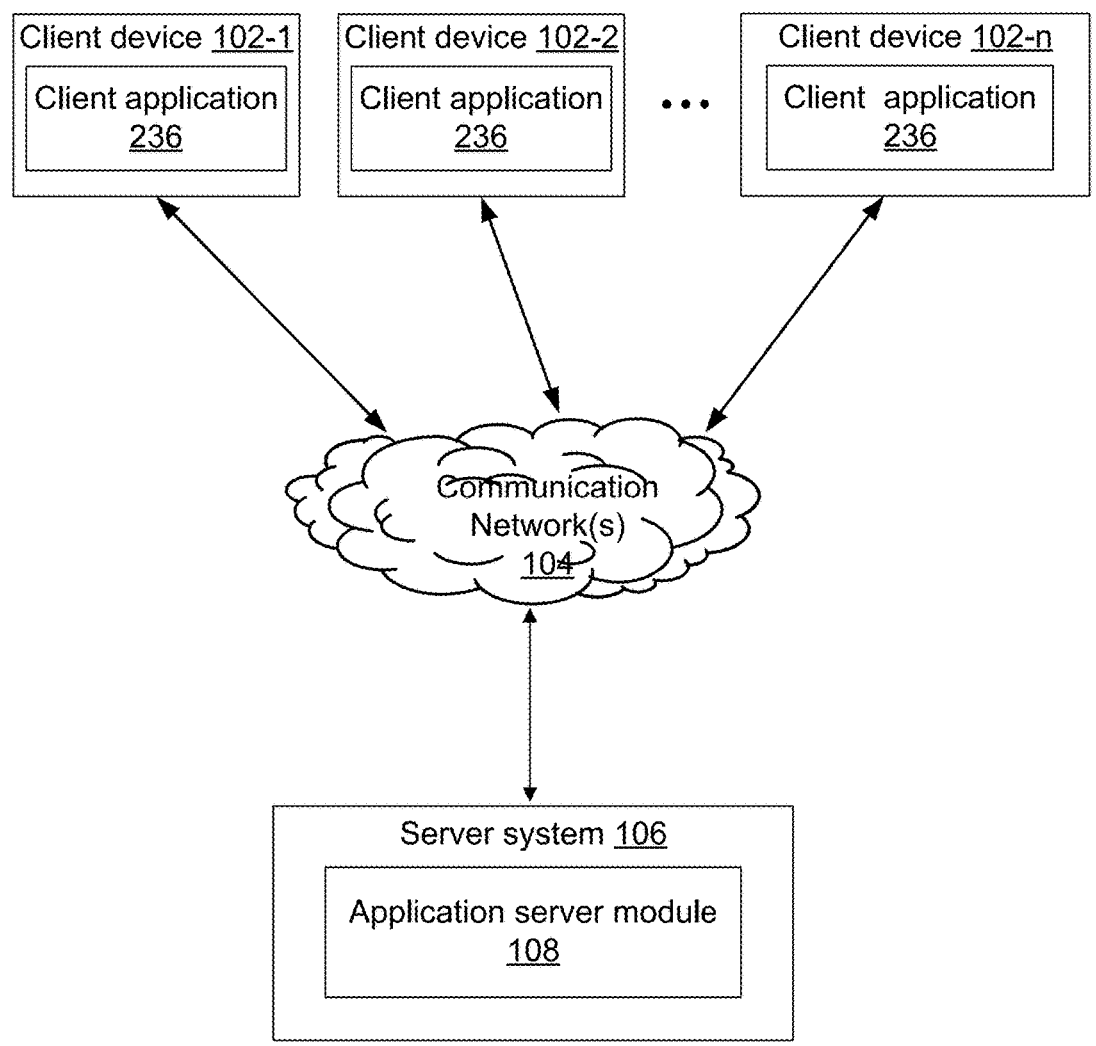
FIG. 1 illustrates a network architecture in accordance with some implementations.

In the Figures, dashed boxes represent optional embodiments.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first message could be termed a second message, and, similarly, a second message could be termed a first message, without departing from the scope of the present disclosure. The first message and the second message are both messages, but they are not the same message.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "exemplary" is used in the sense of "serving as an example, instance, or illustration" and not in the sense of "representing the best of its kind."

As used herein, the term "avatar" and "genie" are used interchangeably.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers are, optionally, used. It should also be understood that, in some embodiments, the device is not a portable communications device, but is a desktop computer.

Figure 65:
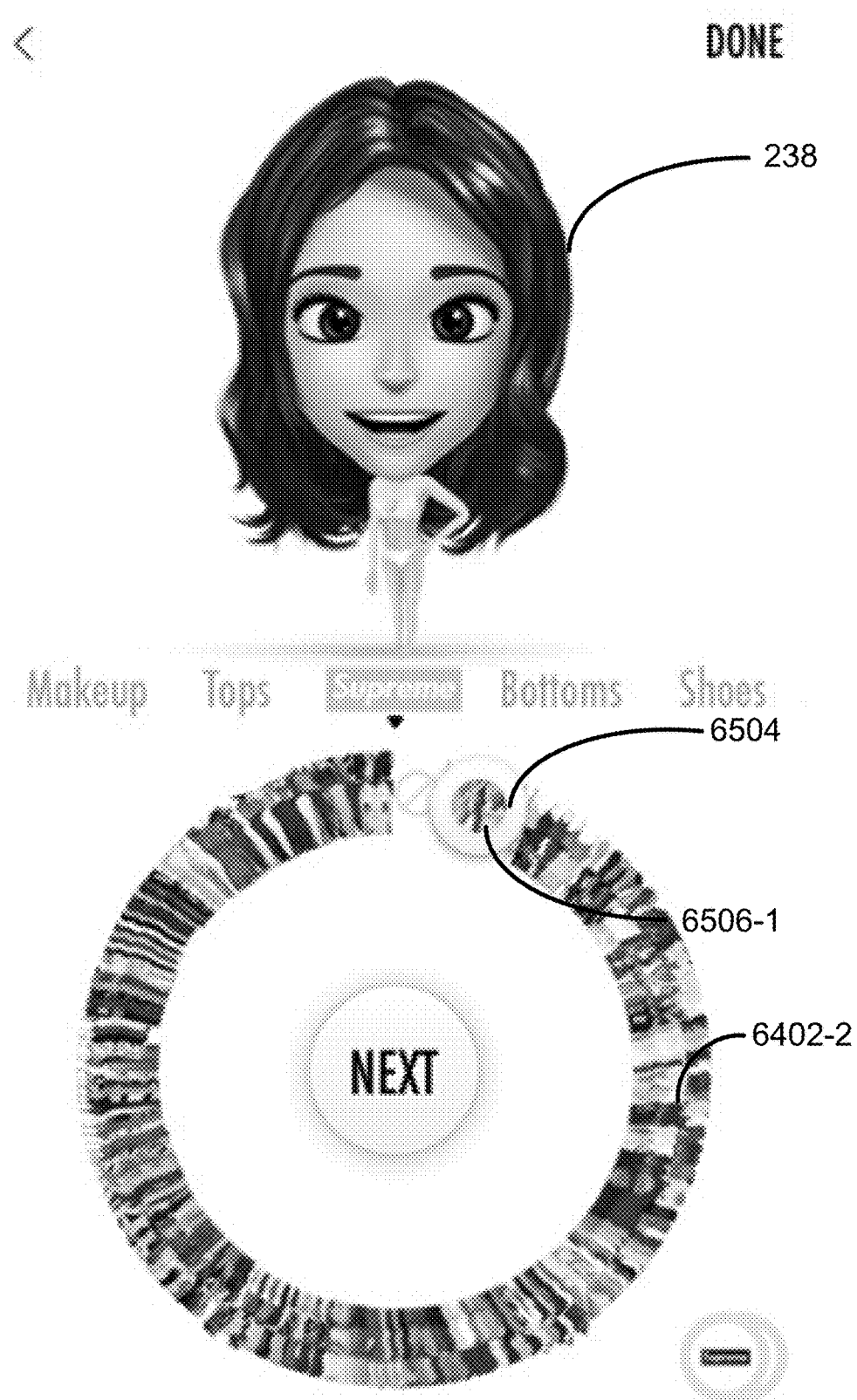
FIG. 65 illustrates concurrently displaying a first avatar, associated with a first user, and a first closed form composer graphic, on a display, where each different position on the first closed form composer graphic provides a different value for the trait of an upper garment and where the user has selected a first position on the first closed form composer graphic and thus a first upper garment for the avatar, and where the first closed form graphic is a first brand composer graphic in a plurality of brand composer graphics which contain clothing items of a specific type (brand), where the user has selected the first brand composer graphic in accordance with an embodiment of the present disclosure.

A detailed description of a system 100 for customizing a first avatar in accordance with the present disclosure, is described in conjunction with FIGS. 1 through 65.

Figure 2:
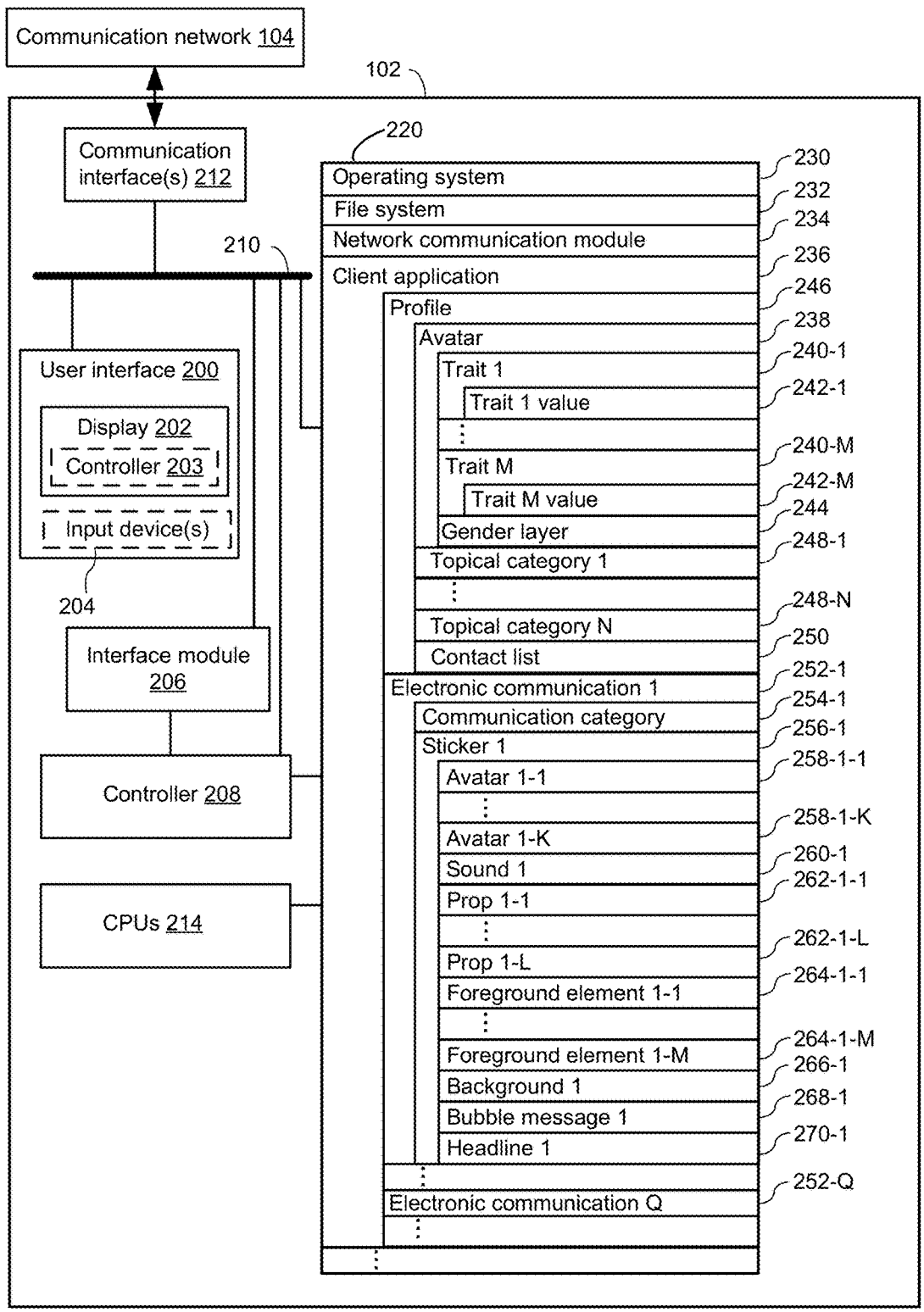
FIG. 2 is a block diagram illustrating an electronic client device in accordance with some embodiments.

In particular, FIG. 1 is a block diagram illustrating an exemplary network architecture of a client-server environment 100 in accordance with some embodiments. The client-server environment 100 includes a number of client devices (e.g., personal electronic devices) 102-1, 102-2, . . . 102-*n*, each storing instructions for a client application 236 in memory 220 (FIG. 2). The client devices 102 are connected to a server system 106, storing an application server module 108 associated with the client application 236 in memory 306 (FIG. 3), by one or more networks 104 (e.g., the Internet, cellular telephone networks, mobile data networks, other wide area networks, local area networks, metropolitan area networks, etc.). In some embodiments, the one or more networks 104 include a public communication network (e.g., the Internet and/or a cellular data network), a private communications network (e.g., a private LAN or leased lines), or a combination of such communication networks.

A respective client device 102 is any suitable computing device that, in some implementations, is capable of connecting to the communication network(s) 104, receiving from the server system 106 electronic communications and stickers from the server system 106, sending to the server system requests, and presenting, managing, and inputting/editing stickers or avatars. In some implementations, the client device 102 is a smart phone, a mobile phone, a tablet device, a computing device of a vehicle of a user (e.g., an in-vehicle communications system, an in-vehicle entertainment system, an in-vehicle navigation system), a wearable apparatus of the user that includes a computing device (e.g., a watch of the user having a computing device, glasses of the user having a computing device, a wearable music player), a desktop computer, a laptop computer, a netbook computer, a gaming device, a multimedia player device, or any other device that is capable of receiving messages, as well as presenting (e.g., displaying), managing, and inputting/editing messages and/or stickers and/or avatars. In some implementations, the client device 102 includes an image capture device (e.g., a camera).

In some embodiments, messages from the server system 106 are sent to a respective client device 102 when there is a match between the topical categories of such messages and the topical categories that have been designated of interest by the user associated with the respective client device 102.

In some embodiments, unique electronic communications from the server system 106 are sent to respective client devices 102 over time. For instance, in some embodiments, each day one, two, three, four, five, six, or more than seven electronic communications are sent to respective client devices 102. In typical embodiments, each of these electronic communications pertain to a different topical event that is occurring, such as a new article, news event, tweet by a famous person, blog posting by an influencer, or the like as explained in more detail below.

In some implementations, the server system 106 includes an application server module 108.

In some embodiments, the application server module 108 sends each respective client device 102 electronic communications when there is a match between the topical categories of such messages and the topical categories that have been designated of interest by the user of the respective client device 102.

In some embodiments, the application server module 108 sends each respective client device 102 electronic communications without regard for the topical categories of such messages. For instance, in some such embodiments, users of the respective client devices 102 have not designated topical categories that are of interest by the user.

In some embodiments, the application server module 108 sends a sticker comprising an animated or static version of the avatar of the user of the respective client device 102 with each such electronic communication. In the sticker, the avatar of the user of the respective client device 102 is shown in the sticker responding to the event described in the electronic communication. That is, in some embodiments, each electronic communication sent to the user of a respective client device includes a sticker that shows the avatar of the user reacting to an event described in the electronic communication. For instance, if the electronic communication pertains to a news event, the avatar appears to be reacting to the news event.

In some embodiments, the server system 106 is a single computing device such as a computer server, while in other embodiments, the server system 106 is implemented as multiple computing devices working together to perform the actions of a server system (e.g., cloud computing). Users employ the client devices 102 to access the application server module 108 at the server system 106 and to receive electronic communications associated with stickers. For example, a user of one of the client devices 102-1 executes application 236.

Figure 8:
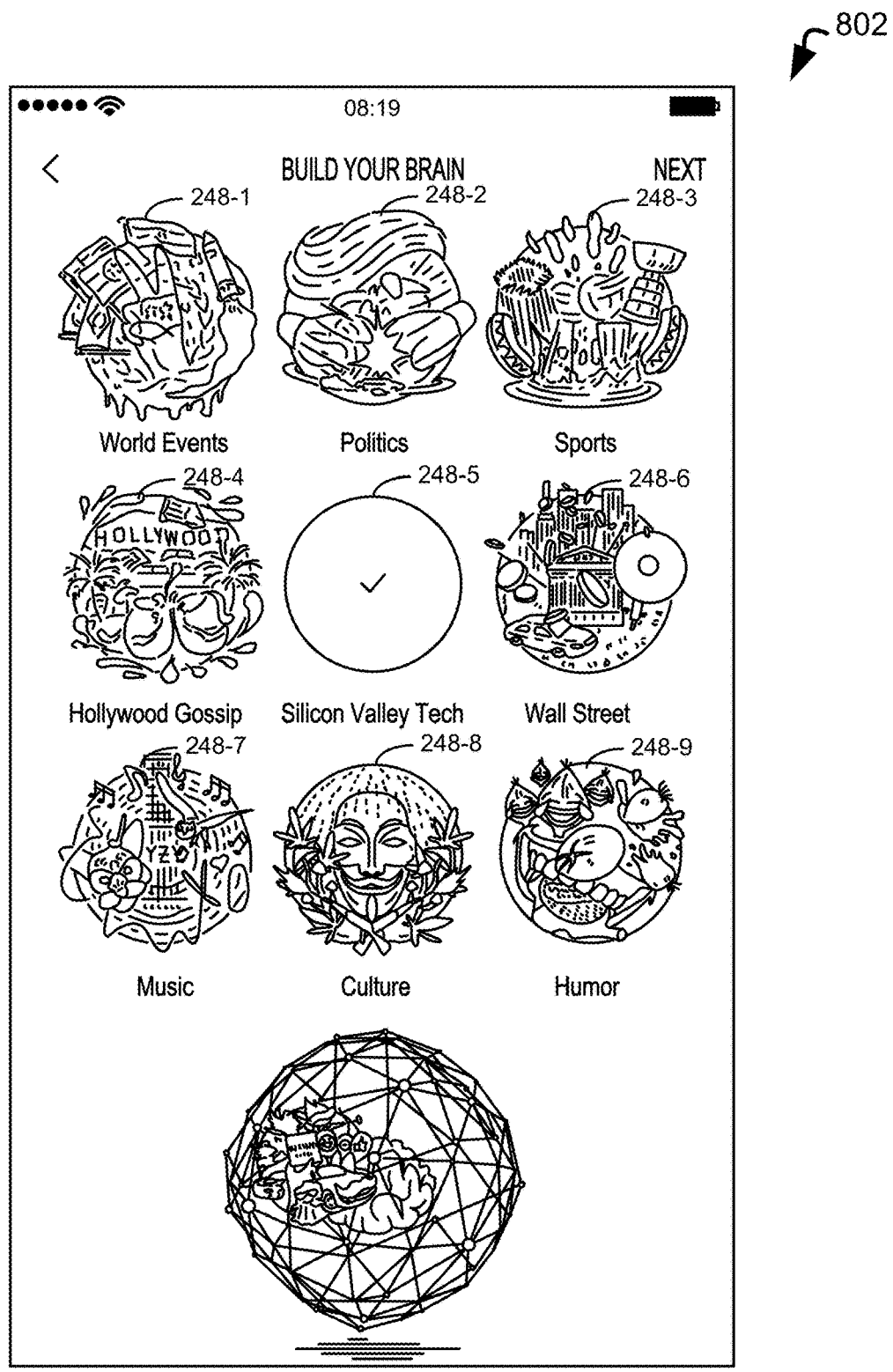
FIG. 8 illustrates receiving a selection of one or more topical categories from an enumerated plurality of topical categories and associating the one or more topical categories with a first avatar in accordance with some embodiments.

In some embodiments, as illustrated in FIG. 8, a user first customizes their profile by making a selection of one or more topical categories from an enumerated plurality of topical categories. These one or more topical categories are associated with the user's avatar in the user's profile. In some embodiments, the application server module 108 takes note of the one or more topical categories associated with the user's avatar in the user's profile and uses these one or more topical categories to determine which electronic communications to send to the user's application 236 for possible selection by the user by matching the category of such electronic communications to the one or more topical categories selected by the user of the application 236.

In some alternative embodiments, a user first customizes their profile by making a selection of a set of topical categories from a plurality of sets of topical categories where each set in the plurality of sets includes two or more topical categories. The selected set of topical categories is associated with the user's avatar in the user's profile. In some embodiments, the application server module 108 takes note of the selected set of topical categories associated with the user's avatar in the user's profile and uses the topical categories in the selected set of topical categories to determine which electronic communications to send to the user's application 236 for possible selection by the user by matching the category of such electronic communications to one or more topical categories in the set of topical categories selected by the user of the application 236.

In some alternative embodiments, a user does not first customize their profile by making a selection of topical categories. In some such embodiments, the application server module 108 does not take note of topical categories associated with the user's avatar in the user's profile and does not use such topical categories to determine which electronic communications to send to the user's application 236 for possible selection by the user.

Each of respective electronic communications sent to a user is associated with a sticker that includes an altered version of the user's avatar reacting an event addressed by the respective electronic communication. For instance, in some embodiments an electronic communication describes a recent event (e.g., a newsworthy event that has happened in the past five minutes, the past half hour, the past hour, the past day, or the past week, and/or an event that have been trending on top charts of social medial applications such as TWITTER or FACEBOOK within the past half hour, the past hour, the past day, or the past week). This can be a news event, an album release, an interesting magazine article, a blog posting by a famous person, or the like.

In some embodiments, the user, at application 236, makes a selection of one of the offered electronic communications within the application 236.

In some such embodiments, there in only one electronic communication offered within the client application 236 at any given time. In such embodiments the user, at application 236, either selects the offered electronic communication within the application 236 or disregards it. At some point (e.g., later in the day, within an hour, etc.), a new electronic communication with a new associated sticker is sent to the user's application 236 that replaces the previous electronic communication and previous associated sticker regardless of whether the user has selected the previous electronic communication.

The user uses the client application 236 to select an electronic communication 252 in the case where there is more than one electronic communication, or the single electronic communication 252 in the case where there is just one electronic communication. The electronic communication is associated with a sticker 256 comprising an animated or static version of the avatar of the user responding to an event associated with the selected electronic communication. In some embodiments the avatar is shown reacting to the event by containing one or more visible layers that are present in the copy of the avatar 238 that is in a user profile 246 associated with the user and one or more visible layers that are not present in the copy of the avatar 238 that is in the user profile 246 of the user.

As used herein, the term "layer" refers to different levels within a sticker in which objects or images constituting the avatar or other components of the scene are placed. In typical embodiments, the sticker is a digital image or a digital clip constituting a plurality of images, where the images in at least a subset of the images each comprise a plurality of layers. The sticker comprises the avatar in digital form. In some embodiments, the avatar is represented by one or more layers. In some embodiments, the avatar is represented in the sticker by a plurality of layers. In some embodiments, the avatar is represented in the sticker by two layers, three layers, four layers, five layers, six layers, seven layers, eight layers, nine layers, ten layers or more than ten layers. As is customary in the digital imaging arts, the layers are used to combine two or more images into a single digital image.

The user provides the sticker to one or more other users using the application. For instance, the user may forward the sticker to contacts of the user within one or more social applications to which that the user subscribes. In some such embodiments, the application 236 makes use of application programming interface calls provided by such social media applications (e.g., FACEBOOK MESSENGER, TWITTER, SNAPCHAT, iMESSAGE, etc.) to forward the sticker to such contacts within the social media applications via application server module 108 at server system 106.

Referring to FIG. 2, an example client device 102 typically includes one or more processing units (CPUs) 214, one or more network or other communications interfaces 212, memory 220 (e.g., random access memory and/or non-volatile memory) optionally accessed by one or more controllers 208, and one or more communication busses 210 for interconnecting the aforementioned components.

The client device 102 also includes a user interface 200. The user interface 200 typically includes a display device 202, which is optionally integrated within the device (e.g., housed in the same chassis as the CPU and memory, such as with a smart phone or an all-in-one desktop computer). In some embodiments, the client device 102 includes input device(s) 204, such as a keyboard, mouse, and/or other input buttons. Alternatively or in addition, in some embodiments, the display device 200 includes a touch-sensitive surface, e.g., where display 202 is a touch-sensitive display or client device 102 includes a touch pad.

In client devices in which display 202 is touch-sensitive, the touch-sensitive display provides an input interface and an output interface between the device and a user. The touch-sensitive display includes a touch-sensitive surface, sensor, or set of sensors that accepts input from the user based on haptic and/or tactile contact. The touch-sensitive display detects contact (and any movement or breaking of the contact) on touch-sensitive display and converts the detected contact into interaction with user-interface objects (e.g., one or more soft keys, icons, messages, message interfaces, videos, or images) that are displayed on touch-sensitive display system (e.g., that are displayed at a location on the display 202 corresponding to the location at which the contact was detected). In client devices that have a touch-sensitive display, a physical keyboard is optional (e.g., a soft keyboard may be displayed when keyboard entry is needed). In some embodiments, the touch-sensitive display detects contact by the finger of the user and/or a stylus. In such embodiments, the display controller 203 receives and/or sends electrical signals from/to touch-sensitive display. As such, the touch-sensitive display displays visual output to the user. The visual output optionally includes graphics, text, icons, video, and any combination thereof (collectively termed "graphics").

In some embodiments, client device 102 includes a touchpad (not shown) for activating or deactivating particular functions. In some embodiments, the touchpad is a touch-sensitive area of the device that, unlike a touch screen, does not display visual output. The touchpad is, optionally, a touch-sensitive surface that is separate from a touch-sensitive display system or an extension of the touch-sensitive surface formed by the touch screen.

In some embodiments, the user interface 200 also includes an audio output device, such as speakers or an audio output for connecting with speakers, earphones, or headphones. In some embodiments, the user interface 200 also includes an audio input device (e.g., a microphone), and optional voice recognition capabilities (e.g., to supplement or replace the keyboard).

Optionally, the client device 102 includes an audio input device (e.g., a microphone) to capture audio (e.g., speech from a user).

In some implementations, the client device 102 also includes one or more of: one or more sensors (e.g., accelerometer, magnetometer, proximity sensor, gyroscope) (not shown), an image capture device (e.g., a camera device or module and related components) (not shown), and/or a location module (e.g., a Global Positioning System (GPS) receiver or other navigation or geolocation device and related components).

Memory 220 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 220 may optionally include one or more storage devices remotely located from the CPU(s) 214. Memory 220, or alternatively the non-volatile memory device(s) within memory 220, comprises a non-transitory computer readable storage medium. Access to memory 220 by other components of client device 102, such as CPU(s) 214 and the peripherals interface 206, is, optionally, controlled by controller 208. In some embodiments, memory 220 can include mass storage that is remotely located with respect to the central processing unit(s) 214. In other words, some data stored in memory 220 may in fact be hosted on devices that are external to client device 102, but that can be electronically accessed by client device 102 over an Internet, intranet, or other form of network 104 or electronic cable using communication interface 212.

The memory 220 of client device 102 comprises and stores:
- an operating system 230 that includes procedures for handling various basic system services;
- a file system 232 for controlling access to the various files and data structures described herein;
- a network communication module 234 that is used for connecting the client device 102 to other computers via the one or more communication network interface(s) 212 (wired or wireless) and one or more communication networks 104, such as the Internet, cellular telephone networks, mobile data networks, other wide area networks, local area networks, metropolitan area networks, etc.;
- a client application 236 for receiving electronic communications associated with stickers and for indicating who should receive such electronic communications and/or stickers in conjunction with application server module 108 through communication network interface(s) 212, and related features/components such as:
  - the avatar 238 associated with a user, the avatar including one or more traits 240, and for each such respective trait 240 a trait value 242;
  - an avatar gender layer 244 that confers a visible gender to the avatar 238;
  - a user profile 246 which includes the avatar 238, the gender layer 244, and optionally a one or more topical categories 248 selected by the user and, optionally, a contact list 250 associated with the user;
- one or more electronic communications 252 provided by the application server module 108, each respective electronic communication associated with:
  - optionally a designation of a communication category 254 that matches one of the topical categories 248 in the profile 246 of the user;
  - a sticker 256 which includes a copy of the avatar 238 of a first user stored in the user profile 246 of the first user and, optionally, the altered avatar 258 of additional users selected by the first user, one or more sounds 260, one or more props 262, one or more foreground elements 264, a background 266, a bubble message 268 and/or a headline 270.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 220 optionally stores a subset of the modules and data structures identified above. Furthermore, memory 220 optionally stores additional modules and data structures not described above.

It should be appreciated that device 102 is only one example of a client device, and that device 102 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

Figure 3:
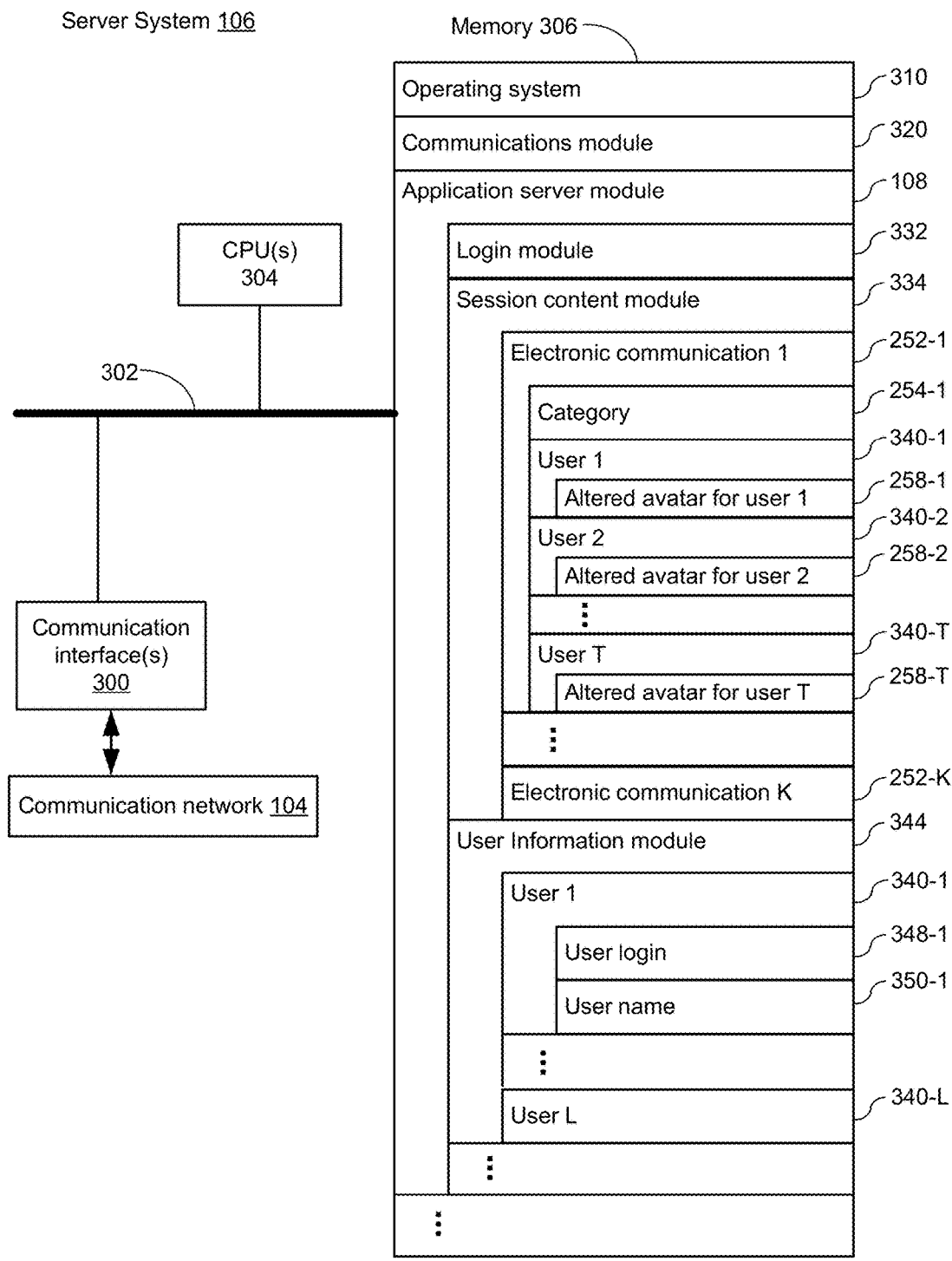
FIG. 3 is a block diagram illustrating a server system in accordance with some embodiments.

FIG. 3 is a block diagram illustrating an example server system 106 in accordance with some embodiments. The server system typically includes one or more processing units (CPU's) 304, one or more network or other communications interfaces 300, memory 306 (e.g., random access memory and/or non-volatile memory), and one or more communication busses 302 for interconnecting the aforementioned components.

Memory 306 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 306 may optionally include one or more storage devices remotely located from the CPU(s) 214. Memory 306, or alternatively the non-volatile memory device(s) within memory 306, comprises a non-transitory computer readable storage medium. In some embodiments, memory 306 can include mass storage that is remotely located with respect to the central processing unit(s) 304. In other words, some data stored in memory 306 may in fact be hosted on devices that are external to server system 106, but that can be electronically accessed by server system 106 over an Internet, intranet, or other form of network or electronic cable using communication interface(s) 300.

The memory 306 of server system 106 stores:
- an operating system 310 that includes procedures for handling various basic system services;
- a network communications module 320 for connecting to client devices 102 and other server systems via the communication network interface(s) 300 (wired or wireless) and one or more communication networks (e.g., the one or more networks 104);
- an application server module 108, associated with client applications 236 stored in respective memory 220 of client devices 202, with instructions for executing protocols and storing data associated with application 236, such as:
  - a login module 332 for authenticating users of client application 236, and for providing authenticated users access to data associated with respective sessions;
  - a session content module 334 that provides a plurality of electronic communications 252, each such electronic communication describing an event and being associated with:
    - optionally, a category 254; and
    - a designation of one or more users 340 and for each respective user of the one or more users, a sticker, or the electronic address of a sticker comprising a copy of the avatar 248 for the respective user; and
  - a user information module 344 for storing information associated with respective users 340-1 . . . 340-L of client application 236, including:
    - user login information 348 (e.g., names and passwords for logging into the server system 106) and user names 350 (e.g., names displayed in conjunction with messages uploaded to a respective messaging session).

In some embodiments, information for users 340 stored in the user information module 344 includes user profiles, login information, privacy and other preferences, and/or biographical data. In some embodiments, a login name associated with a respective user is the same as the user name displayed for the user. In other embodiments, a login name associated with a respective user is different than the user name displayed for the user. In some embodiments, server 106 stores the profile 246 comprising the avatar 238 information, including traits 240 and trait values 242 and gender layer 244, as well as subscribed topical categories 248 and/or contact list 250 for each user.

Now that devices and servers in accordance with the present disclosure have been described, methods for using these devices and servers will be described.

Using a Closed Form First Composer Graphic to Customize an Avatar.

FIGS. 6A-6H detail systems and methods for using a closed form first composer graphic to customize an avatar.

Figure 37:
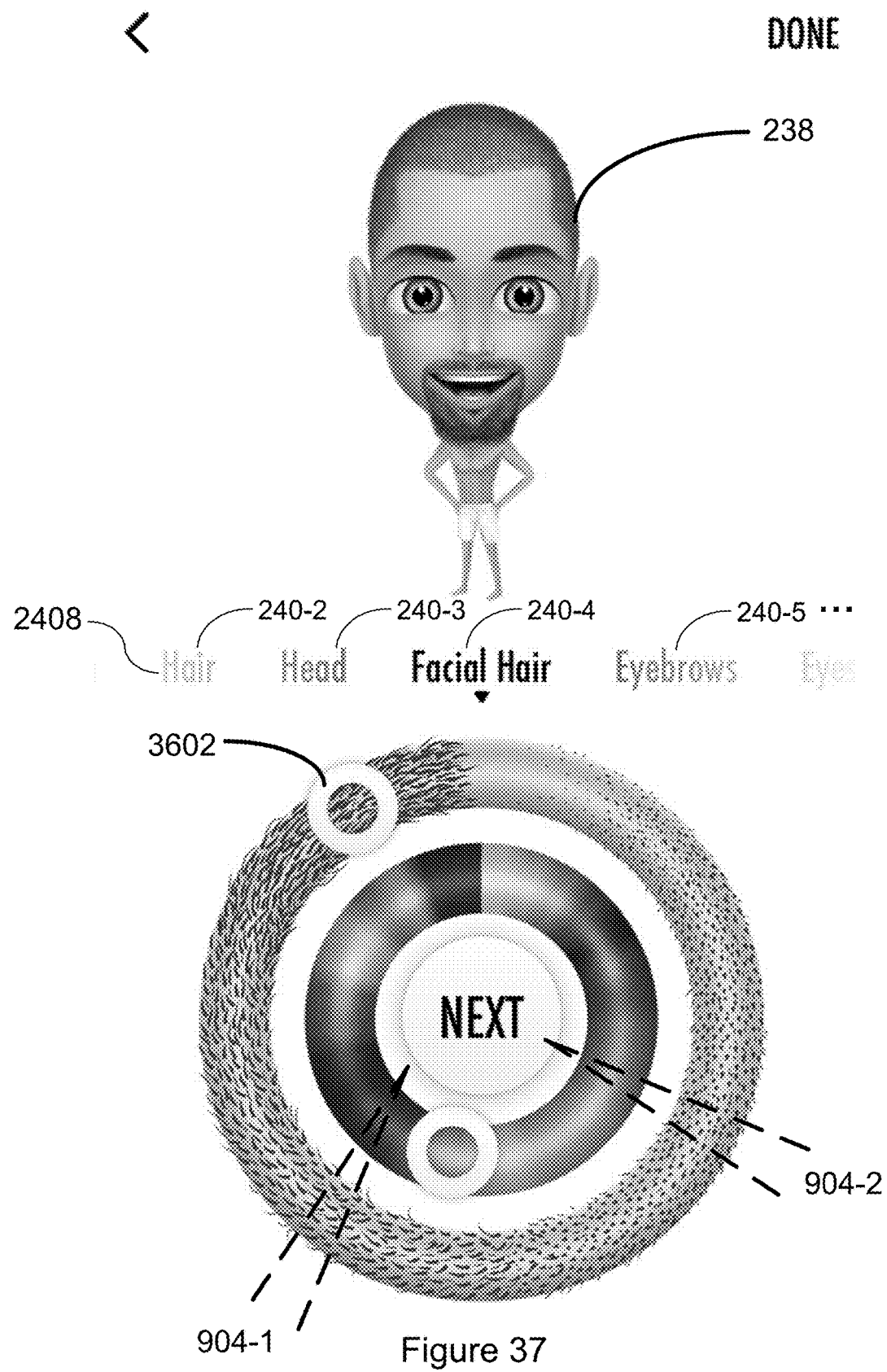
FIG. 37 illustrates concurrently displaying a first avatar, associated with a first user, a first closed form composer graphic, and a second closed form composer graphic on a display, where each different position on the first closed form composer graphic provides a different value for the trait facial hair length, and each different portion of the second closed form composer graphic provides a different value for the trait facial hair color, and where the user has selected a second position on the first closed form composer graphic and thus a second facial hair length for the avatar, and where the user has selected a second position on the second closed form composer graphic and thus a second facial hair color for the avatar in accordance with an embodiment of the present disclosure.
Figure 38:
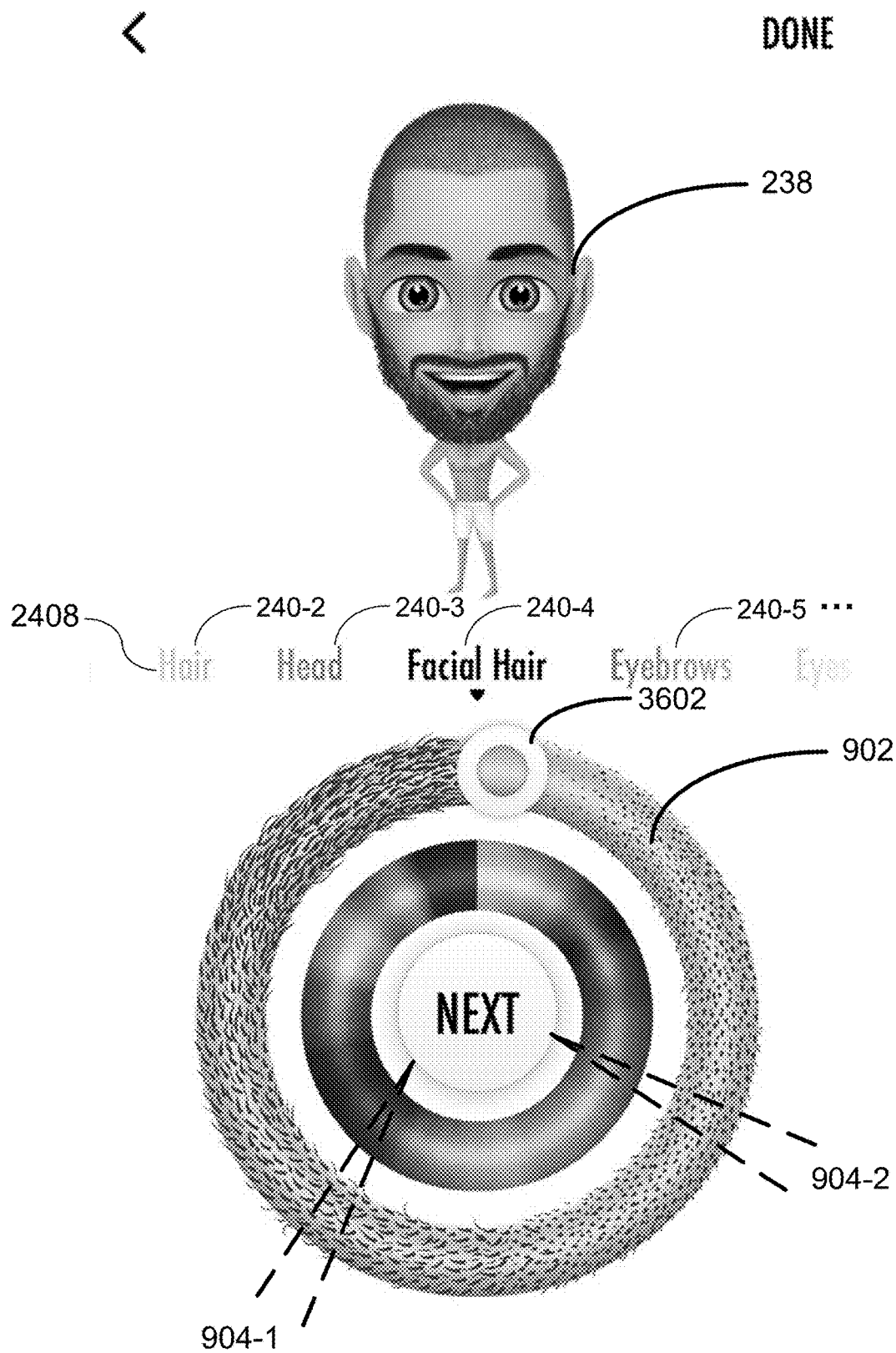
FIG. 38 illustrates concurrently displaying a first avatar, associated with a first user, a first closed form composer graphic, and a second closed form composer graphic on a display, where each different position on the first closed form composer graphic provides a different value for the trait facial hair length, and each different portion of the second closed form composer graphic provides a different value for the trait facial hair color, and where the user has selected a third position on the first closed form composer graphic and thus a third facial hair length for the avatar in accordance with an embodiment of the present disclosure.

One of the first things that is done by a user after they have installed the client application 236 on their electronic device 102 is to customize their avatar 238. In some such embodiments, referring to FIGS. 9 and 36-38 and block 602, a method of customizing a first avatar 238, comprises, in accordance with the client application 236 on a first electronic device 102 associated with a first user 340, the first electronic device comprising one or more processors, memory, and a display: concurrently displaying the first avatar 238, associated with the first user 340, and a first closed form composer graphic on the display. As used herein, the term "closed form" means a space that is completely enclosed by a line, or unbroken contour. Examples of "closed form" include, but are not limited to, circles, ellipses, and polygons. Each different position of the first closed form composer graphic provides a different value 242 for a first trait 240 associated with the first closed form composer graphic. For instance, referring to FIGS. 9 and 36-38, each different position 904 of the first closed form composer graphic 902 provides a different value 242 for the trait 240 "facial hair" that is associated with the first closed form composer graphic 902. The user can select the desired trait value 242 for the trait associated with the first closed form composer graphic 902 by selecting the position 904 of the first closed form composer graphic 902 that represents the desired trait value 242. For instance, referring to FIGS. 36-38, the user can drag handle 3602 around the closed form graphic 902 until the desired facial hair length is achieved. In some embodiments a user break is detected with respect to the drag handle, signifying that the user has selected the position of the closed form composer graphic where the drag handle has been moved to by the user. As used herein the term "user break" and "break" are used interchangeably. In some embodiments a user break means a pause or drop in contact with the drag handle of a closed form composer graphic. In embodiments of closed form composer graphics that do not have a drag handle, a user break means a pause or drop in contact with the based closed form composer graphic itself. In some embodiments, a user break is deemed to have occurred after either no contact with the display has been detected for a predetermined period of time or no change in user contact with the display has been detected for a predetermined period of time (e.g., the user has paused the drag handle, etc.). In some embodiments, this predetermined period of time is between 50 milliseconds and five seconds. In some embodiments, this predetermined period of time is between 100 milliseconds and four seconds.

In some embodiments, trait values 242 are an enumerated list of trait values that arranged on different positions of the first composer graphic 902 (e.g., different hair colors). In some embodiments, trait values 242 constitute a numeric range (e.g., average hair length as measured in centimeters, e.g., 0.01 cm to 15 cm). In some embodiments the trait values for a given trait associated with the first composer graphic is simply illustrated at different positions of the first closed form graphic 902. For instance, as illustrated in FIGS. 9 and 36-38, the trait value 242 ranges from clean shaven (1 o'clock) all the way through a very full beard (11 o'clock).

Figure 9:
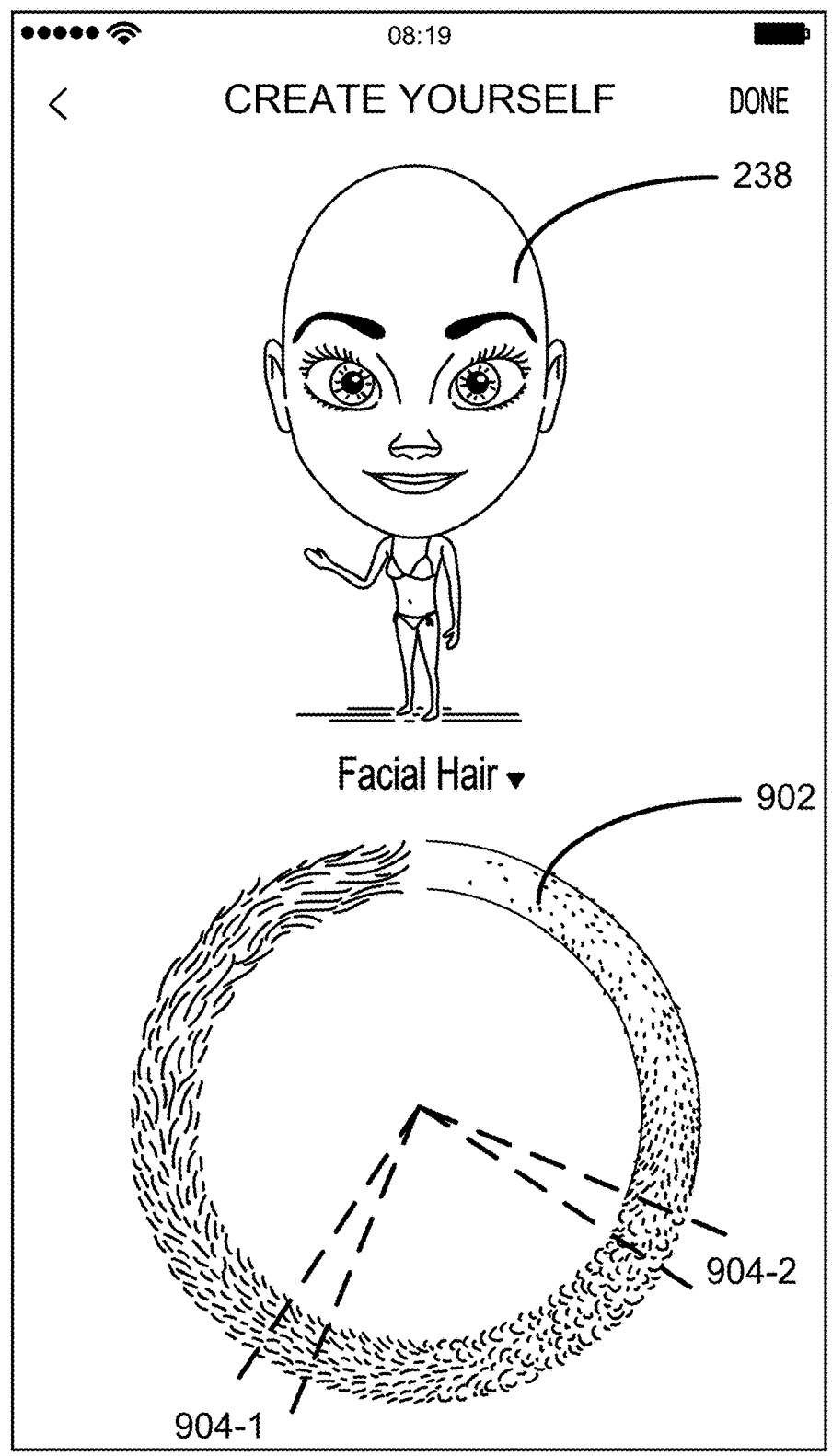
FIG. 9 illustrates concurrently displaying a first avatar and a first closed form graphic on a display, where each different position of the first closed form graphic provides a different value for a first trait associated with the first closed form graphic, and where the first avatar includes a face comprising a pair of eyes, a nose, and a set of lips in accordance with some embodiments.

Referring to 604 of FIG. 6A, and as further illustrated in FIG. 9, in some embodiments the first avatar 238 includes a pair of eyes, a nose, a set of lips, a pair of eyebrows, a pair of ears, a pair of eyelids, and a body. Further, referring to block 606 of FIG. 6A, the disclosed method in accordance with FIG. 6 comprises executing a first procedure that comprises displaying on the first avatar 238 the first trait 240 set at a value 242 associated with a respective position of the first closed form composer graphic selected by the first user 340 without user intervention (e.g., automatically) responsive to the user selection of the respective position of the closed form composer graphic.

Referring to block 608 of FIG. 6A, the client application 236 associates the value 242 of the first trait 240 with the first avatar 238 that is associated with the position of the first closed form composer graphic 902 that was selected by the first user 340. The associating displays on the first avatar the first trait 240 set at the selected value 242 of the first trait. As referenced by block 610 of FIG. 6A, the displaying 606 is repeated for each position of the first closed form composer graphic contacted by the first user 340 until a first break in user contact with the first closed from composer graphic is detected.

Referring to FIG. 9, in some embodiments, the position of the first closed form composer graphic that is selected by the first user 340 is the position of the first closed form composer graphic that was last contacted by the first user when the first break was detected. For instance, if the user selects position 904-2 of the first closed form composer graphic 902, the facial hair of the first avatar 238 is altered to look like the selected facial hair from the selected position 904-2 of the first closed form composer graphic 902.

Figure 36:
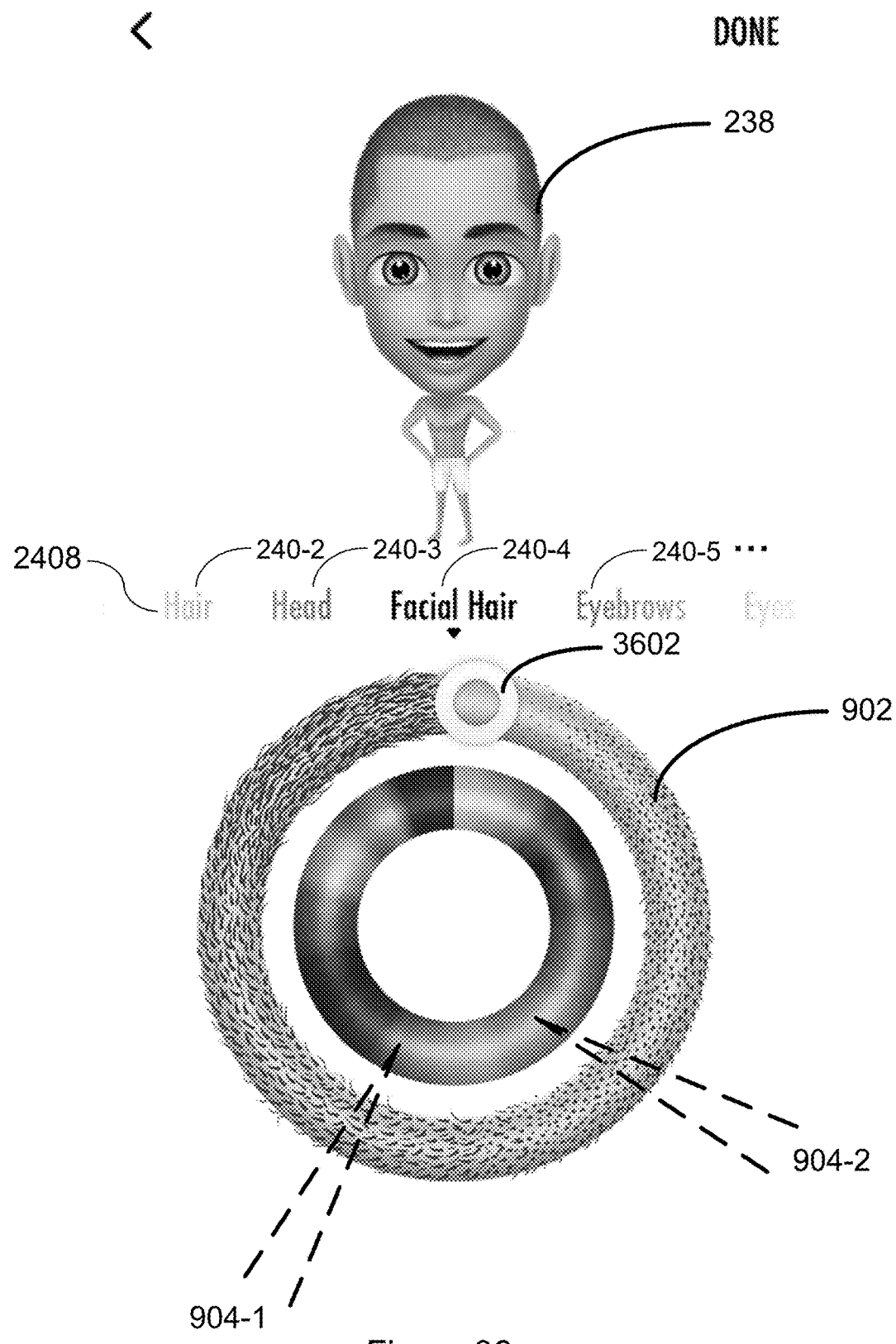
FIG. 36 illustrates concurrently displaying a first avatar, associated with a first user, a first closed form composer graphic, and a second closed form composer graphic on a display, where each different position on the first closed form composer graphic provides a different value for the trait facial hair length, and each different portion of the second closed form composer graphic provides a different value for the trait facial hair color, and where the user has selected a first position on the first closed form composer graphic and thus a first facial hair length for the avatar, and where the user has selected a first position on the second closed form composer graphic and thus a first facial hair color for the avatar in accordance with an embodiment of the present disclosure.

Referring to FIG. 36, in some embodiments, the position of the first closed form composer graphic 902 that is selected by the first user 340 is the position of the drag handle 3602 on the first closed form composer graphic 902 that was last contacted by the first user when the first break was detected. For instance, if the user selects position 904-2 of the first closed form composer graphic 902 using the drag handle 3602, the facial hair of the first avatar 238 is altered to look like the selected facial hair from the selected position 904-2 of the first closed form composer graphic 902.

This process of displaying is repeated for each position 904 of the first composer graphic 902 contacted by the first user 340 until a first break in user contact with the first composer graphic is detected. Thus, in embodiments such as illustrated in FIG. 9 the user drags a finger along the first closed from composer graphic 902 (e.g., in a clockwise or counterclockwise fashion) and as they do the facial hair on the avatar 238 is changed to match the position 904 of the first closed form composer graphic 902 they are touching. In embodiments such as illustrated in FIG. 36 the user invokes drag handle 3602 to indicated the selected position on the first closed form composer graphic 902. Once the user stops touching the first closed form composer graphic (e.g., the drag handle on the closed form graphic) for a predetermined amount of time or pauses their counterclockwise or clockwise movement for a predetermined period of time, a break is deemed to have occurred and the value 242 of the first trait 240 that is at the position 904 of the closed from composer graphic 902 last touched by the user before the break is associated with the first avatar 238. In other words, the trait value 242 that is associated with the position of the first closed form composer graphic 902 that was last contacted by the first user 340 when the first break was detected is associated with the first avatar 238. Further, this association includes displaying on the first avatar 238 the first trait 240 set at the trait value 242 of the first trait associated with the position 904 of the first closed form composer graphic 902 that was last contacted by the first user 340 when the first break was detected.

Referring to block 612 of FIG. 6A, in some embodiments the first trait 240 is one of skin color, hair style, hair color, head shape, ear size, facial hair length, facial hair color, eyebrow length, eyebrow color, eye pupil color, eye pupil size, eye size, rotation of the eyes, distance between eyes, an amount of freckles, a nose style, a nose size, a mouth size, a mouth shape, a lip style, a lip size, a lip color, a height of the mouth on the face, a teeth style, a teeth size, a teeth color, a lower garment, an upper garment, a shoe style, a shoe color, earrings, an accessory worn by the first avatar, or a hat worn by the first avatar.

Figure 6B:
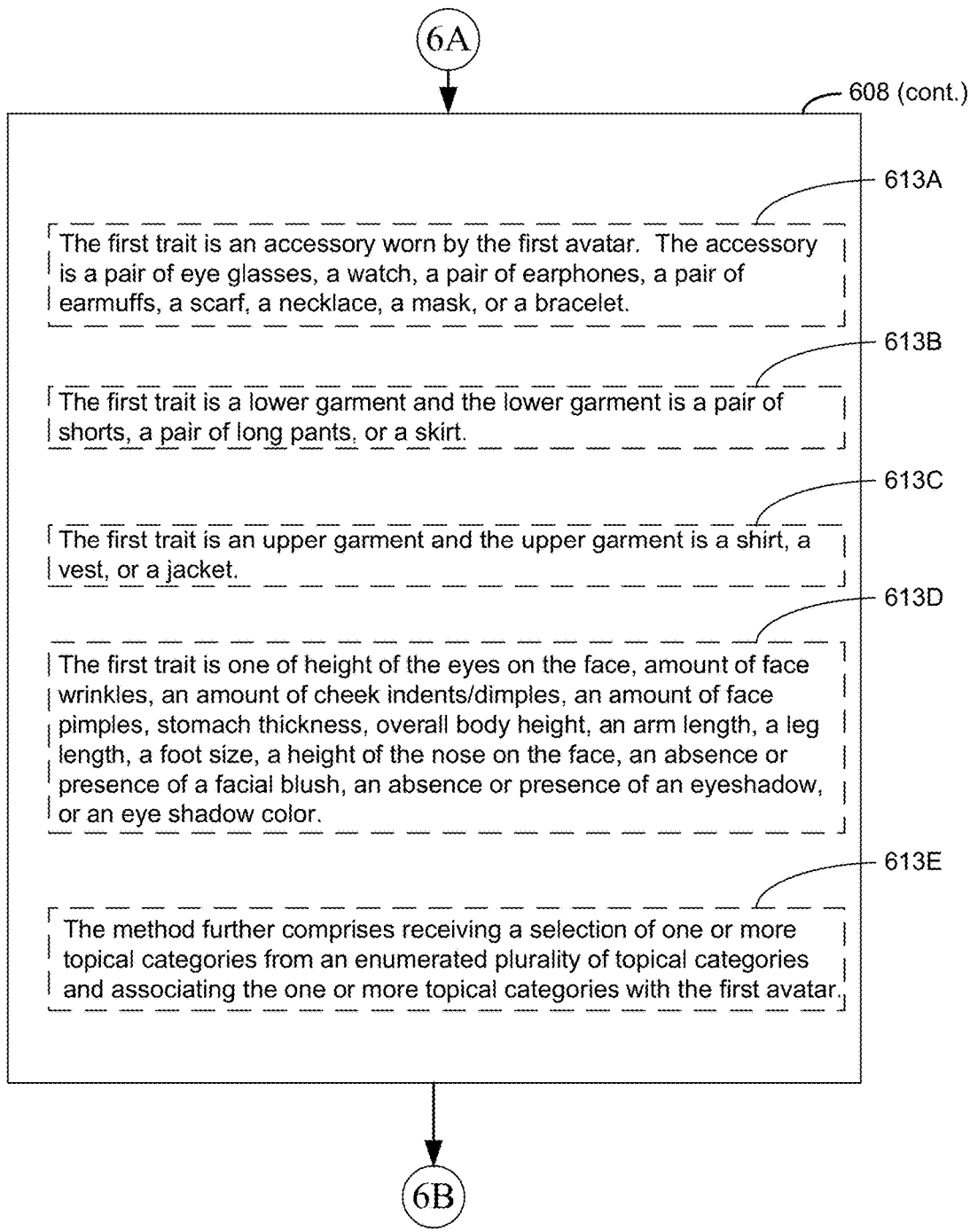
Figure 56:
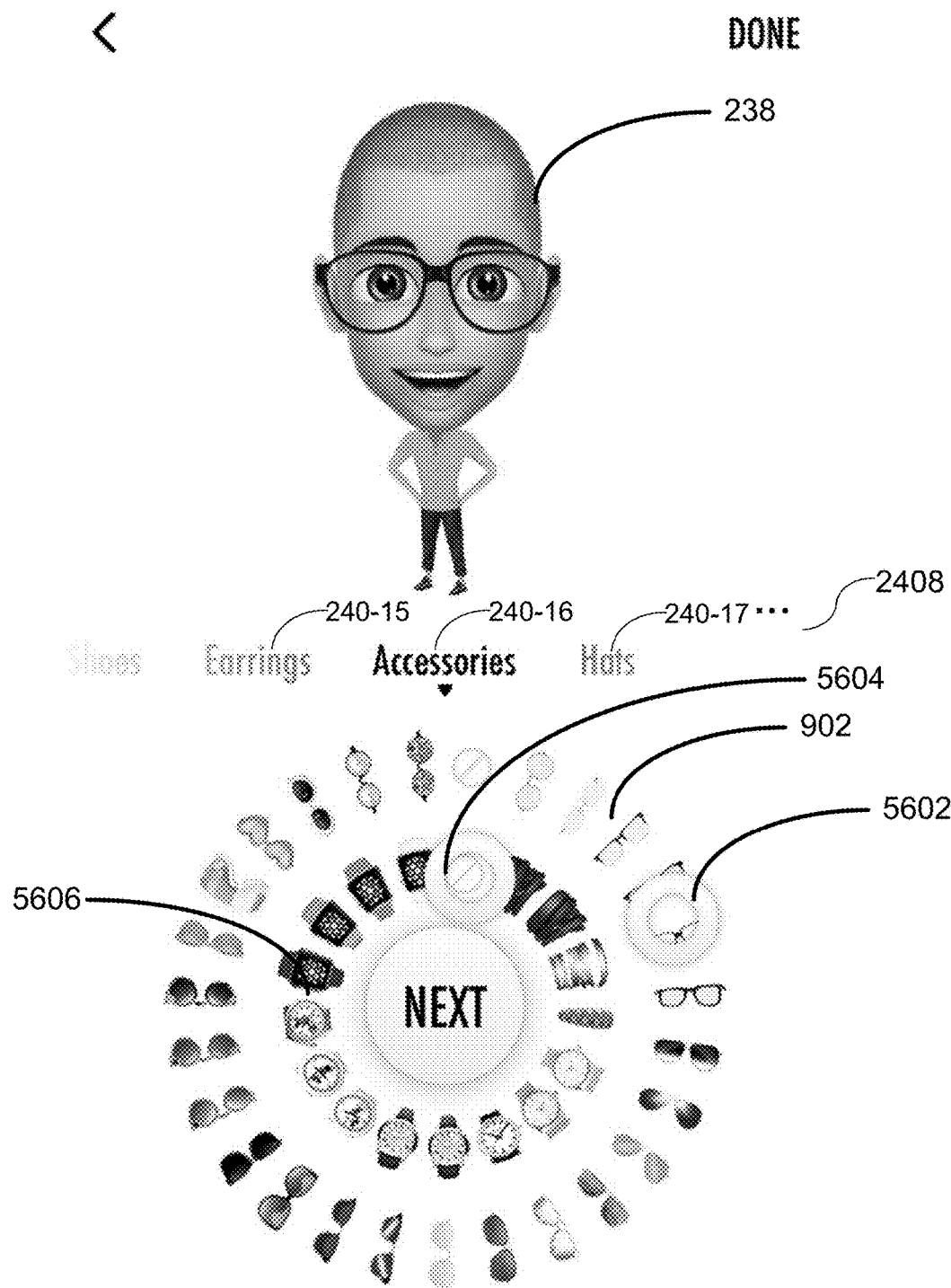
FIG. 56 illustrates concurrently displaying a first avatar, associated with a first user, a first closed form composer graphic, and a second closed form composer graphic on a display, where each different position on the first closed form composer graphic provides a different value for the trait first accessory type (e.g., glasses), and each different position of the second closed form composer graphic provides a different value for the trait second accessory type (e.g., watch), and where the user has selected a first position on the first closed form composer graphic and thus a first accessory of the first accessory type (e.g., first pair of glasses) worn by the avatar, and where the user has selected a first position on the second closed form composer graphic and thus a first accessory of the second accessory type (e.g., first watch) for the avatar in accordance with an embodiment of the present disclosure.
Figure 57:
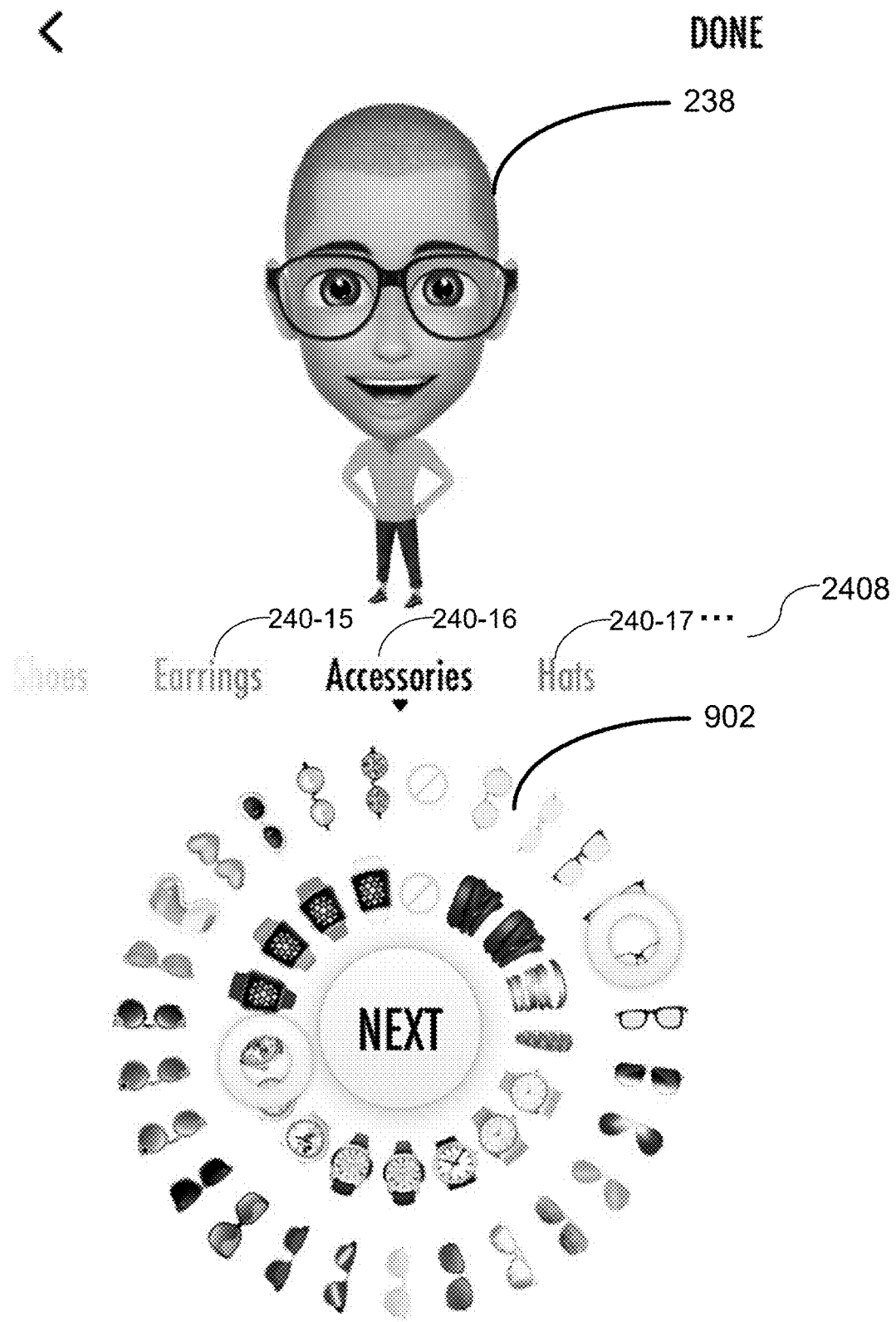
FIG. 57 illustrates concurrently displaying a first avatar, associated with a first user, a first closed form composer graphic, and a second closed form composer graphic on a display, where each different position on the first closed form composer graphic provides a different value for the trait first accessory type (e.g., glasses), and each different position of the second closed form composer graphic provides a different value for the trait second accessory type (e.g., watch), and where the user has selected a second position on the first closed form composer graphic and thus a second accessory of the first accessory type (e.g., second pair of glasses) worn by the avatar, and where the user has selected a second position on the second closed form composer graphic and thus a second accessory of the second accessory type (e.g., second watch) for the avatar in accordance with an embodiment of the present disclosure.
Figure 58:
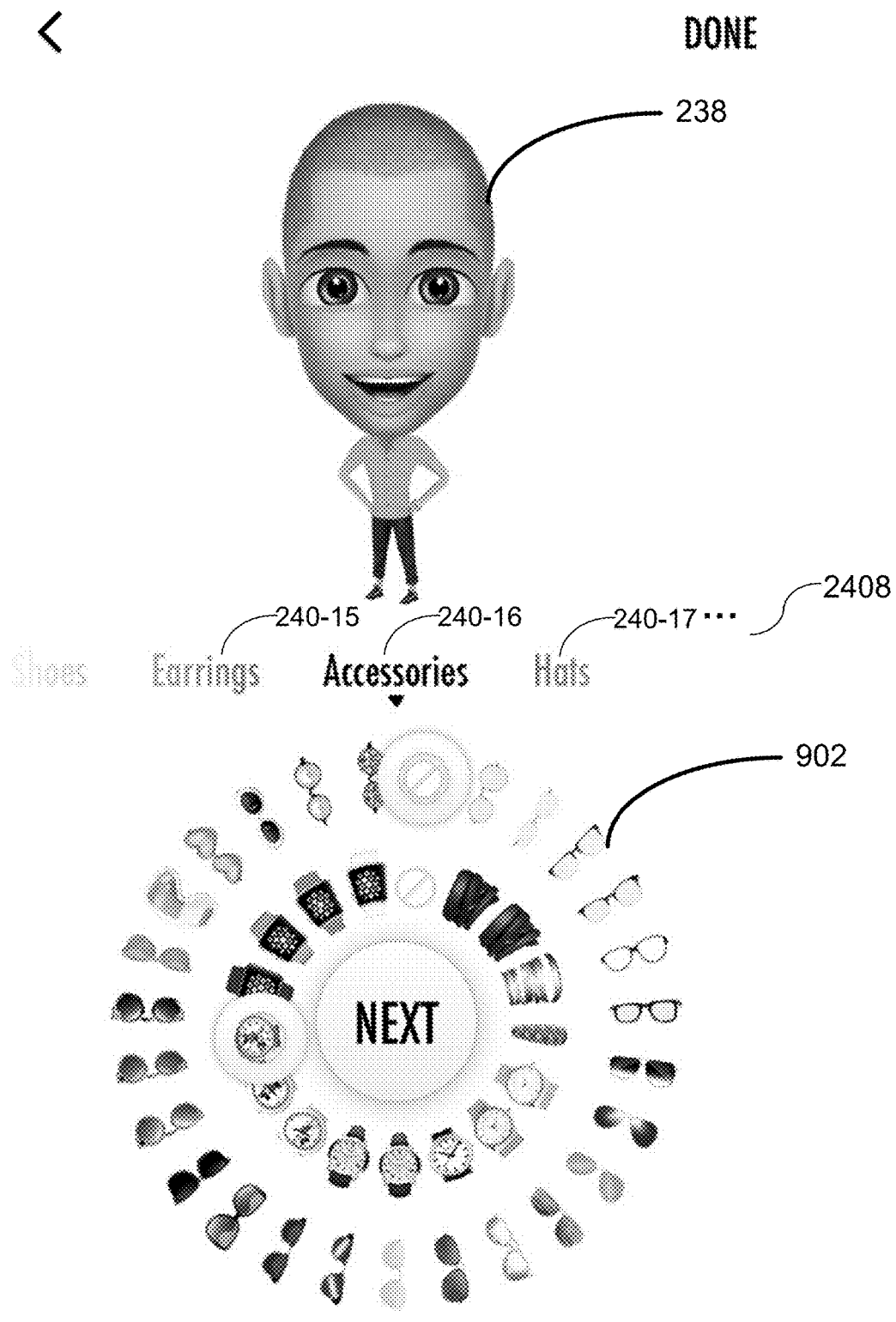
FIG. 58 illustrates concurrently displaying a first avatar, associated with a first user, a first closed form composer graphic, and a second closed form composer graphic on a display, where each different position on the first closed form composer graphic provides a different value for the trait first accessory type (e.g., glasses), and each different position of the second closed form composer graphic provides a different value for the trait second accessory type (e.g., watch), and where the user has selected a third position on the first closed form composer graphic and thus a third accessory of the first accessory type (e.g., second pair of glasses) worn by the avatar, and where the user has selected a third position on the second closed form composer graphic and thus a third accessory of the second accessory type (e.g., third watch) for the avatar in accordance with an embodiment of the present disclosure.

Referring to block 613A of FIG. 6B, and with reference to FIGS. 56-58, in some embodiments the first trait 240 is an accessory worn by the first avatar. In some such embodiments, the accessory is a pair of eye glasses, a watch, a pair of earphones, a pair of earmuffs, a scarf, a necklace, a mask, or a bracelet. As illustrated in FIGS. 56-58, the user can select a different pair of glasses using the drag handle 5602 to select a position on the first closed form computer graphic 902 that corresponds to the different pair of glasses. As illustrated in FIGS. 56-58, the user can select a different watch using the drag handle 5604 to select a position on the second closed form computer graphic 5606 that corresponds to the different watch. FIGS. 56-58 further illustrate concurrently displaying a first avatar 238, associated with a first user, a first closed form composer graphic 902, and a second closed form composer graphic 5606 on a display, where each different position on the first closed form composer graphic provides a different value for a first accessory type (e.g., glasses), and each different position of the second closed form composer graphic provides a different value for a second accessory type (e.g., watch), and where the user has selected a first position on the first closed form composer graphic 902 using drag handle 5602 and thus a first accessory of the first accessory type (e.g., first pair of glasses) worn by the first avatar, and where the user has selected a first position on the second closed form composer graphic 5606 using a second drag handle 5604 and thus a first accessory of the second accessory type (e.g., a first watch) for the avatar in accordance with an embodiment of the present disclosure.

Figure 51:
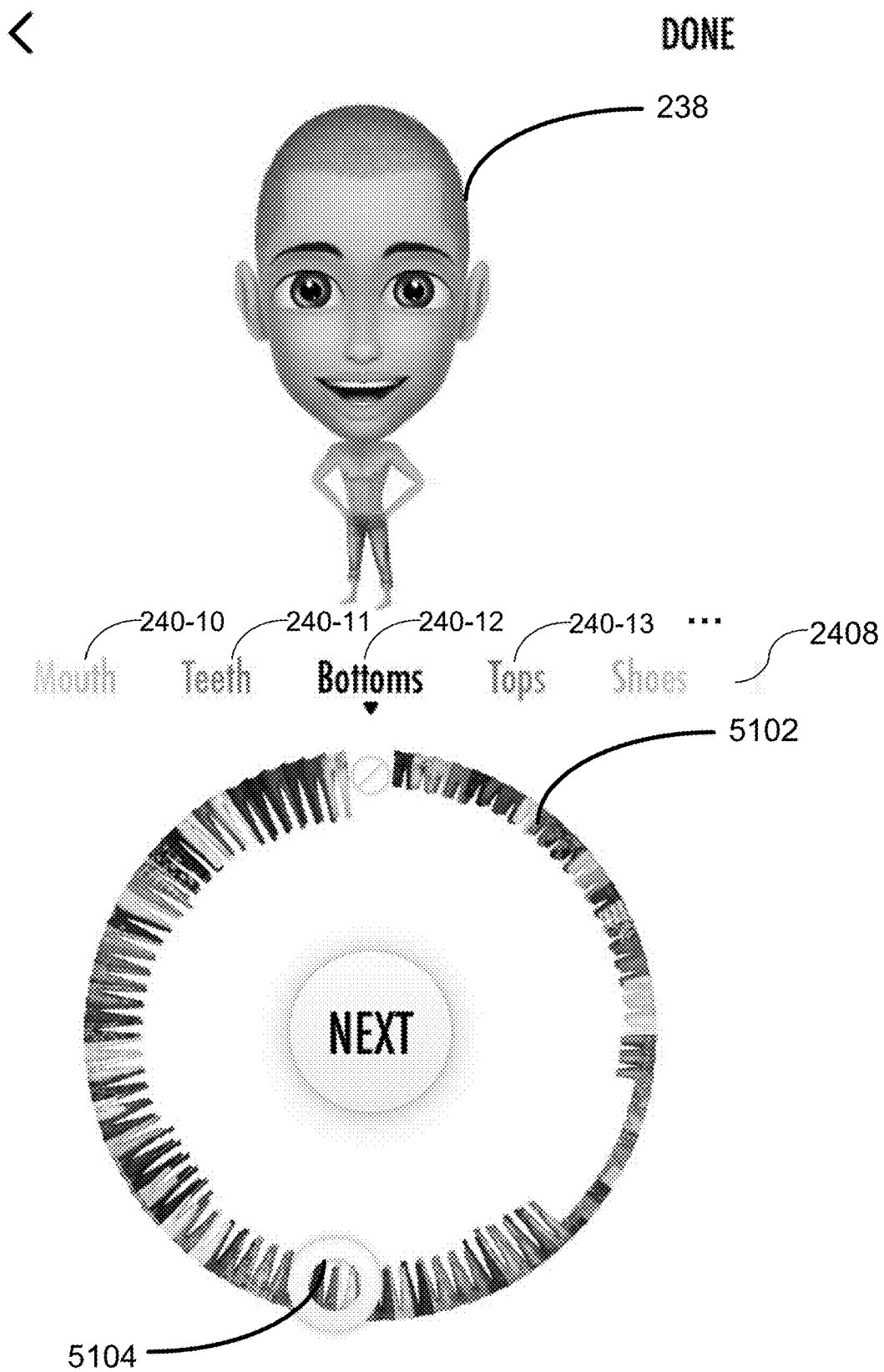
FIG. 51 illustrates concurrently displaying a first avatar, associated with a first user, and a first closed form composer graphic, on a display, where each different position on the first closed form composer graphic provides a different value for the trait a lower garment and where the user has selected a first position on the first closed form composer graphic and thus a first lower garment for the avatar in accordance with an embodiment of the present disclosure.
Figure 52:
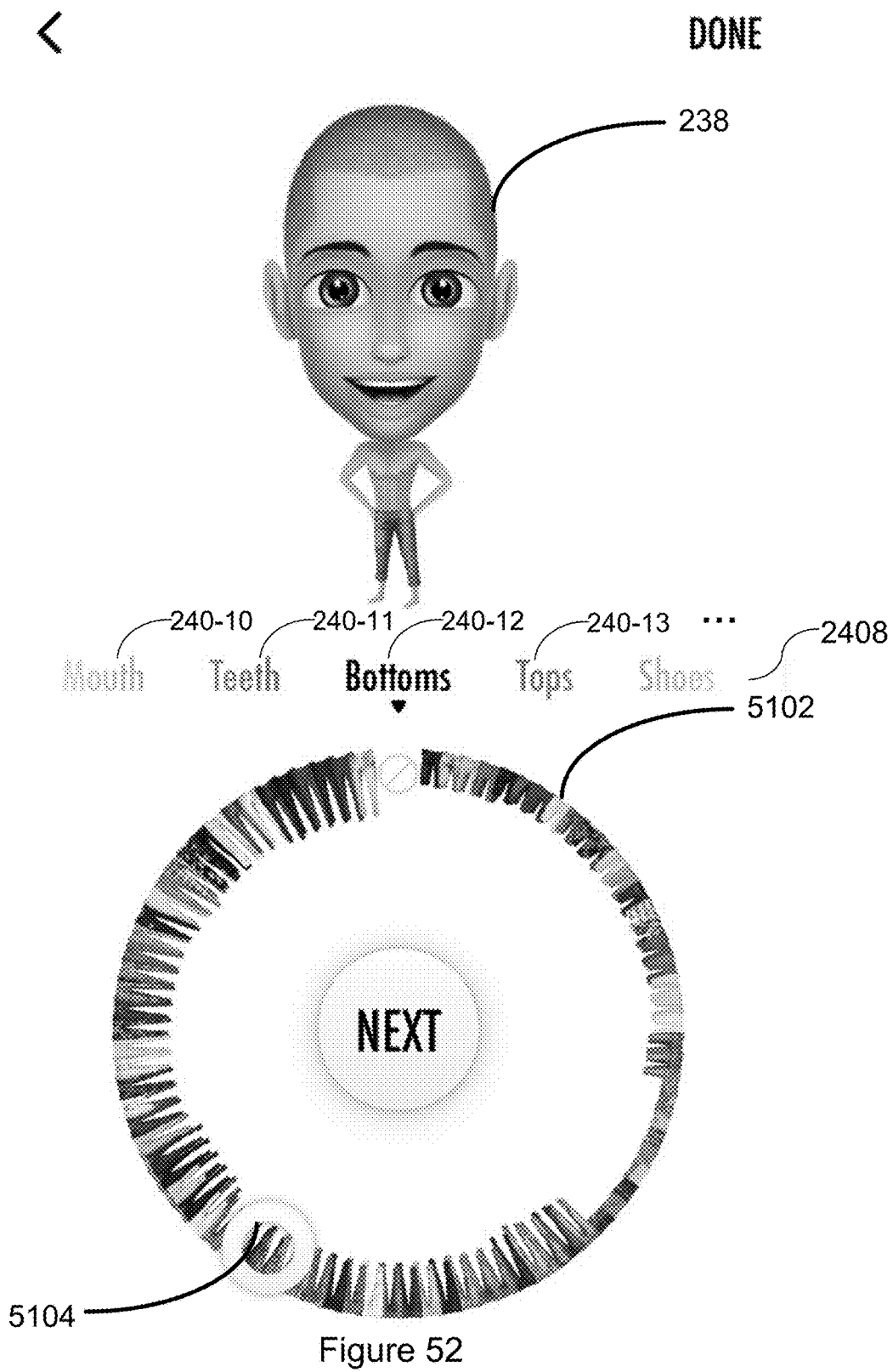
FIG. 52 illustrates concurrently displaying a first avatar, associated with a first user, and a first closed form composer graphic, on a display, where each different position on the first closed form composer graphic provides a different value for the trait a lower garment and where the user has selected a second position on the first closed form composer graphic and thus a second lower garment for the avatar in accordance with an embodiment of the present disclosure.

Referring to block 613B of FIG. 6B, as well as FIGS. 51-52, in some embodiments the first trait 240 is a lower garment. Non-limiting examples of lower garments include, but are limited to a pair of shorts, a pair of long pants, and a skirt. FIG. 51 illustrates concurrently displaying a first avatar 238, associated with a first user, and a first closed form composer graphic 5102, on a display, where each different position on the first closed form composer graphic 5102 provides a different value for a lower garment (e.g., a different lower garment from an enumerated set of lower garments) and where the user has selected a first position on the first closed form composer graphic 5102 using drag handle 5104 (e.g., by dragging the handle 5104 to the first position on the first closed form composer graphic 5102) and thus a first lower garment for the avatar in accordance with an embodiment of the present disclosure. In some embodiments the enumerated set of lower garments that is represented by the closed form composer graphic is between 10 and 200 lower garments, between 20 and 100 lower garments, or between 25 and 75 lower garments. In some embodiments a picture of each lower garment in the set of lower garments is displayed on the closed form graphic. That is, each respective lower garment in the set of lower garments is displayed at the corresponding position of the composer graphic that represents selection of the respective lower garment.

FIG. 52 illustrates concurrently displaying a first avatar 238, associated with a first user, and a first closed form composer graphic 5102, on a display, where each different position on the first closed form composer graphic 5102 provides a different value for the trait a lower garment (e.g., a different lower garment from an enumerated set of lower garments) and where the user has selected a second position on the first closed form composer graphic 5102 using drag handle 5104 (e.g., by dragging the handle 5104 to the first position on the first closed form composer graphic 5102) and thus a second lower garment for the first avatar in accordance with an embodiment of the present disclosure.

Figure 53:
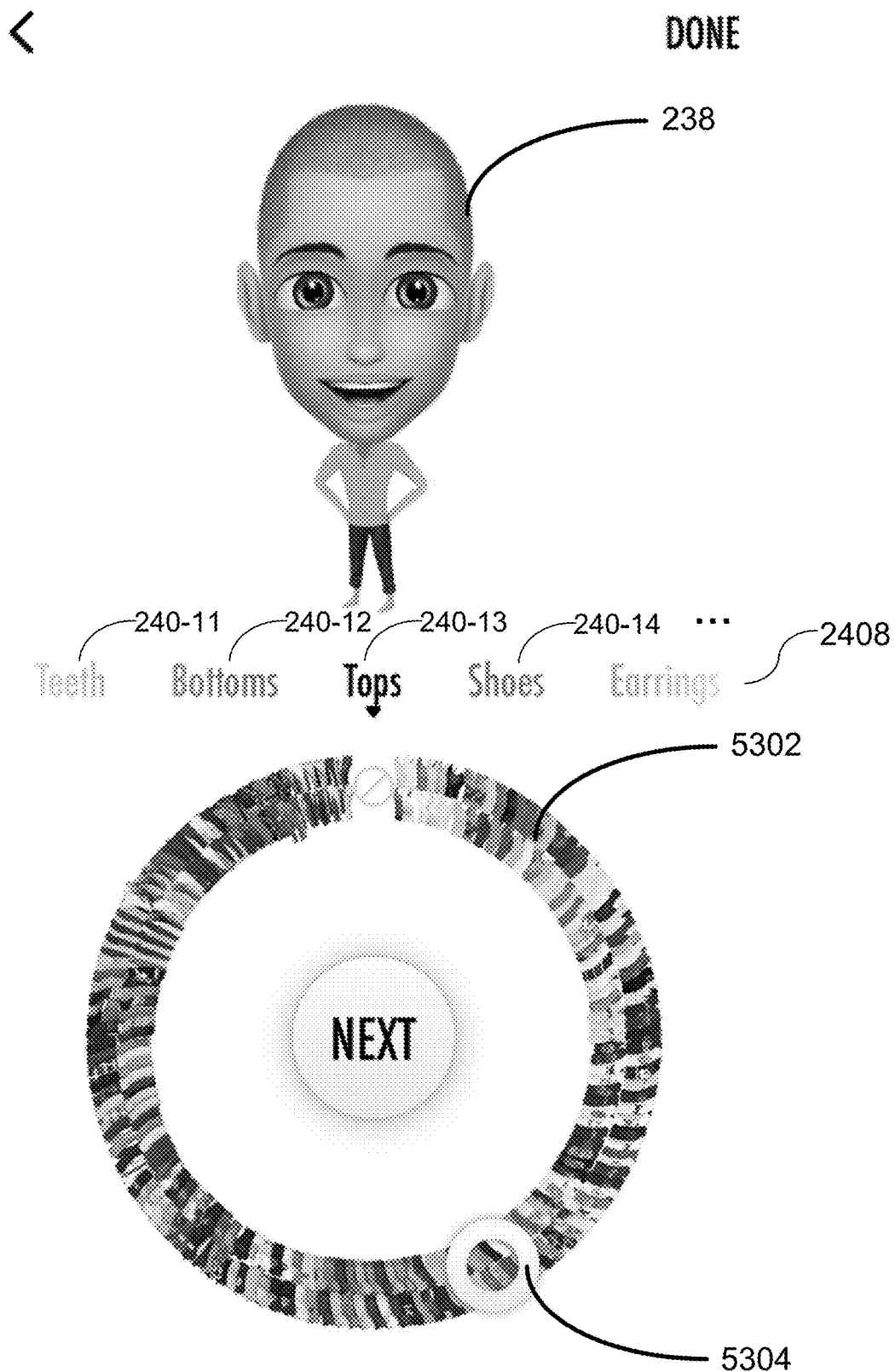
FIG. 53 illustrates concurrently displaying a first avatar, associated with a first user, and a first closed form composer graphic, on a display, where each different position on the first closed form composer graphic provides a different value for the trait an upper garment and where the user has selected a first position on the first closed form composer graphic and thus a first upper garment for the avatar in accordance with an embodiment of the present disclosure.

Referring to block 613C of FIG. 6B, as well as FIG. 53, in some embodiments the first trait 240 is an upper garment. Non-limiting examples of upper garments include, but are limited to a shirt, a vest, and a jacket. FIG. 53 illustrates concurrently displaying a first avatar 238, associated with a first user, and a first closed form 5302 composer graphic, on a display, where each different position on the first closed form composer graphic 5302 provides a different value for the trait an upper garment (e.g., a different upper garment from an enumerated set of upper garments) and where the user has selected a first position on the first closed form composer graphic 5302 using drag handle 5304 (e.g., by dragging the drag handle to the first position on the first closed form composer graphic 5302) and thus a first upper garment for the avatar in accordance with an embodiment of the present disclosure. In some embodiments the enumerated set of upper garments that is represented by the closed form composer graphic is between 10 and 200 upper garments, between 20 and 100 upper garments, or between 25 and 75 upper garments. In some embodiments a picture of each upper garment in the set of upper garments is displayed on the closed form graphic. That is, each respective upper garment in the set of upper garments is displayed at the corresponding position of the composer graphic that represents selection of the respective upper garment.

Referring to block 613D of FIG. 6B, in some embodiments the first trait 240 is one of height of the eyes on the face of the first avatar, an amount of face wrinkles, an amount of cheek indents/dimples on the first avatar, an amount of face pimples on the first avatar, a stomach thickness of the first avatar, an overall body height of the first avatar, an arm length of the first avatar, a leg length of the first avatar, a foot size of the first avatar, a height of the nose on the face of the first avatar, an absence or presence of a facial blush of the first avatar, an absence or presence of an eyeshadow of the first avatar, or an eye shadow color of the first avatar.

Referring to block 613E of FIG. 6B, in some embodiments the method further comprises receiving a selection of one or more topical categories from an enumerated plurality of topical categories (e.g., technology, politics, celebrities, culture, etc.). The one or more topical categories selections by the user are associated with the first avatar 238 that is, in turn associated with the user. Stated another way, in some embodiments, the user selects topical categories 248 that are of interest to the first user and these selected categories are stored in the user profile 246 of the user as illustrated in FIG. 2. In some embodiments, the user selects one category 248. In some embodiments, the user selects two or more categories, three or more categories or four or more categories. FIG. 8 illustrates an example user interface 802 used in some embodiments of client application to select from among the topical categories 248 "world events," "politics," "sports," Hollywood gossip," "Silicon Valley Tech," "Wall Street," "Music," "Culture," and "Humor." In such embodiments, with the selected categories in mind, if anything breaking happens within any of the categories 248 selected by the user, the user's avatar 238 will react to it as disclosed herein. For instance, in some embodiments, the user receives a number of communications 252, each of which is classified into one or more topical categories 248. For instance, if the user has indicated an interest in the category 248 "politics," each time a political event occurs, the user receives an electronic communication regarding the political event. The user selects one such electronic communication 252. In some embodiments, application server module 108 polls for such events on a recurring basis and, when such events are discovered, assigns a category to the topics 248 and, if the category matches those selected by the user, sends an electronic communication 252 to the client application 236 associated with a user across network 104. In some embodiments, the category of an electronic communication is assigned by the application server module 108 based upon the Internet source of the document. In some embodiments, pattern classification techniques are used to categorize the electronic communication (e.g., trained neural networks, support vector machines, cosine distance metrics, etc.). In some embodiments, an event is any one or more of topical news, human interest stories, social news, cultural news, and blend news. Non-limiting examples of topical news types include sports, politics, business, and cultural, etc. Non-limiting examples of topical news includes the announcement of President Trump firing the FBI director, the announcement of the Golden Gate Warriors winning a championship, the announcement of APPLE launching new IPHONE, the announcement of the winner of America's Got Talent shoe, the announcement of a song going platinum, etc. Non-limiting examples of human interest stories includes things to do over Labor Day weekend, the best food to eat on a weekend, and things to do when it rains. In typical embodiments, social news requires a user needs to authenticate with a participating social networking application such as FACEBOOK, INSTRAGRAM, etc. to get this type of news) and non-limiting examples of such news includes friend's birthdays, friend's relationship status changes, the user's relationship status changes, announcements when you have gotten more than X likes on a post, announcements regarding a friend that got a lot of FACEBOOK "likes" on a FACEBOOK post, announcements regarding which contact of the user got the most FACEBOOK "likes" in the past week etc. Non-limiting examples of cultural news includes announcements regarding "Taco Tuesday", "Hungover," etc. Blend news signifies stickers that are not based on topical news. In some embodiments, an event comprises a requested product placement. In some embodiments, an event comprises a sponsored or otherwise paid for posts.

Figure 6C:
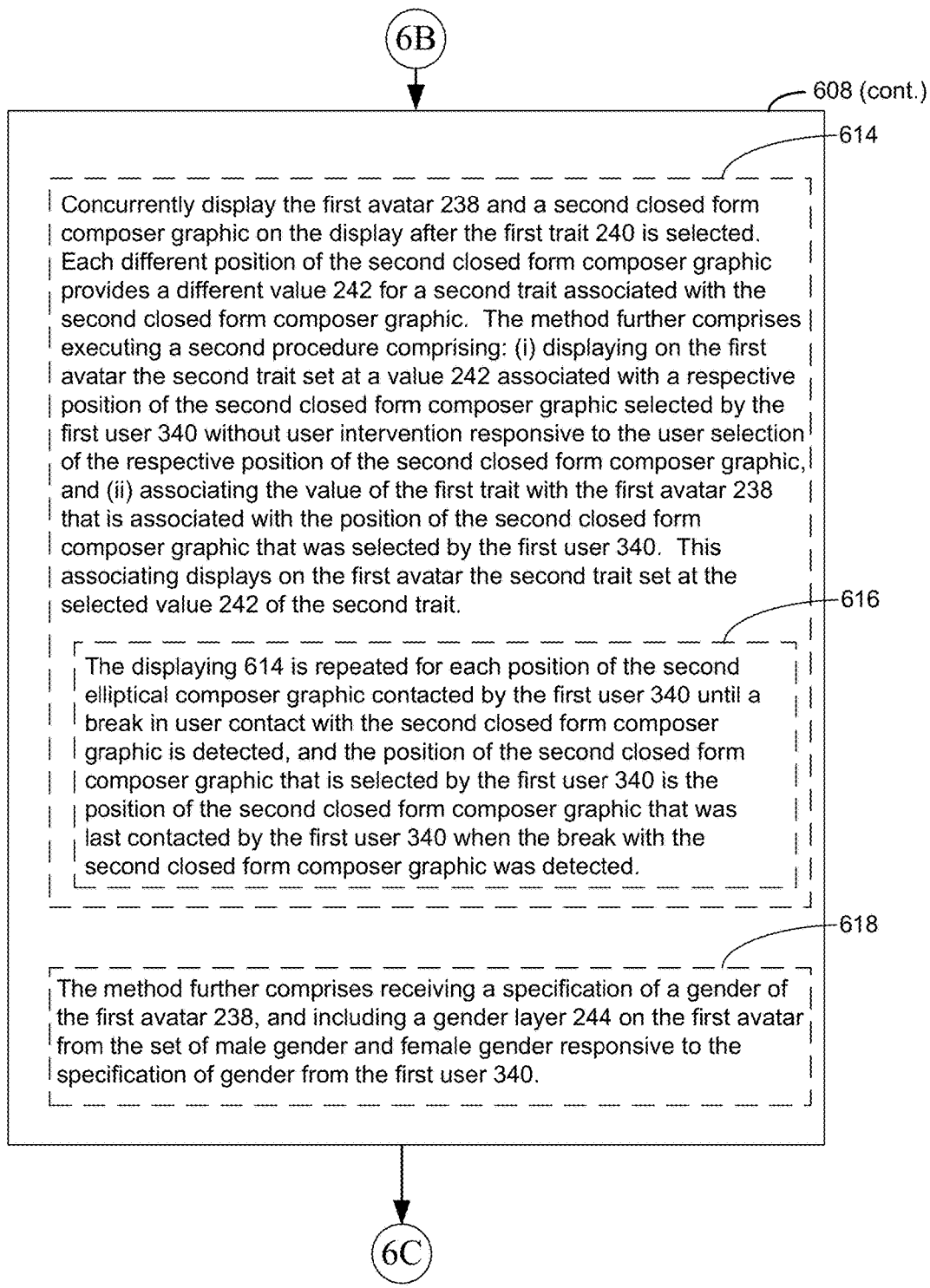
Figure 10:
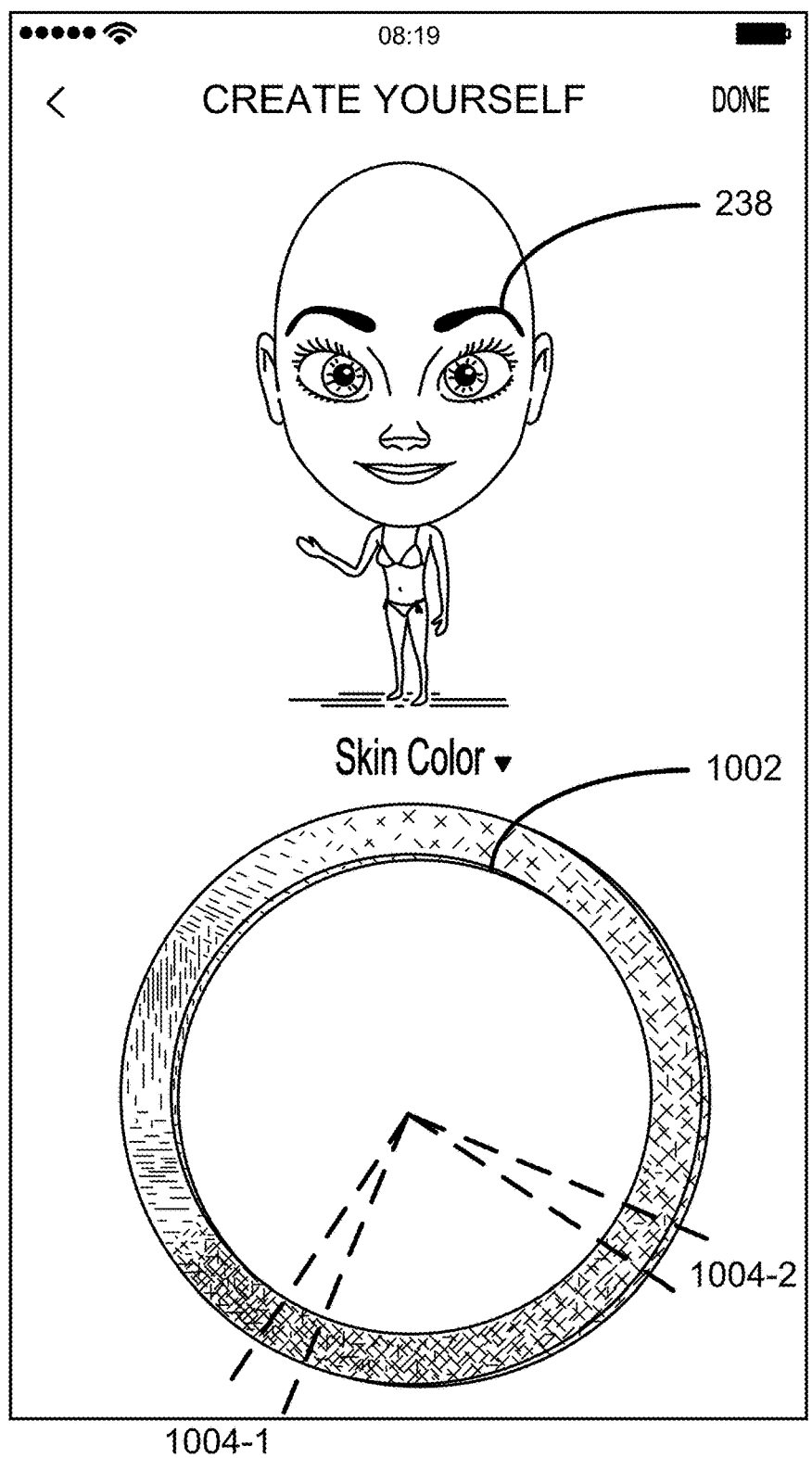
FIG. 10 illustrates concurrently displaying a first avatar and a second closed form graphic on a display, where each different position of the second closed form graphic provides a different value for skin color in accordance with some embodiments.
Figure 11:
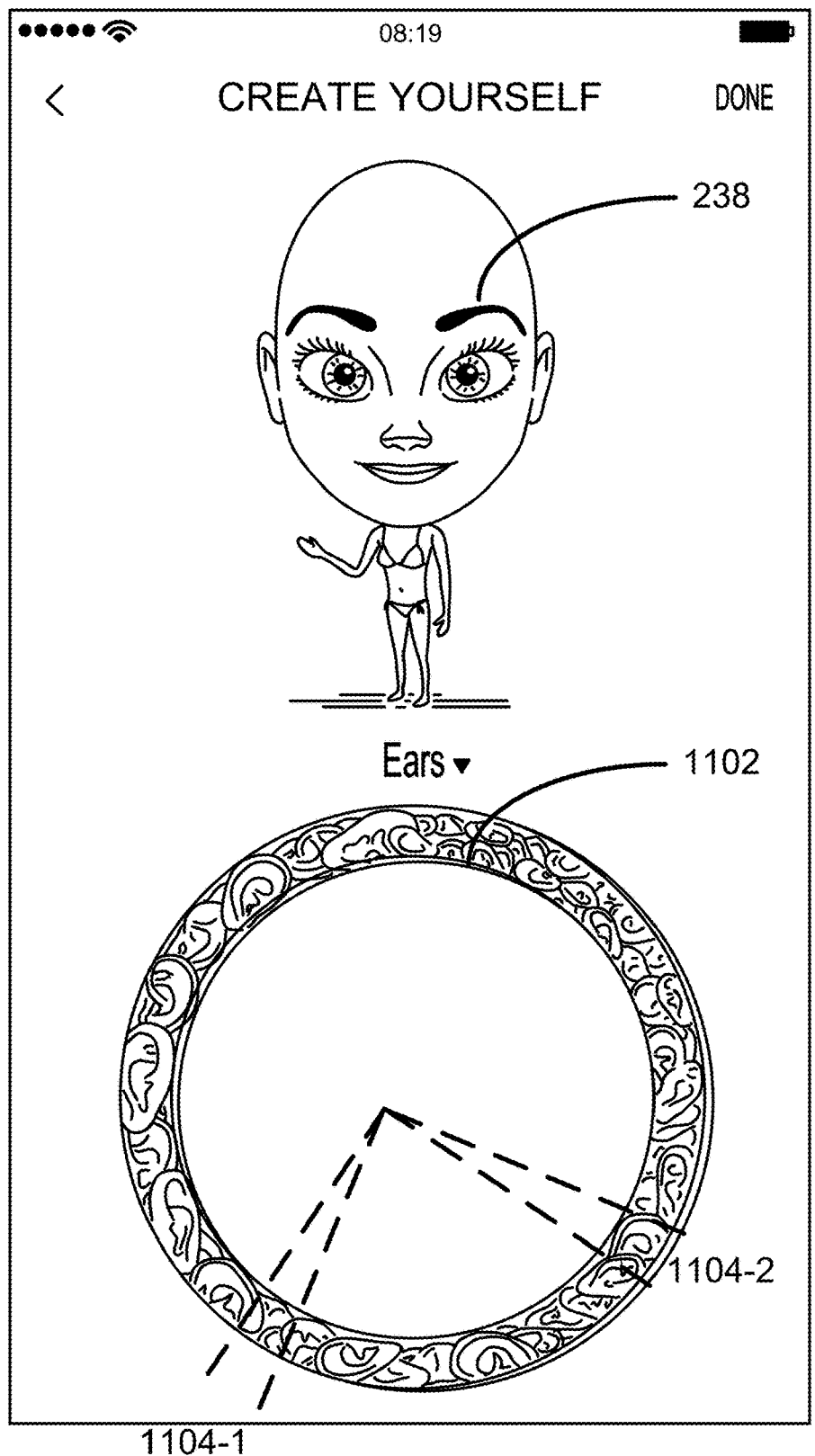
FIG. 11 illustrates concurrently displaying a first avatar and a second closed form graphic on a display, where each different position of the second closed form graphic provides a different value for ear style in accordance with some embodiments.

Referring to block 614 of FIG. 6C, in some embodiments the client application 236 concurrently displays the first avatar 238 and a second closed form composer graphic on the display after the first trait 240 is selected. FIG. 10 illustrates. In some embodiments the panel illustrated in FIG. 10 is immediately displayed after a user break in the panel displayed in FIG. 9 is detected. Each different position 1004 of the second closed form composer graphic 1002 provides a different value 242 for the trait "skin color" that is associated with the second closed form composer graphic 1002. As such, the second closed form composer graphic 1002 takes on properties that the user is applying to their avatar 238. So, if the user opens up the second closed form composer graphic 1002, the user can pick their skin color.

Figure 24:
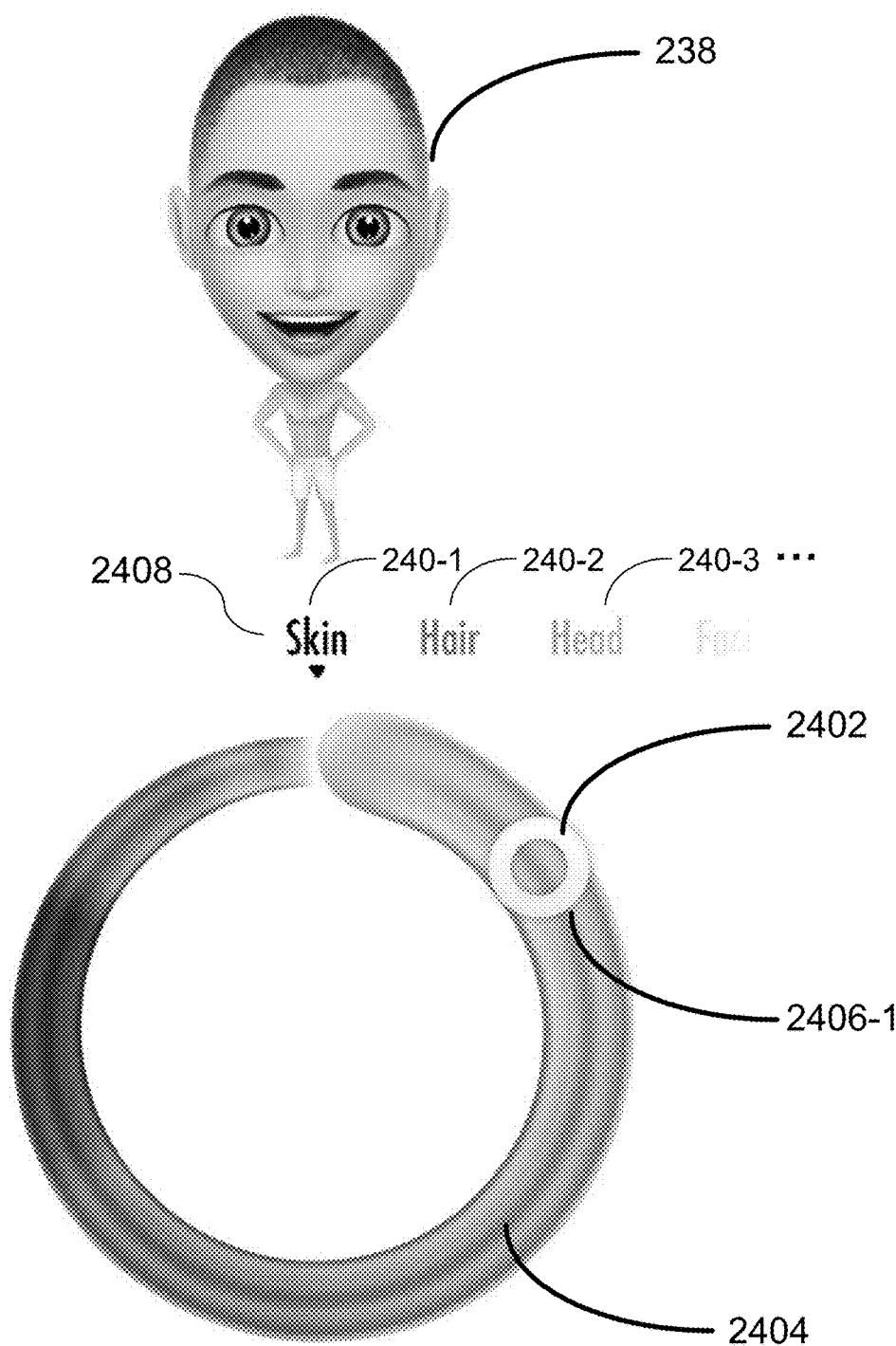
FIG. 24 illustrates concurrently displaying a first avatar, associated with a first user, and a closed form composer graphic on a display, where each different position on the closed form composer graphic provides a different value for the trait skin color in accordance, and where the user has selected a first position on the closed form composer graphic and thus a first skin color for the avatar, in accordance with an embodiment of the present disclosure.
Figure 25:
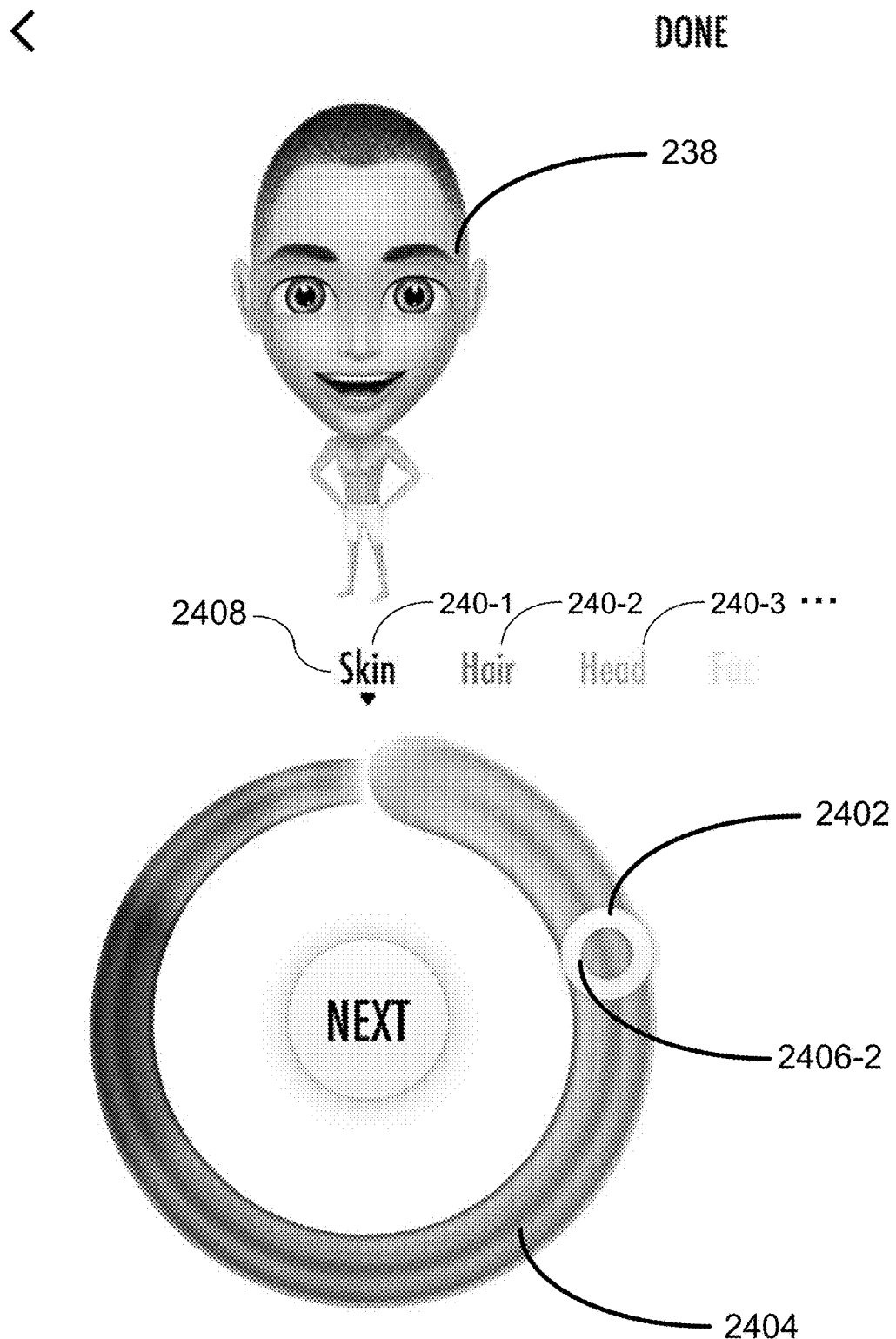
FIG. 25 illustrates concurrently displaying a first avatar, associated with a first user, and a closed form composer graphic on a display, where each different position on the closed form composer graphic provides a different value for the trait skin color, and where the user has selected a second position on the closed form composer graphic and thus a second skin color for the avatar, in accordance with an embodiment of the present disclosure.
Figure 26:
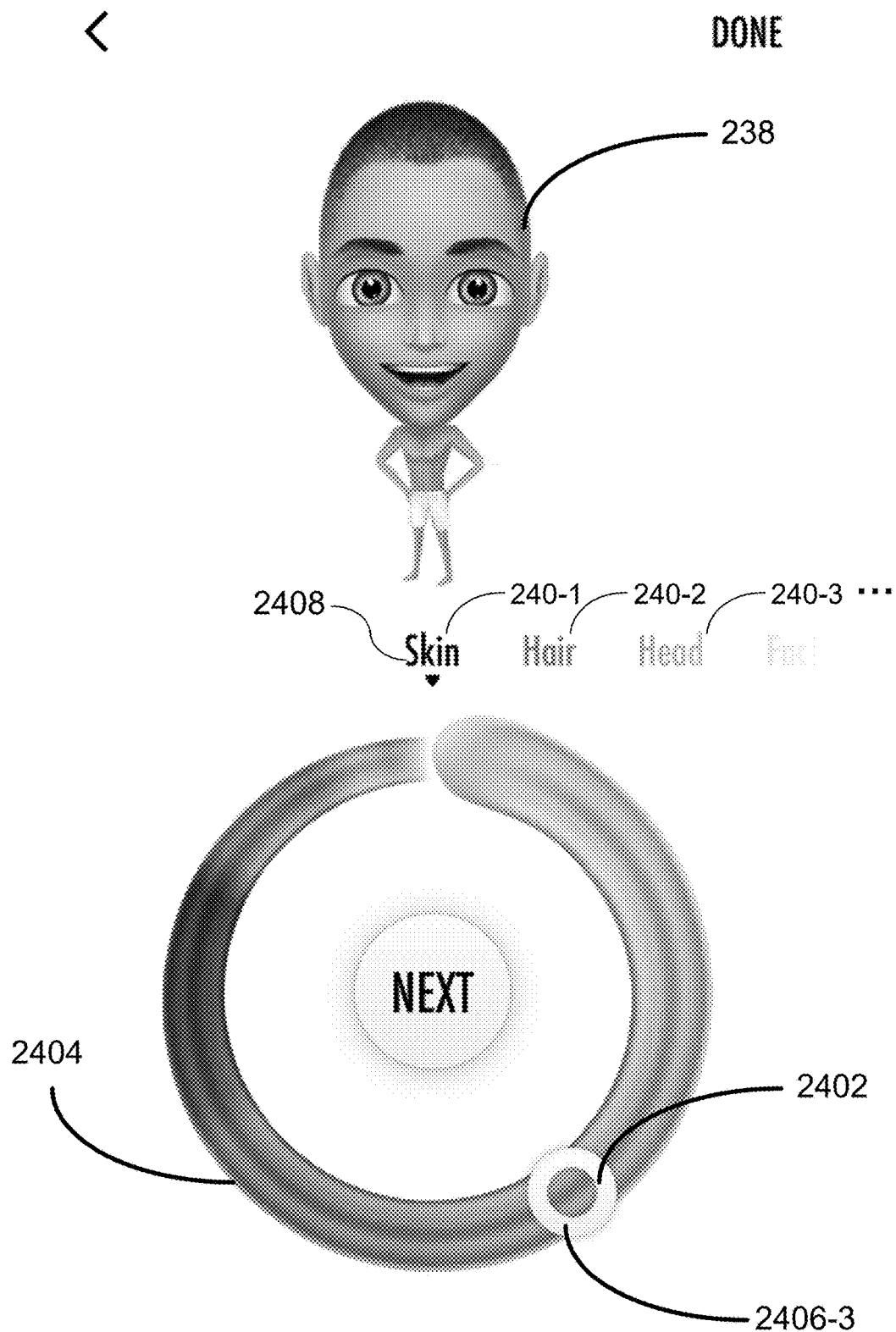
FIG. 26 illustrates concurrently displaying a first avatar, associated with a first user, and a closed form composer graphic on a display, where each different position on the closed form composer graphic provides a different value for the trait skin color, and where the user has selected a third position on the closed form composer graphic and thus a third skin color for the avatar, in accordance with an embodiment of the present disclosure.
Figure 27:
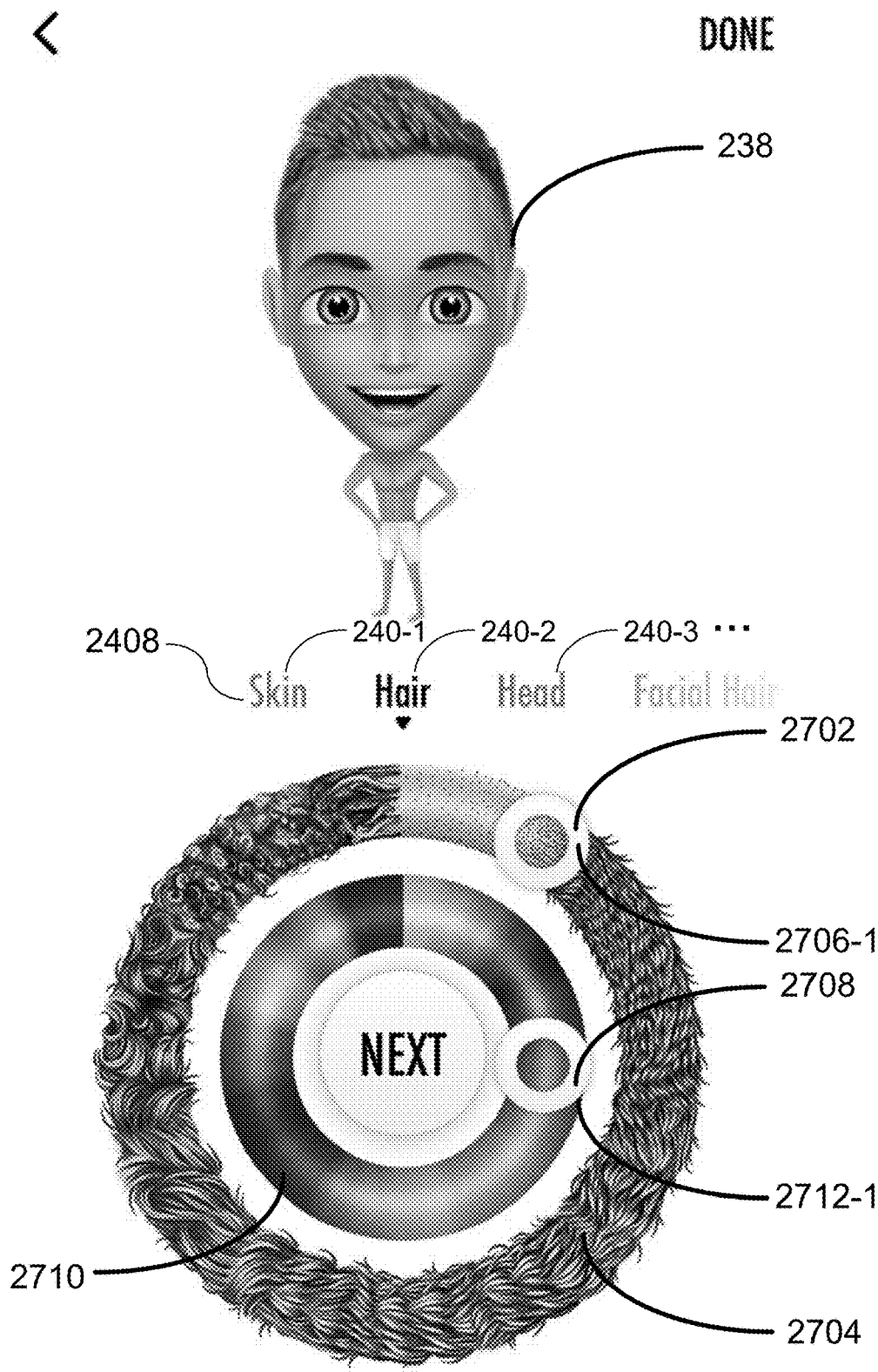
FIG. 27 illustrates concurrently displaying a first avatar, associated with a first user, a first closed form composer graphic, and a second closed form composer graphic on a display, where each different position on the first closed form composer graphic provides a different value for the trait hair style, and each different position of the second closed form composer graphic provides a different value for the trait hair color, and where the user has selected a first position on the first closed form composer graphic and thus a first hair style for the avatar, and where the user has selected a first position on the second closed form composer graphic and thus a first hair color for the avatar in accordance with an embodiment of the present disclosure.

In some embodiments, the client application 236 concurrently displays the first avatar 238 and a second closed form composer graphic on the display after a selection of this second closed form composer graphic has been selected. FIGS. 24-31 illustrate. FIG. 24 illustrates concurrently displaying a first avatar 238, associated with a first user, and a first closed form 2404 composer graphic, on a display, where each different position on the first closed form composer graphic 2404 provides a different value for the trait skin color and where the user has selected a first position on the first closed form composer graphic 2404 using drag handle 2402 (e.g., by dragging the drag handle to first position 2406-1 on the first closed form composer graphic 2404) and thus a first skin color for the avatar in accordance with an embodiment of the present disclosure. In some embodiments a depiction of the trait value of each respective position on the closed form graphic is displayed on the closed form graphic. That is, each respective skin color offered by the client application is displayed at the corresponding position of the composer graphic that represents selection of the respective value for the trait skin color. FIG. 25 illustrates concurrently displaying the first avatar 238, associated with the first user, and the closed form composer graphic 2404 on a display, where each different position on the closed form composer graphic 2404 provides a different value for the trait skin color, and where the user has selected a second position 2406-2 on the closed form composer graphic 2404 using drag handle 2402 and thus a second skin color for the first avatar 238, in accordance with an embodiment of the present disclosure. FIG. 26 illustrates concurrently displaying the first avatar 238 and the closed form composer graphic 2404 on a display, where each different position on the closed form composer graphic 2404 provides a different value for the trait skin color, and where the user has selected a third position 2406-3 using drag handle 2402 on the closed form composer graphic and thus a third skin color for the avatar, in accordance with an embodiment of the present disclosure. In such embodiments, the user can select a new trait 240 to customize using affordance 2408. Affordance 2408 includes a set of traits 240. Selection of any of these traits activates the corresponding closed form composer graphic for that trait. For instance, after selecting a skin color as illustrated in FIGS. 24 through 26, trait, a user may select trait hair 240-2 and thus activate the closed form composer graphic 2704 of FIG. 27. In some such embodiments, activating of the closed form composer graphic for the most recently selected trait in affordance 2408 causes the closed form composer graphic for the last trait 240 to be removed from the display and the closed form composer graphic for the newly selected last trait 240 to appear on the display 202 of the client device 102 associated with the user. In some such embodiments, along with activating of the closed form composer graphic for the most recently selected trait 408 in affordance 2408, the most recently selected trait 408 is bolded as illustrated in FIG. 27 so that the user can confirm that the correct trait has been selected. Correspondingly, the previous trait, which was previously bolded or otherwise emphasized as illustrated in FIGS. 24-26 is no longer bolded or otherwise emphasized. Thus, upon selection of the trait hair 240-2 in affordance 2408, process control transitions from FIG. 26 where the trait "skin" 240-1 was bolded or otherwise emphasized in affordance 2408 (e.g., larger point size, animated text, different color text, etc.) to FIG. 27 where the trait "hair" 240-2 is bolded or otherwise emphasized in affordance 2408. Moreover, the closed form composer graphic for the last trait 240-1 "skin color" is removed from the display and the closed form composer graphic for the newly selected trait 240-2 "hair length/hair color" appears on the display 202 of the client device 102 associated with the user.

Thus, FIG. 27 illustrates what happens within the client application 236 when the user has selected the hair trait 240-2 of the affordance 2408. In FIG. 27 the first avatar 238, a first closed form composer graphic 2704, and a second closed form composer graphic 2710 are concurrently depicted on a display. Each different position on the first closed form composer graphic 2704 provides a different value for the trait hair style/hair length, and each different position of the second closed form composer graphic 2710 provides a different value for the trait 240 hair color. In FIG. 27, the user has selected a first position 2706-1 using drag handle 2702 on the first closed form composer graphic 2404 and thus a first hair style 240-2 for the avatar. Further, the user has selected a first position 2712-1 on the second closed form composer graphic 2710 using drag handle 2708 and thus a first hair color for the avatar 238 in accordance with an embodiment of the present disclosure.

Figure 28:
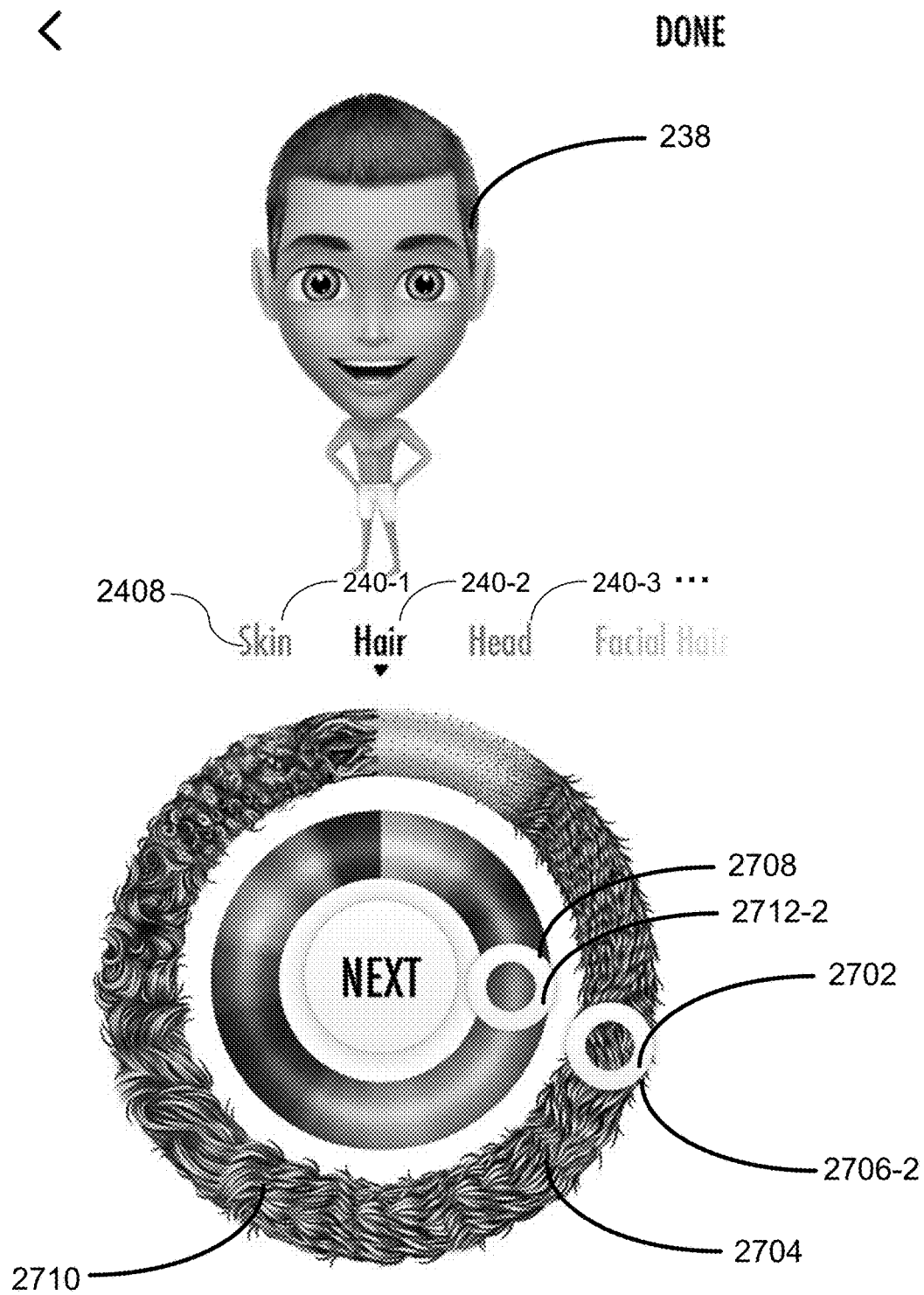
FIG. 28 illustrates concurrently displaying a first avatar, associated with a first user, a first closed form composer graphic, and a second closed form composer graphic on a display, where each different position on the first closed form composer graphic provides a different value for the trait hair style, and each different position of the second closed form composer graphic provides a different value for the trait hair color, and where the user has selected a second position on the first closed form composer graphic and thus a second hair style for the avatar, and where the user has selected a second position on the second closed form composer graphic and thus a second hair color for the avatar in accordance with an embodiment of the present disclosure.
Figure 29:
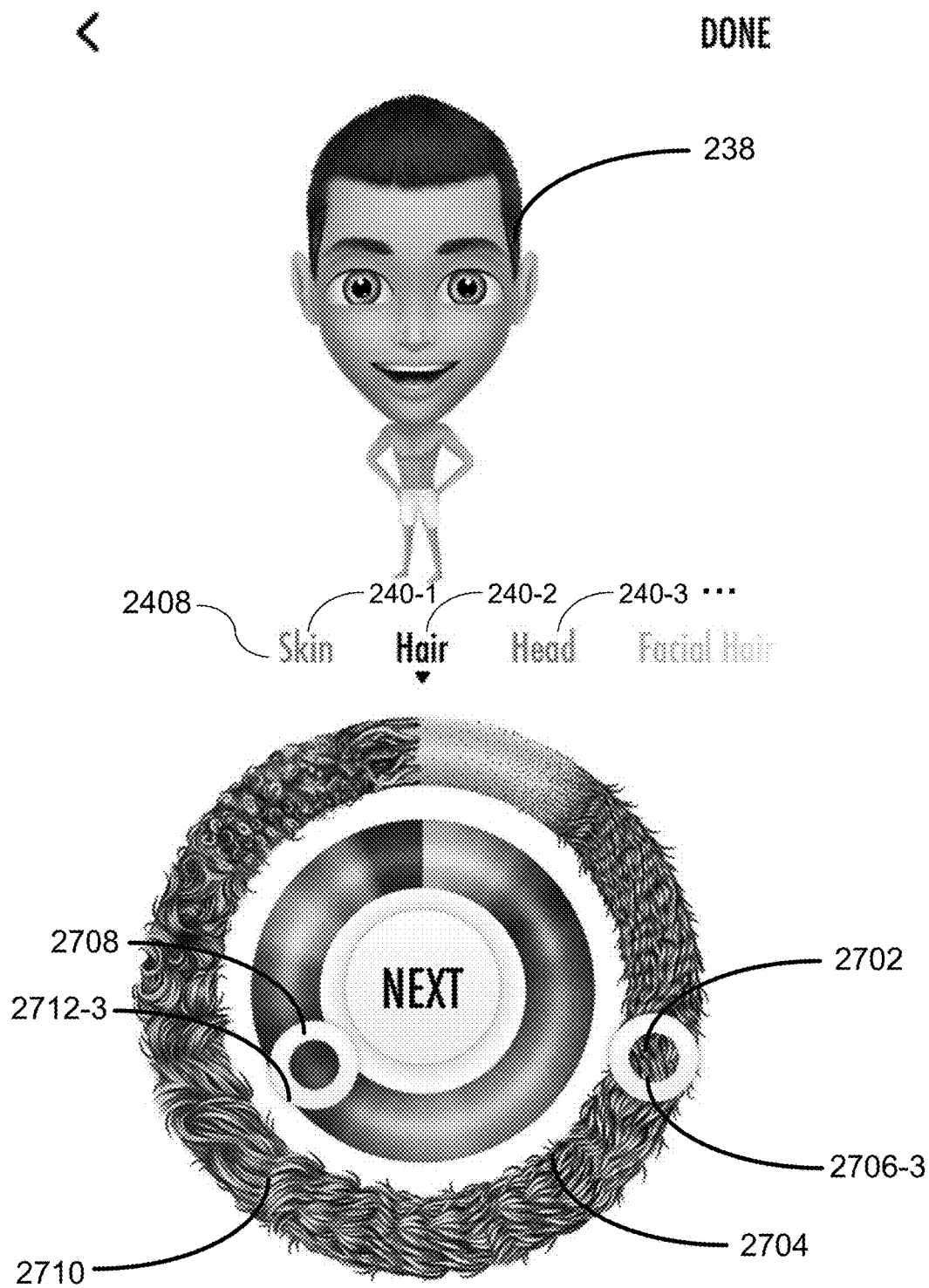
FIG. 29 illustrates concurrently displaying a first avatar, associated with a first user, a first closed form composer graphic, and a second closed form composer graphic on a display, where each different position on the first closed form composer graphic provides a different value for the trait hair style, and each different position of the second closed form composer graphic provides a different value for the trait hair color, and where the user has selected a third position on the first closed form composer graphic and thus a third hair style for the avatar, and where the user has selected a third position on the second closed form composer graphic and thus a third hair color for the avatar in accordance with an embodiment of the present disclosure.
Figure 30:
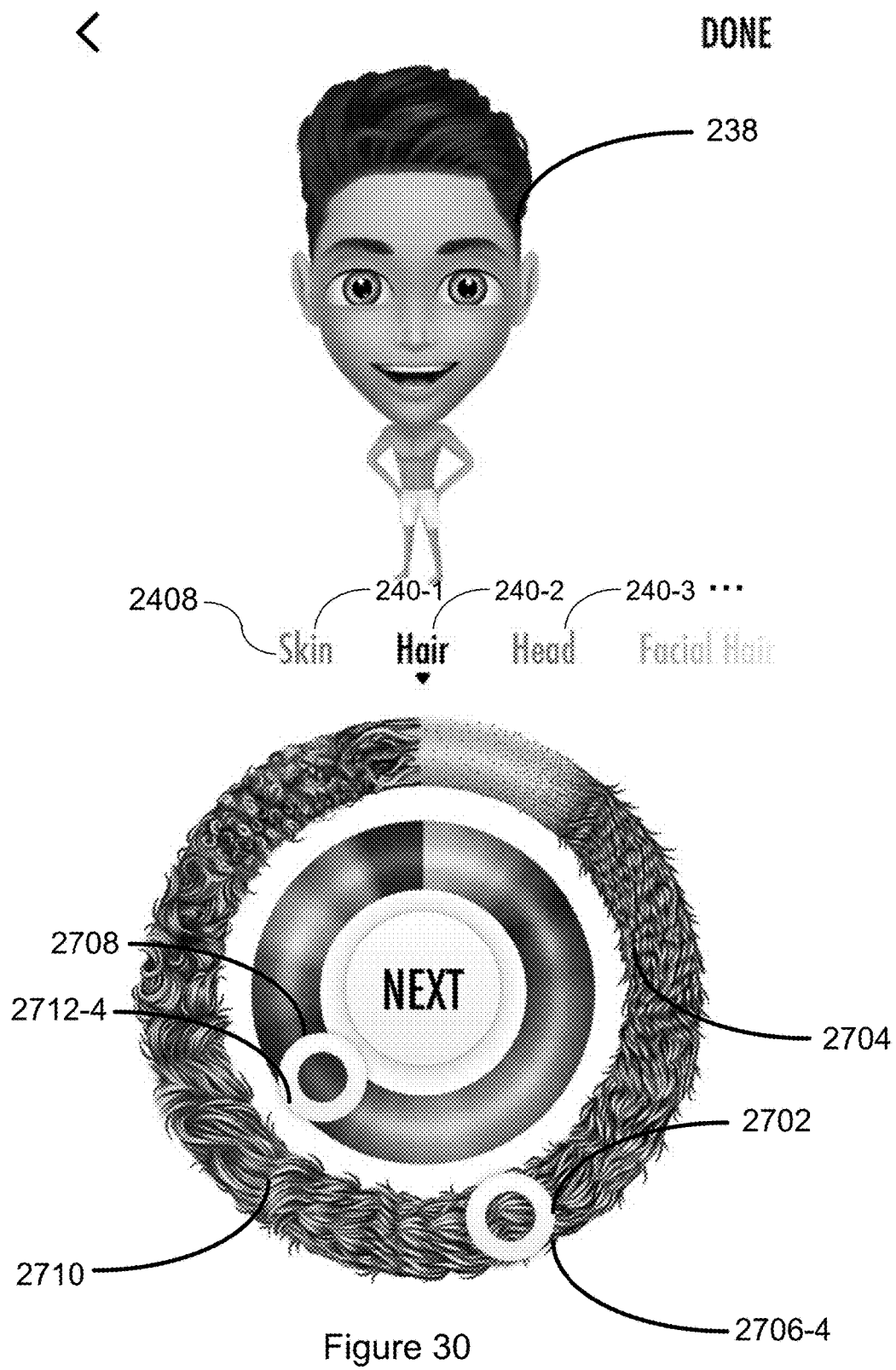
FIG. 30 illustrates concurrently displaying a first avatar, associated with a first user, a first closed form composer graphic, and a second closed form composer graphic on a display, where each different position on the first closed form composer graphic provides a different value for the trait hair style, and each different position of the second closed form composer graphic provides a different value for the trait hair color, and where the user has selected a fourth position on the first closed form composer graphic and thus a fourth hair style for the avatar, and where the user has selected a fourth position on the second closed form composer graphic and thus a fourth hair color for the avatar in accordance with an embodiment of the present disclosure.
Figure 31:
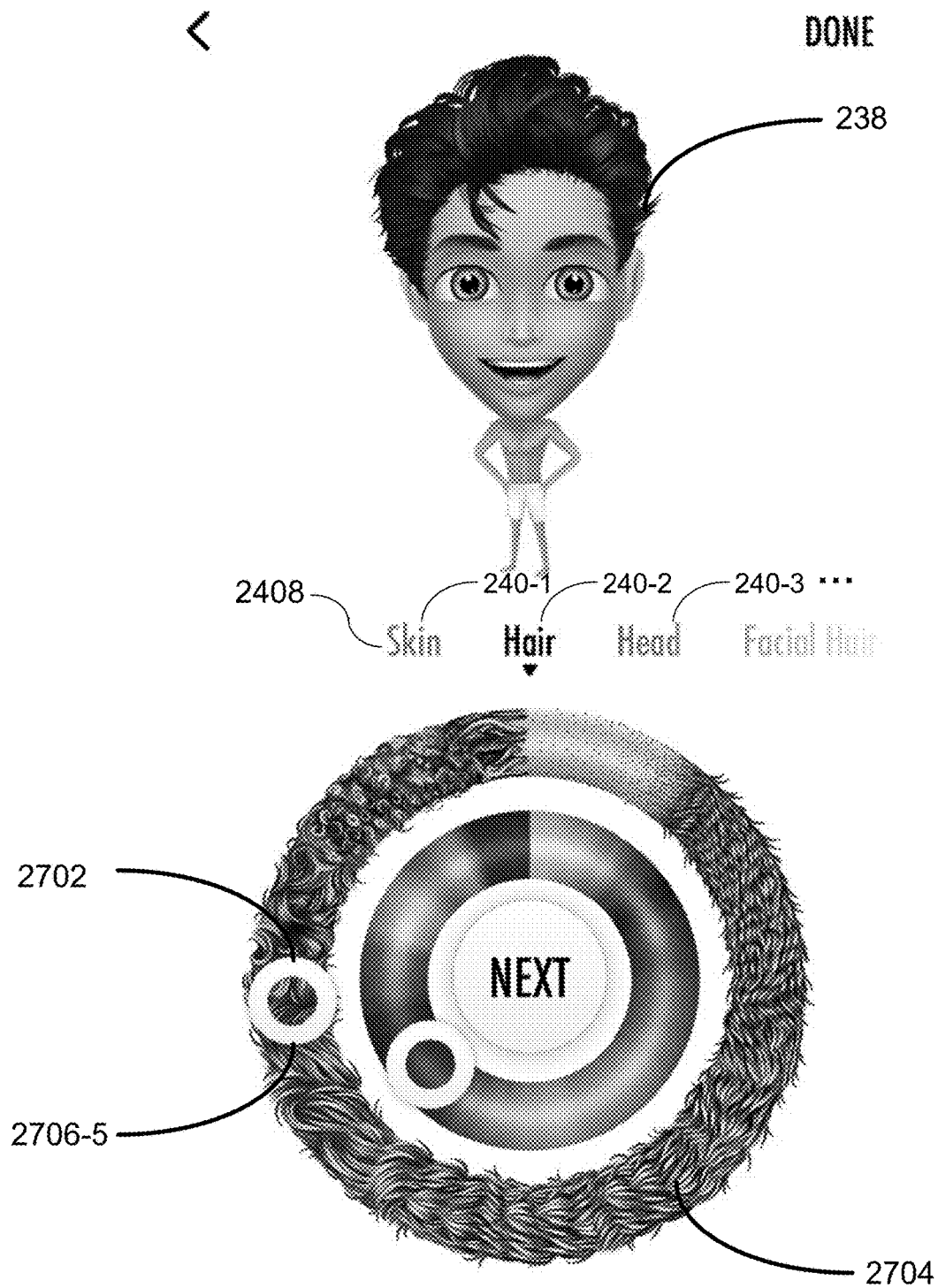
FIG. 31 illustrates concurrently displaying a first avatar, associated with a first user, a first closed form composer graphic, and a second closed form composer graphic on a display, where each different position on the first closed form composer graphic provides a different value for the trait hair style, and each different position of the second closed form composer graphic provides a different value for the trait hair color, and where the user has selected a fifth position on the first closed form composer graphic and thus a fifth hair style for the avatar, and where the user has selected a fifth position on the second closed form composer graphic and thus a fifth hair color for the avatar in accordance with an embodiment of the present disclosure.
Figure 32:
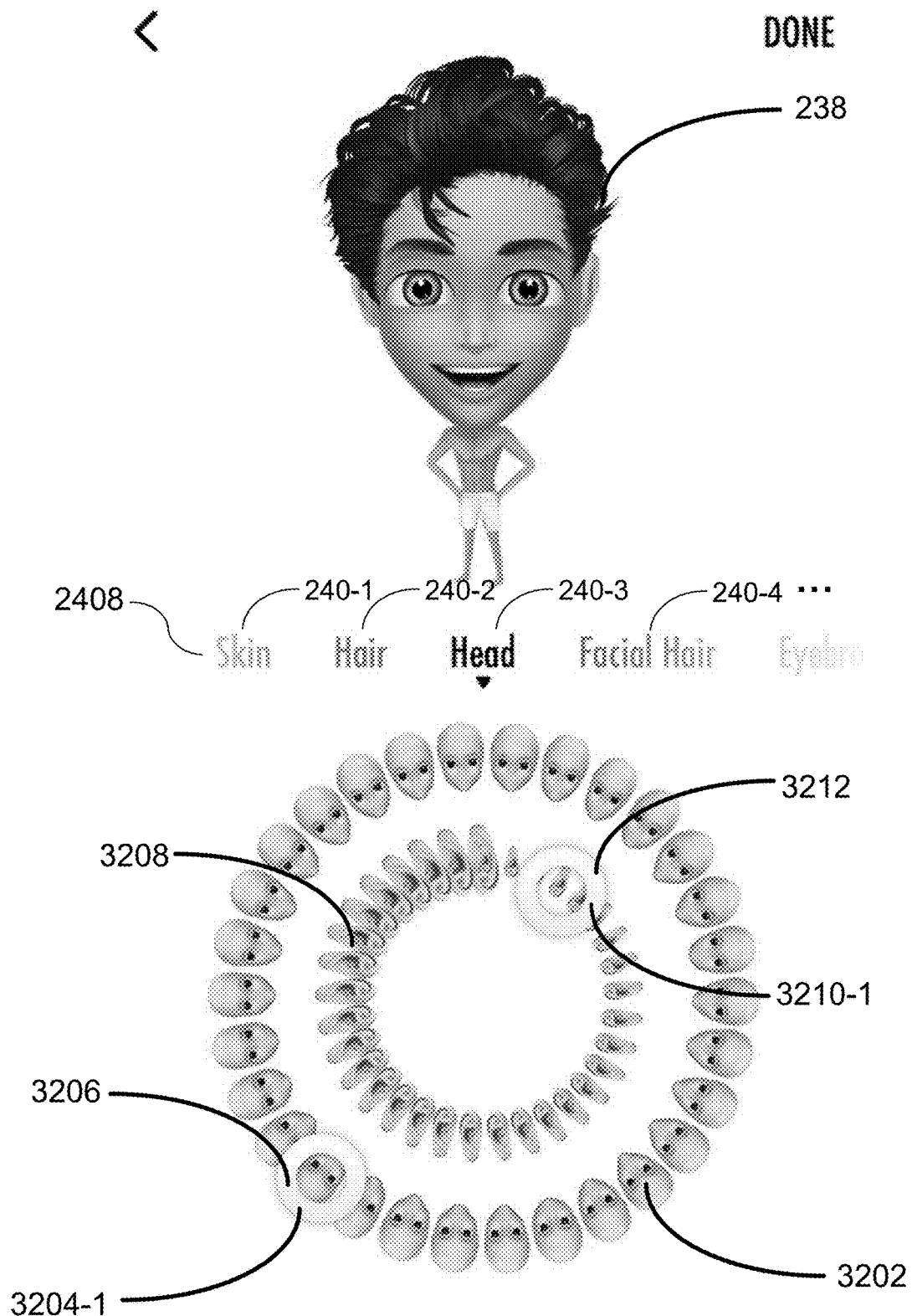
FIG. 32 illustrates concurrently displaying a first avatar, associated with a first user, a first closed form composer graphic, and a second closed form composer graphic on a display, where each different position on the first closed form composer graphic provides a different value for the trait head shape, and each different portion of the second closed form composer graphic provides a different value for the trait ear size, and where the user has selected a first position on the first closed form composer graphic and thus a first head shape for the avatar, and where the user has selected a first position on the second closed form composer graphic and thus a first ear size for the avatar in accordance with an embodiment of the present disclosure.

FIG. 28 illustrates concurrently displaying the first avatar, the first closed form composer graphic 2704, and the second closed form composer graphic 2710 on the display. Each different position on the first closed form composer graphic 2704 provides a different value for the trait hair style. Each different portion of the second closed form composer graphic 2710 provides a different value for the trait hair color. In FIG. 28, the user has selected a second position 2706-2 on the first closed form composer graphic 2704 using drag handle 2702 and thus a second hair style for the avatar. The user has selected a second position 2712-2 on the second closed form composer graphic 2710 using drag handle 2708 and thus a second hair color for the avatar 238. FIG. 29 illustrates concurrently displaying the first avatar 238, a first closed form composer graphic 2704, and a second closed form composer graphic 2710 on a display. Each different position on the first closed form composer graphic 2704 provides a different value for the trait hair style. Each different portion of the second closed form composer graphic 2710 provides a different value for the trait hair color. The user has selected a third position 2706-3 on the first closed form composer graphic 2704 using drag handle 2702 and thus a third hair style for the avatar. The user has selected a third position 2712-3 on the second closed form composer graphic 2710 using drag handle 2708 and thus a third hair color for the avatar in accordance with an embodiment of the present disclosure. FIG. 30 illustrates concurrently displaying a first avatar, associated with a first user, a first closed form composer graphic 2704 and a second closed form composer graphic 2710 on a display. Each different position on the first closed form composer graphic 2704 provides a different value for the trait hair style. Each different portion of the second closed form composer graphic 2710 provides a different value for the trait hair color. The user has selected a fourth position 2706-4 on the first closed form composer graphic 2704 using drag handle 2702 and thus a fourth hair style for the avatar. The user has selected a fourth position 2712-4 on the second closed form composer graphic 2710 using drag handle 2708 and thus a fourth hair color for the avatar. FIG. 31 similarly illustrates selecting a fifth position 2706-5 on the first closed form composer graphic 2704 using drag handle 2702 and thus a fifth hair style for the avatar.

In some embodiments the panel illustrated in FIG. 10 is immediately displayed after a user break in the panel displayed in FIG. 9 is detected. Each different position 1004 of the second closed form composer graphic 1002 provides a different value 242 for the trait "skin color" that is associated with the second closed form composer graphic 1002. As such, the second closed form composer graphic 1002 takes on properties that the user is applying to their avatar 238. So, if the user opens up the second closed form composer graphic 1002, the user can pick their skin color. In alternative embodiments, illustrated in FIGS. 24 through 59, the user makes use of affordance 2408 to select a different trait to customize. Moreover, in some embodiments the user can drag along the affordance 2408 to display different traits 240 to customize as illustrated in FIGS. 24 through 59.

In the embodiment illustrated in FIGS. 10 and 24-26, the first 75% of the illustrated closed form composer graphic has various shades of human colors. Further, the illustrated closed form composer graphic provides more fun colors on the left top. So, if the user slides their finger around the closed from composer graphic, the avatar 238 will be updated to instantly change to the skin color corresponding to the position of the closed form composer graphic 1002 currently being touched by the user. As such, the method further comprises executing a second procedure comprising: (i) displaying on the first avatar a second trait set at a value 242 associated with a respective position of the second closed from composer graphic selected by the first user 340 (e.g., using a drag handle) without user intervention responsive to the user selection of the respective position of the second closed form composer graphic, and (ii) associating the value of the second trait with the first avatar 238 that is associated with the position of the second closed form composer graphic that was selected by the first user 340. This associating displays on the first avatar the second trait set at the selected value 242 of the second trait. Thus, in some embodiments, referring to FIG. 10 as well as FIGS. 24-26, the user drags a finger along the second closed from composer graphic (e.g., in a clockwise or counterclockwise fashion) and as they do the skin color on the avatar 238 is changed to match the position of the second closed form composer graphic they are touching. Once the user stops touching the composer graphic the value 242 of the second trait 240 that is at the position of the second closed from composer graphic last touched by the user before the second break is associated with the first avatar 238. This associating results in the display on the first avatar 238 of the second trait 240 set at the value 242 of the second trait 240 associated with the position of the second composer graphic that was last contacted by the first user 340 when the second break was detected.

Referring to FIG. 11 and FIGS. 32-35, in some embodiments, responsive to detection of the second break (or by use of an affordance such as the affordance 2408 illustrated in FIGS. 32-35), the first avatar 238 and a third composer graphic (e.g. composer graphic 1102 of FIG. 11 or composer graphic 3208 of FIGS. 32-35) are concurrently displayed on the display. Each different position of the third composer graphic 1102/3208 provides a different value 242 for a third trait 240 (e.g., "ear size") associated with the third composer graphic. In accordance with such embodiments, a third procedure is executed that comprises (i) displaying on the first avatar 238 the third trait 240 set at a value 242 associated with a respective position 1104/3210-1 of the third composer graphic selected by the user 340 responsive to the user selection of the respective position of the third composer graphic (e.g., by using drag handle 3212), (ii)

repeating the displaying (i) for each position of the third composer graphic 1102/3208 contacted by the first user 340 until a third break in user contact with the third composer graphic 1102 is detected, where the repeating occurs at least one time, and (iii) associating the value 242 of the third trait 240 with the first avatar 238 that is associated with the position of the third composer graphic 1102/3208 that was last contacted by the first user 340 when the third break was detected. Thus, in some embodiments, the user drags a finger along the third composer graphic 1102/3208 (e.g., in a clockwise or counterclockwise fashion, and for instance in the embodiment illustrated in FIGS. 32-34 using drag handle 3212) and as they do the ear size on the avatar 238 is changed to match the position 1104 of the third composer graphic 1104 they are touching. Once the user stops touching the third composer graphic the value 242 of the third trait 240 and/or selects a new trait 240 in affordance 2408, the position of the third composer graphic 1102/3208 last touched by the user before the third break is associated with the first avatar 238. This associating results in the display on the first avatar 238 of the third trait 240 set at the value 242 of the third trait 240 associated with the position of the third composer graphic 1102/3208 that was last contacted by the first user 340 when the third break was detected.

Figure 33:
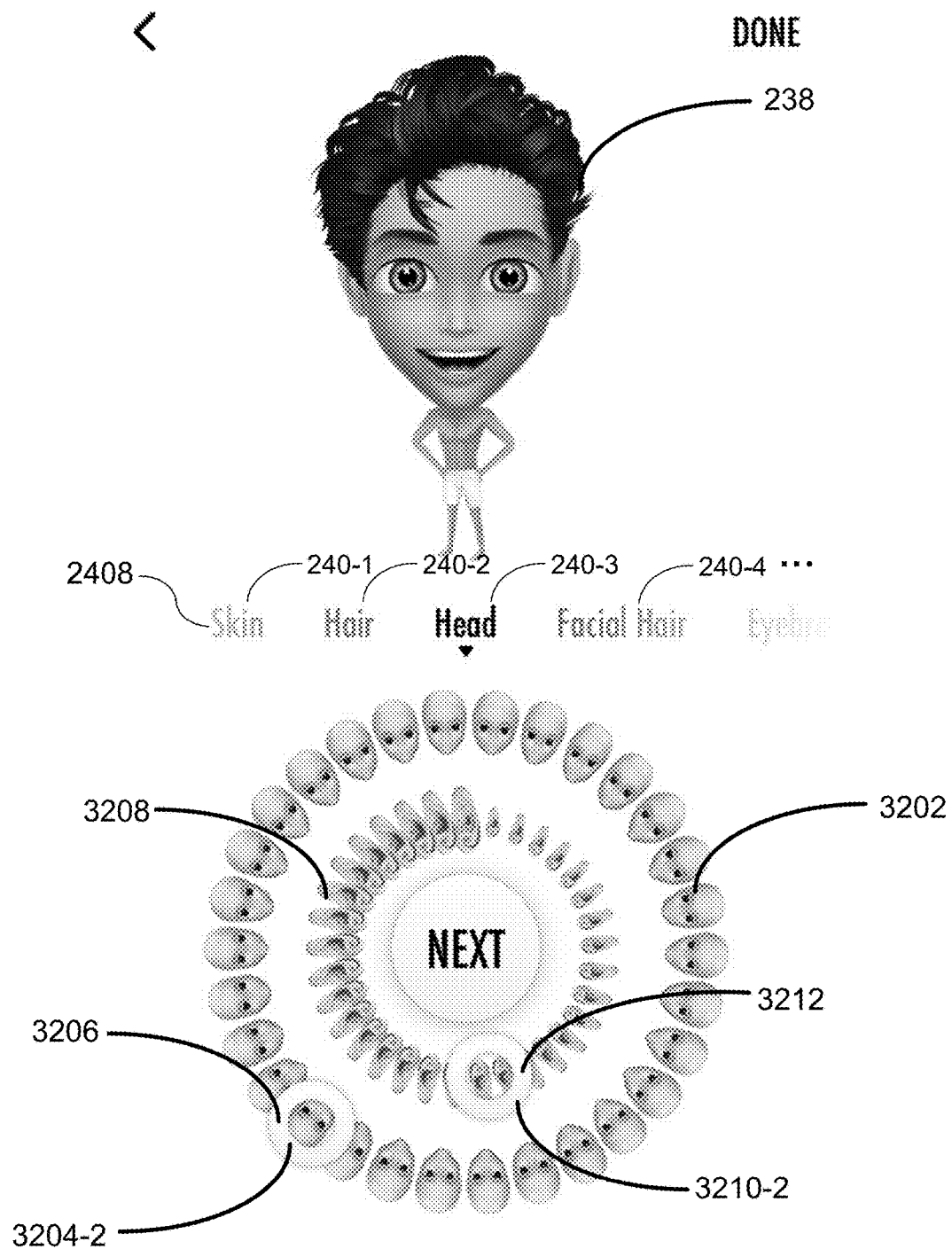
FIG. 33 illustrates concurrently displaying a first avatar, associated with a first user, a first closed form composer graphic, and a second closed form composer graphic on a display, where each different position on the first closed form composer graphic provides a different value for the trait head shape, and each different portion of the second closed form composer graphic provides a different value for the trait ear size, and where the user has selected a second position on the first closed form composer graphic and thus a second head shape for the avatar, and where the user has selected a second position on the second closed form composer graphic and thus a second ear size for the avatar in accordance with an embodiment of the present disclosure.

FIG. 33 illustrates concurrently displaying a first avatar 238, associated with a first user, a first closed form composer graphic 3202, and a second closed form composer graphic 3208 on a display. Each different position on the first closed form composer graphic 3202 provides a different value for the trait head shape. Each different portion of the second closed form composer graphic 3208 provides a different value for the trait ear size. The user has selected a second position 3204-2 on the first closed form composer graphic 3202 using drag handle 3206 and thus a second head shape for the avatar. The user has also selected a second position 3210-2 on the second closed form composer graphic 3208 using drag handle 3212 and thus a second ear size for the avatar 238.

Figure 34:
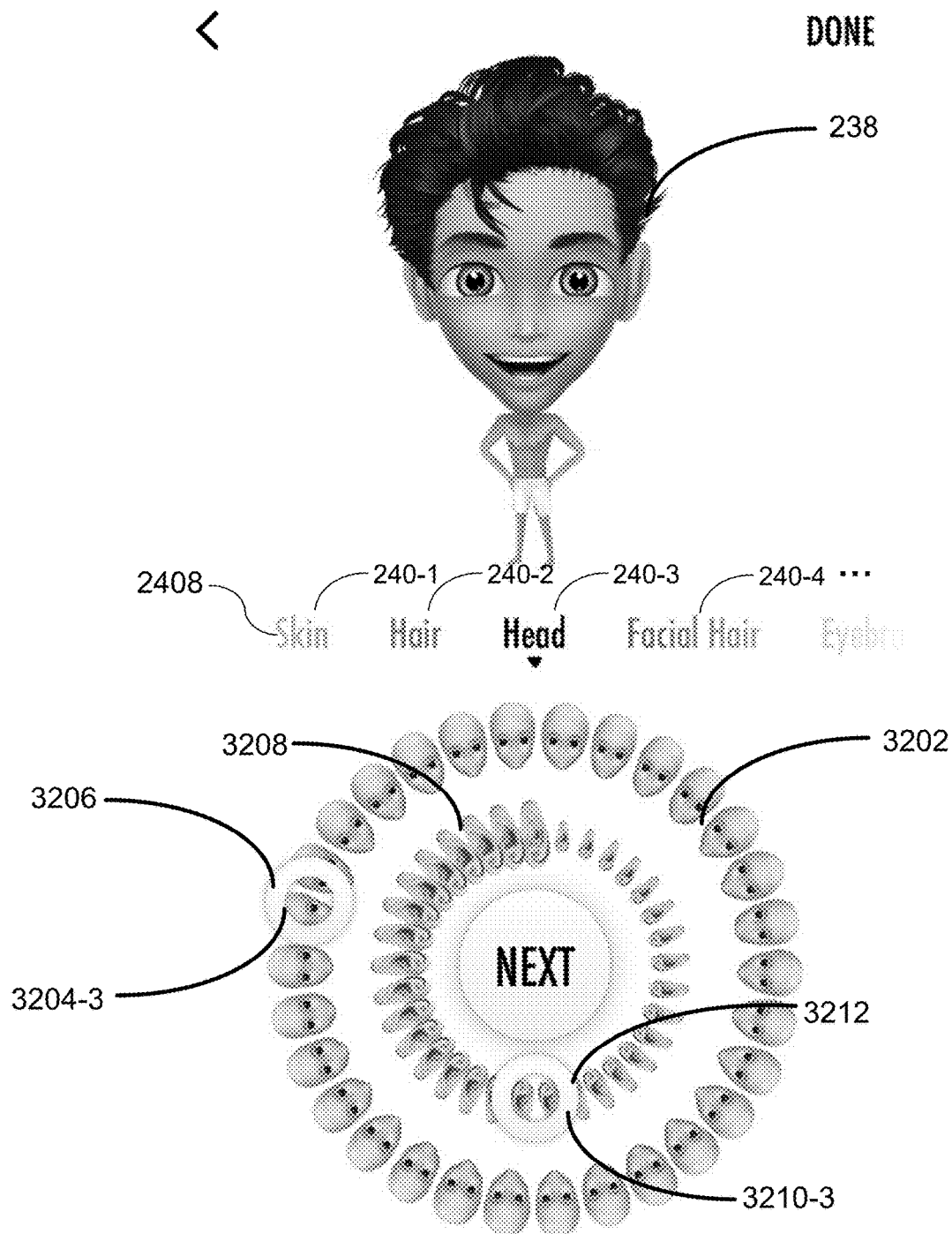
FIG. 34 illustrates concurrently displaying a first avatar, associated with a first user, a first closed form composer graphic, and a second closed form composer graphic on a display, where each different position on the first closed form composer graphic provides a different value for the trait head shape, and each different portion of the second closed form composer graphic provides a different value for the trait ear size, and where the user has selected a third position on the first closed form composer graphic and thus a third head shape for the avatar, and where the user has selected a third position on the second closed form composer graphic and thus a third ear size for the avatar in accordance with an embodiment of the present disclosure.

FIG. 34 illustrates concurrently displaying a first avatar 238, associated with a first user, a first closed form composer graphic 3202, and a second closed form composer graphic 3208 on a display. Each different position on the first closed form composer graphic 3202 provides a different value for the trait head shape. Each different portion of the second closed form composer graphic 3208 provides a different value for the trait ear size. The user has selected a third position 3204-3 on the first closed form composer graphic 3202 using drag handle 3206 and thus a third head shape for the avatar. The user has also selected a third position 3210-3 on the second closed form composer graphic 3208 using drag handle 3212 and thus a third ear size for the avatar 238.

Figure 35:
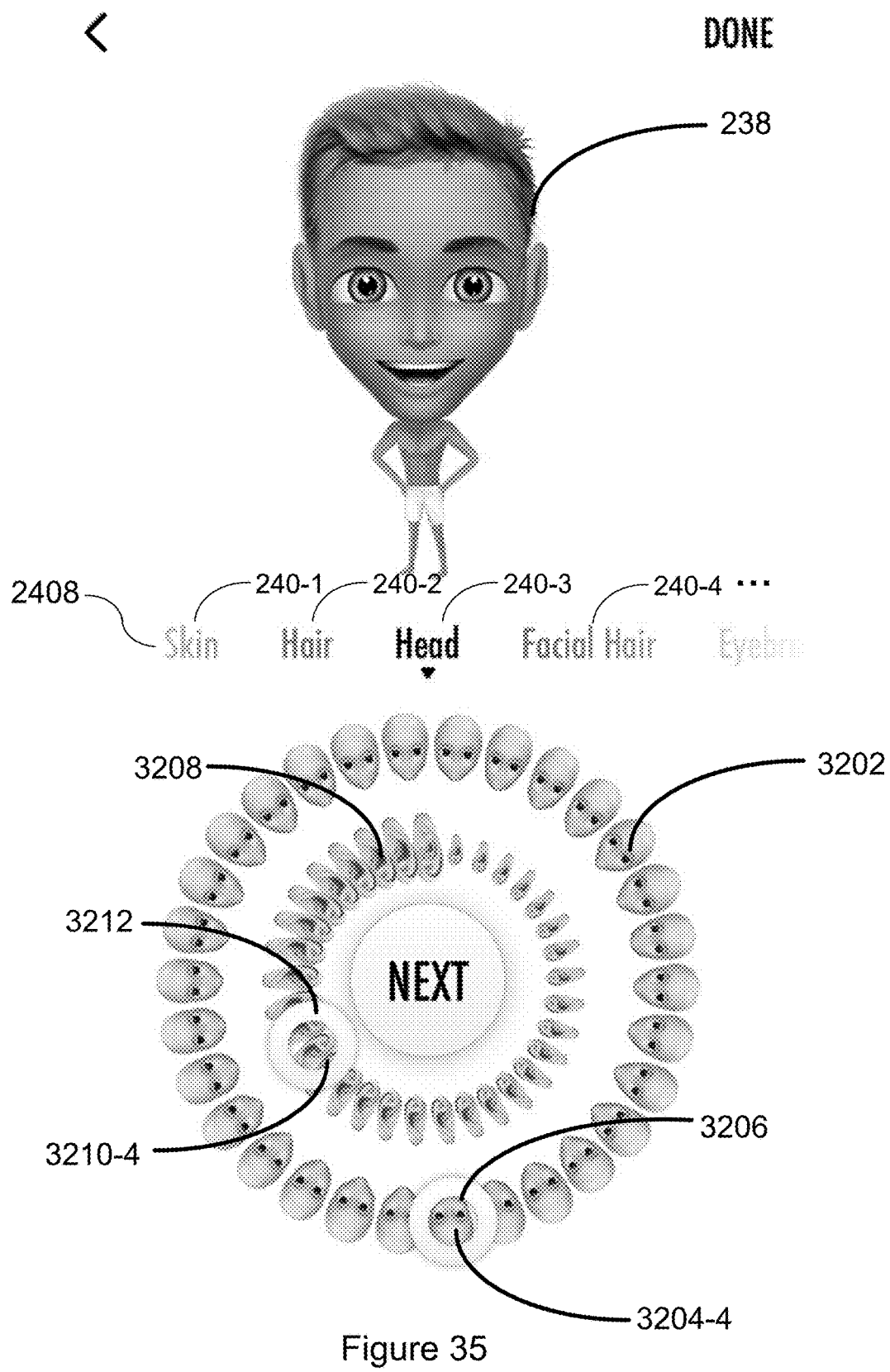
FIG. 35 illustrates concurrently displaying a first avatar, associated with a first user, a first closed form composer graphic, and a second closed form composer graphic on a display, where each different position on the first closed form composer graphic provides a different value for the trait head shape, and each different portion of the second closed form composer graphic provides a different value for the trait ear size, and where the user has selected a fourth position on the first closed form composer graphic and thus a fourth head shape for the avatar, and where the user has selected a fourth position on the second closed form composer graphic and thus a fourth ear size for the avatar in accordance with an embodiment of the present disclosure.

FIG. 35 illustrates concurrently displaying a first avatar 238, a first closed form composer graphic 3202, and a second closed form composer graphic 3208 on a display. Each different position on the first closed form composer graphic 3202 provides a different value for the trait head shape. Each different portion of the second closed form composer graphic 3208 provides a different value for the trait ear size. The user has selected a fourth position 3204-4 on the first closed form composer graphic 3202 using drag handle 3206 and thus a fourth head shape for the avatar. The user has also selected a fourth position 3210-4 on the second closed form composer graphic 3208 using drag handle 3212 and thus a fourth ear size for the avatar 238.

Figure 12:
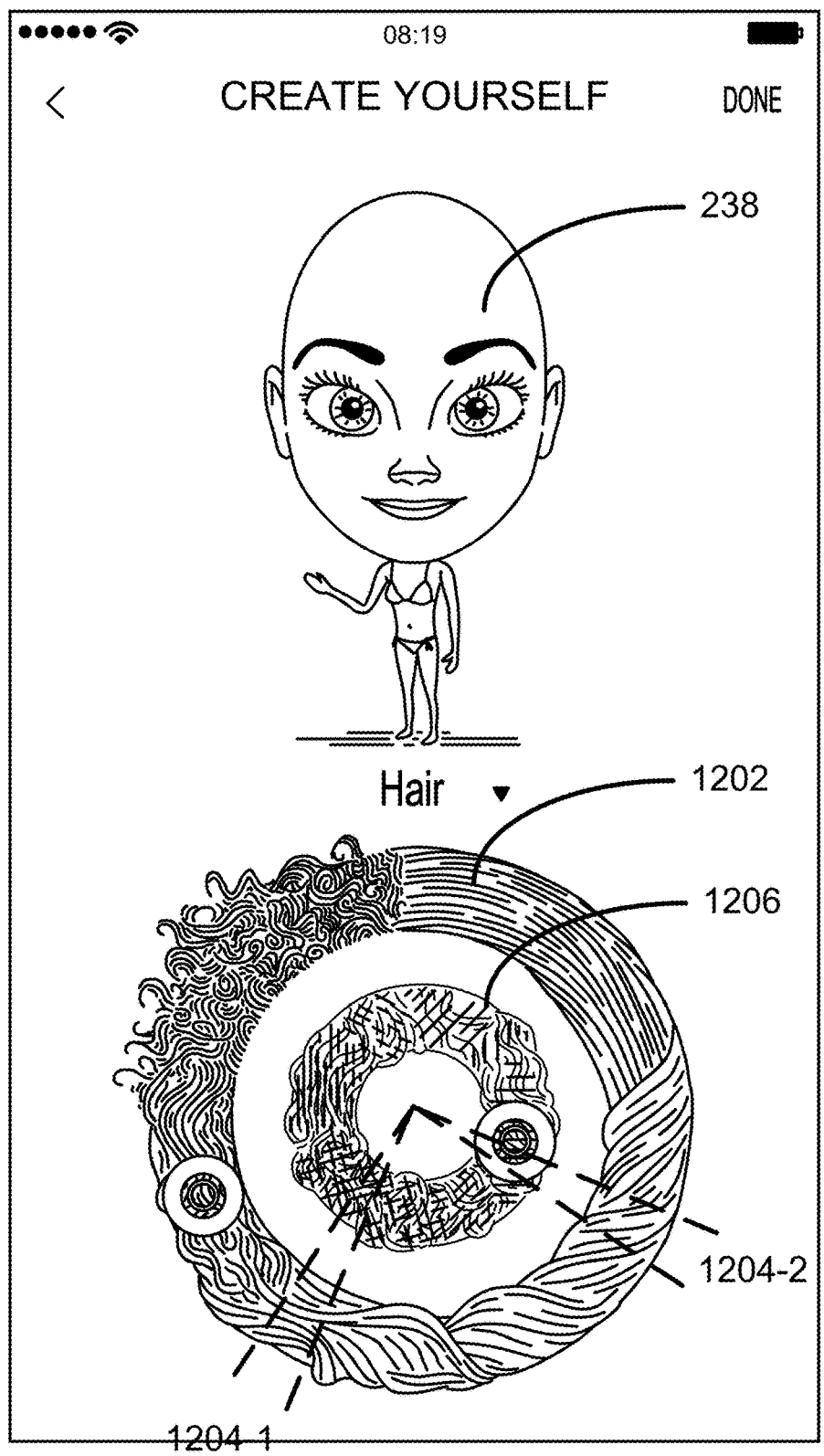
FIG. 12 illustrates concurrently displaying a first avatar and a first (outer) and second (inner) closed form on a display, where each different position of the outer closed form graphic provides a different value for the trait hair style and each different portion of the inner closed form graphic selects a different value for the trait hair color in accordance with some embodiments.

Referring to FIG. 12, in some embodiments, responsive to detection of the third break, the first avatar 238 and a fourth composer graphic 1202 are concurrently displayed on the display. Each different position of the fourth composer graphic 1202 provides a different value 242 for a fourth trait 240 (e.g., "hair style") associated with the fourth composer graphic 1202. In accordance with such embodiments, a fourth procedure is executed that comprises (i) displaying on the first avatar 238 the fourth trait 240 set at a value 242 associated with a respective position 1204 of the fourth composer graphic 1102 selected by the user 340 responsive to the user selection of the respective position 1204 of the fourth composer graphic, (ii) repeating the displaying (i) for each position 1204 of the fourth composer graphic 1102 contacted by the first user 340 until a fourth break in user contact with the fourth composer graphic 1202 is detected, where the repeating occurs at least one time, and (iii) associating the value 242 of the fourth trait 240 with the first avatar 238 that is associated with the position 1204 of the fourth composer graphic 1202 that was last contacted by the first user 340 when the fourth break was detected. Thus, in some embodiments, the user drags a finger along the fourth composer graphic 1202 (e.g., in a clockwise or counterclockwise fashion) and as they do the hair style on the avatar 238 is changed to match the position 1204 of the fourth composer graphic 1204 they are touching. Once the user stops touching the fourth composer graphic the value 242 of the fourth trait 240 that is at the position 1204 of the fourth composer graphic 1202 last touched by the user before the fourth break is associated with the first avatar 238. This associating results in the display on the first avatar 238 of the fourth trait 240 set at the value 242 of the fourth trait 240 associated with the position 1204 of the fourth composer graphic 1202 that was last contacted by the first user 340 when the fourth break was detected. As the user movers their finger around the fourth composer graphic 1202, the avatar 238 hair grows longer. In this way, the user is able to pick their hair style. If the user is female, they may pick longer hair. If the user is male, they may pick shorter hair (e.g., something more at the beginning of the fourth composer graphic 1202). As illustrated, in FIG. 12, the hair style gets more curly on the upper left hand positions of the fourth composer graphic 1202. Further, to select hair color, the user can select a hair color on the inner composer graphic 1206. Thus, in FIG. 12, a double composer graphic 1202/1206 is concurrently displayed where the outer composer graphic 1202 selects hair style and the inner composer graphic 1206 selects hair color.

Referring to block 616 of FIG. 6C, in some embodiments the client application 236 repeats the displaying for each position 1004 of the second closed form composer graphic 1002 contacted by the first user 340 until a break in user contact with the second closed form composer graphic 1002 is detected. The position 1004 of the second closed form computer graphic 1002 that is selected by the first user 340 is the position of the second closed form composer graphic 1002 that was last contacted by the first user 340 when the break with the second closed form component 1002 was detected. In some embodiments a user break means a pause or drop in contact with the drag handle of a closed form composer graphic illustrated in FIGS. 24-59. In embodiments of closed form composer graphics that do not have a drag handle, a user break means a pause or drop in contact with the based closed form composer graphic itself. In some embodiments, a user break is deemed to have occurred after either no contact with the display has been detected for a predetermined period of time or no change in user contact with the display has been detected for a predetermined period of time (e.g., the user has paused the drag handle, etc.). In some embodiments, this predetermined period of time is between 50 milliseconds and five seconds. In some embodiments, this predetermined period of time is between 100 milliseconds and four seconds. In some embodiments, a user break is deemed to have occurred when the user selects a new trait 240 in affordance 2408.

Figure 23:
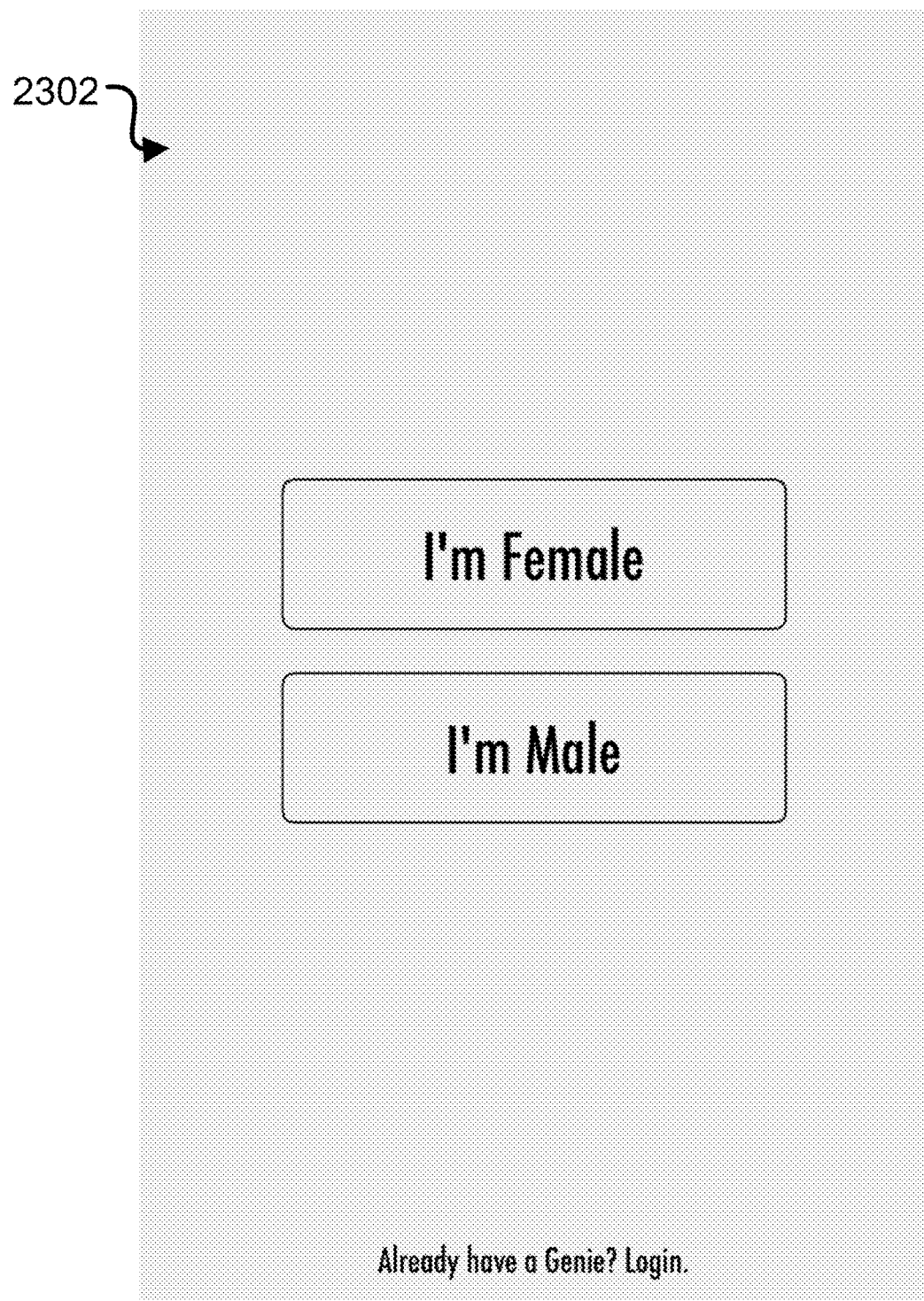
FIG. 23 illustrates receiving a specification of a gender of the first avatar in accordance with an embodiment of the present disclosure.

Referring to block 618 of FIG. 6C, in some embodiments, the method further comprises receiving a specification of a gender of the first avatar 238. In some embodiments this is accomplished using the interface 2302 of FIG. 23. In such instances, the client application 236 includes a gender layer 244 on the first avatar 238 that is selected from the set of "male gender" and "female gender" responsive to the specification of gender from the first user 340. The male gender layer 244 adds elements to the avatar 238 that make the avatar appear as a male, such as certain types of clothing, facial hair, hair style, etc. The female gender layer 244 adds elements to the avatar 238 that make the avatar appear as a female, such as certain types of clothing, absence of facial hair, jewelry, hair style, etc.

In some embodiments the client application 234 receives a selection of one or more topical categories 248 from an enumerated plurality of topical categories (e.g., using the interface illustrated in FIG. 8), and associates the one or more topical categories with the first avatar 238 (e.g., by inclusion in the user's profile 246 illustrated in FIG. 2).

Figure 6D:
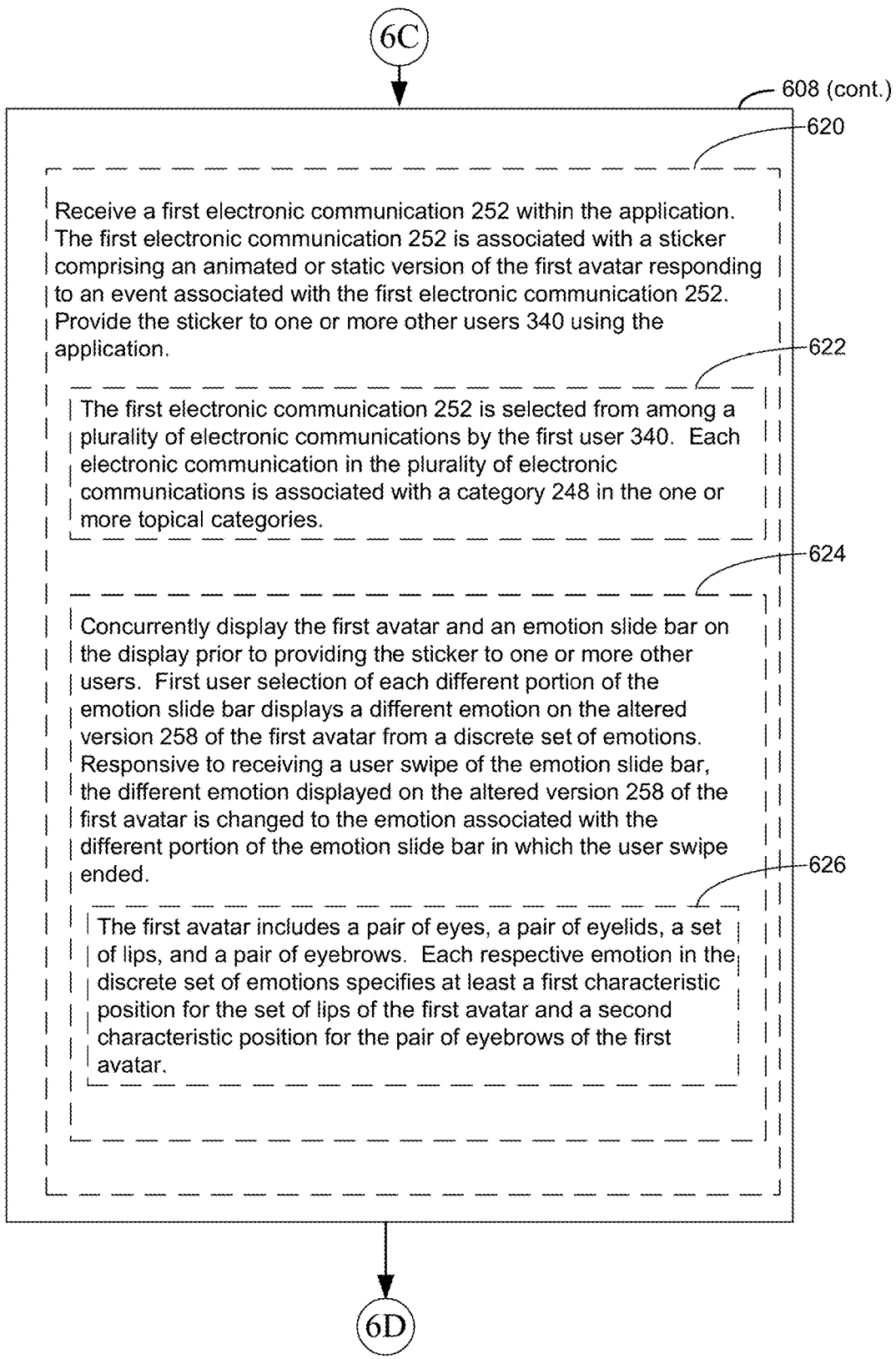
Figure 61:
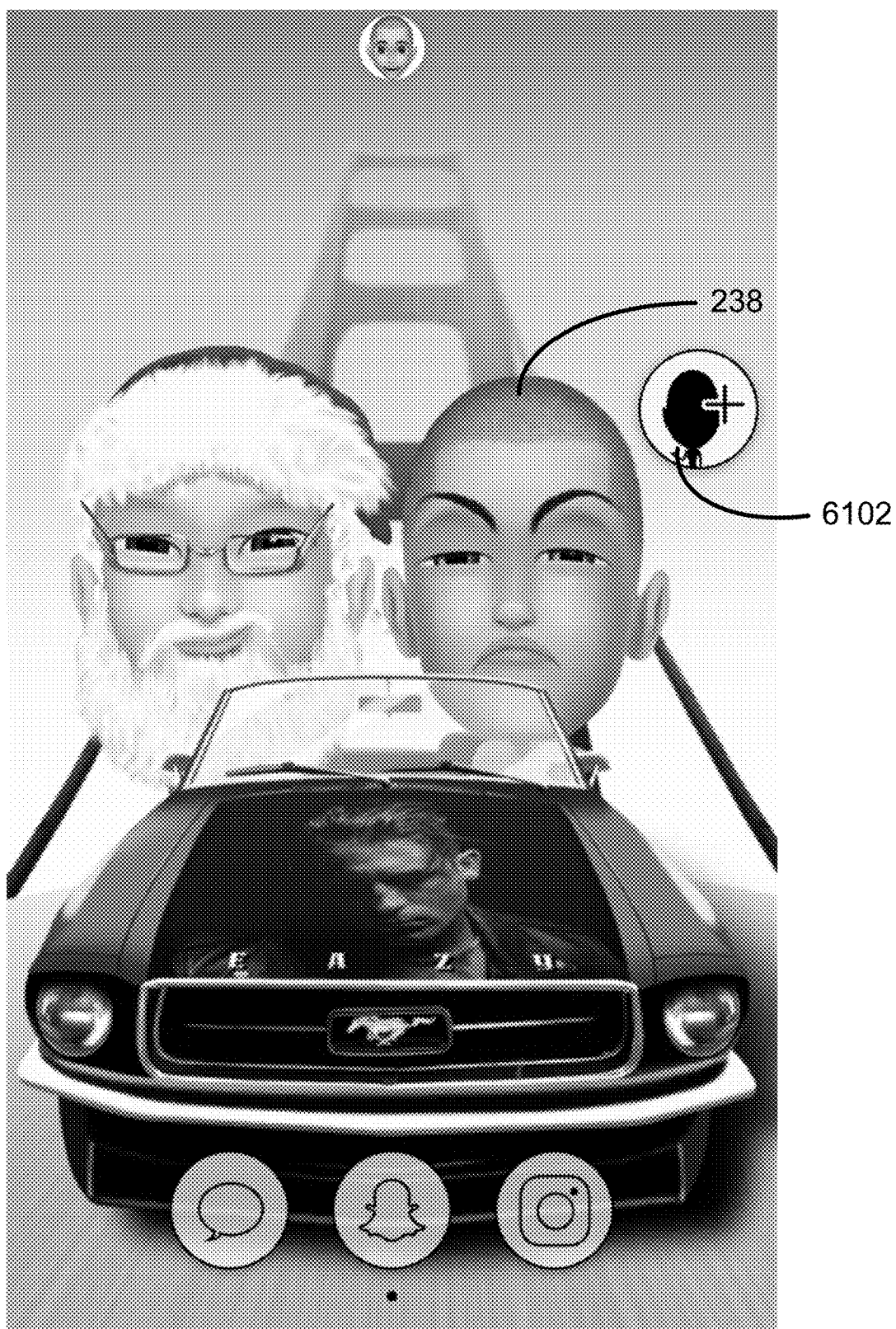
FIG. 61 illustrates receiving a first electronic communication within an application, where the first electronic communication is associated with a sticker comprising an animated version of an avatar that has been customized in accordance with the present disclosure, where the avatar is further responding to an event associated with the first electronic communication in accordance with an embodiment of the present disclosure.
Figure 62:
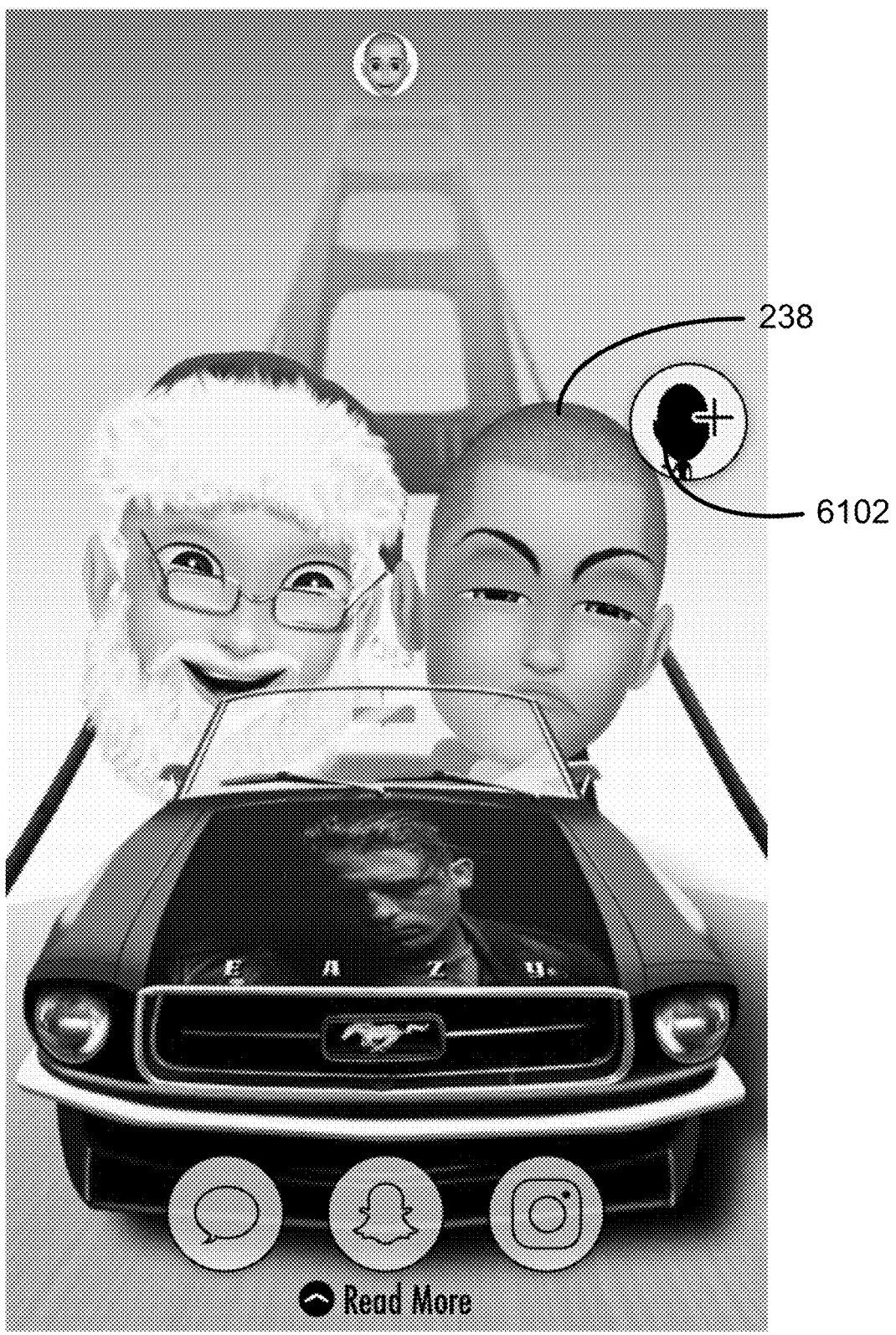
FIG. 62 further illustrates receiving a first electronic communication within an application, where the first electronic communication is associated with a sticker comprising an animated version of an avatar that has been customized in accordance with the present disclosure, where the avatar is responding to an event associated with the first electronic communication in accordance with an embodiment of the present disclosure.

Referring to block 620 of FIG. 6D, in some embodiments a selection of a first electronic communication 252 is received within the client application 236. The first electronic communication 252 is associated with a sticker comprising an animated or static version 258 of the first avatar responding to an event associated with the first electronic communication 252. FIGS. 61 and 62 illustrates a sticker comprising an animated version of an avatar that has been customized in accordance with the present disclosure, where the avatar is further responding to an event associated with a first electronic communication in accordance with an embodiment of the present disclosure. As can be seen from the transition from FIGS. 61 to 62, the head, eye shape, and eye brows of the avatar, among other components, is moving over time.

In some embodiments, the sticker is in JPEG format. In some embodiments, the sticker is in MP4 format, or some other format that allows for animation. The sticker is provided to one or more other users 340 using the application. In some such embodiments, the client application 236 accomplishes the communication of the sticker to one or more other users using application programming interface (API) calls that are supported by one or more social networking applications that are installed on the user's client device 102. For instance, if the user has FACEBOOK MESSENGER, TWITTER, SNAPCHAT, iMESSAGE, etc. (or other social networking applications) installed on the client application, API calls supported by these applications can be used by the client application 236 to distribute the sticker to one or more other users that are among the first user's FACEBOOK MESSENGER, TWITTER, SNAPCHAT, iMESSAGE, etc. (or other social networking applications) contacts. As such, advantageously, in some such embodiments, the other users do not need to be using an instance of the client application 236 in order to receive a sticker 256 from the first user.

In some embodiments, the sticker 256, which may be for example in JPEG format, is fused with the first electronic communication 252 to form a message. In some such embodiments, the message is communicated to one or more other users 340 using the application. In some embodiments, the client application 236 accomplishes the distribution of the message to one or more other users using application programming interface (API) calls that are supported by one or more social networking applications that are installed on the user's client device 102. For instance, if the user has FACEBOOK MESSENGER, TWITTER, SNAPCHAT, iMESSAGE, etc. (or other social networking applications) installed on the client application, API calls supported by these applications can be used by the client application 236 to distribute the message to one or more other users that are among the first user's FACEBOOK MESSENGER, TWITTER, SNAPCHAT, iMESSAGE, etc. (or other social networking applications) contacts.

In some embodiments, the sticker 256, which may be for example in JPEG format as discussed above, is not fused with the first electronic communication 252. In some embodiments, the sticker 256 is in MP4 format or some other format that supports animation. Further in some such embodiments, the sticker 256 is not fused with the first electronic communication 252.

Referring to block 622 of FIG. 6C, in some embodiments, the first electronic communication 252 is selected from among a plurality of electronic communications by the first user 340 (e.g., from among at least three electronic communications, from among at least five electronic communications, from among at least 10 electronic communications, etc.). In some such embodiments, each electronic communication in the plurality of electronic communications is associated with a category 248 in the one or more topical categories. In some such embodiments the first electronic communication 252 is selected from among a plurality of electronic communications by the first user 340, and each electronic communication in the plurality of electronic communications is associated with a category 254 in the one or more topical categories. In some embodiments, each such electronic communication 252 describes an event in accordance with its associated category, the event occurring in the past five minutes, past half hour, past hour, past day or past week. In some embodiments, each such electronic communication 252 describes an event in accordance with its associated category, the event trending in the past five minutes, past half hour, past hour, past day or past week on a social network application such as GOOGLE, TWITTER, etc. In some embodiments, at any given the time, the plurality of electronic communications 252 available for the user to select from at a client application 236 is two or more electronic communications 252, five or more electronic communications 252, or 100 or more electronic communications 252. In some embodiments, each electronic communication 252 is associated with a single communication category 254 and the plurality of electronic communications collectively includes communications across two or more categories, three or more categories, or ten or more categories 254. In some embodiments, each electronic communication 252 is associated with two or more communication categories 254. In alternative embodiments, each electronic communication in the plurality of electronic communications is not associated with any category 248.

Figure 16:
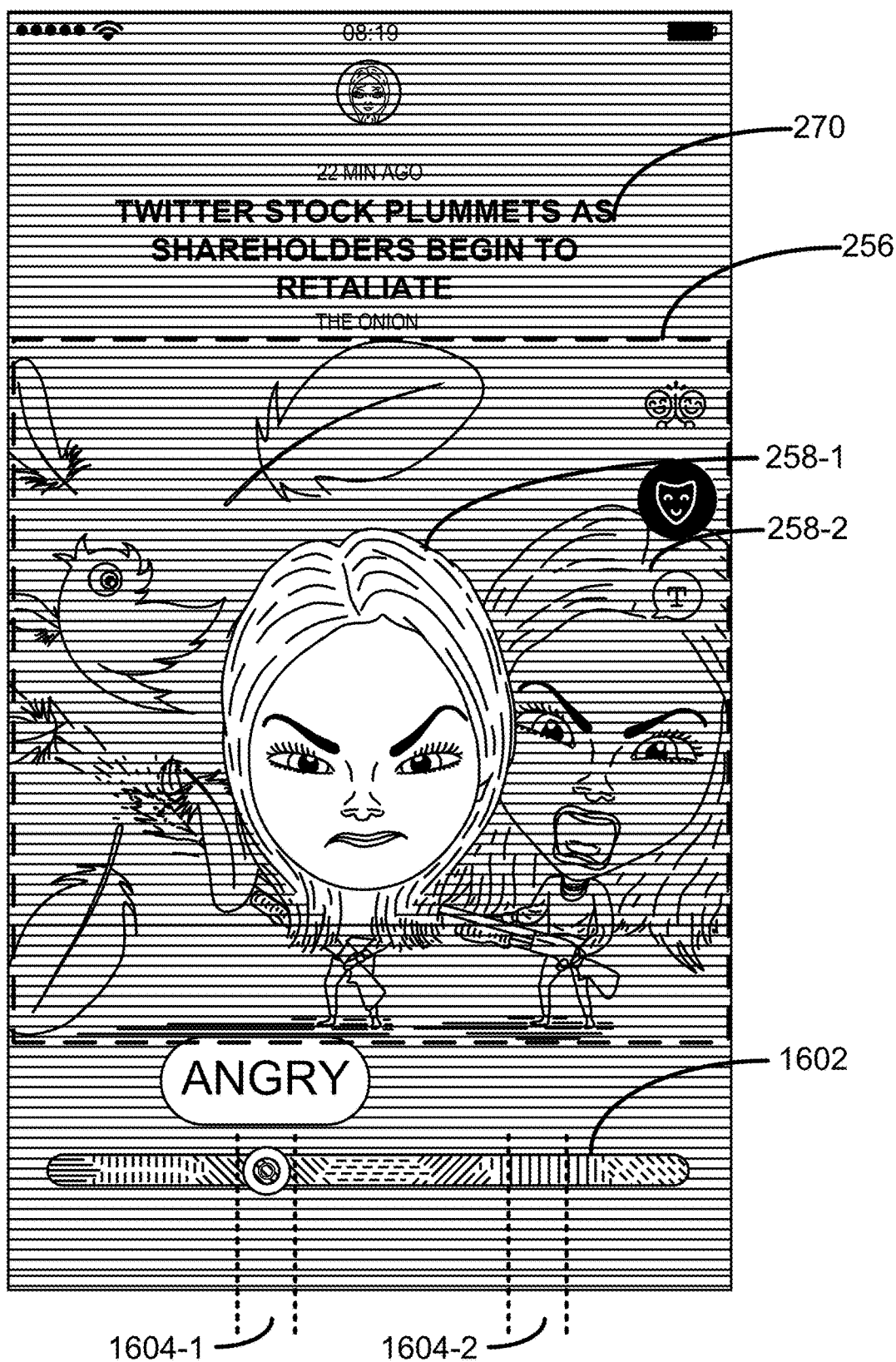
FIG. 16 illustrates providing a first affordance at a time after receiving a first electronic communication, where selection of the first affordance by the first user displays a first tool for modifying a sticker, where the sticker comprises: (i) the first avatar associated with the first user responsive to an event in an electronic communication received by the first user, where the first avatar in the sticker comprises one or more visible layers that are present in a version of the first avatar that is stored in the user profile of the first user and one or more visible layers that are not present in the version of the first avatar stored in the user profile of the first user and (ii) a second avatar associated with a different user in a contact list of the first user or an enumerated list of avatars where each avatar in the enumerated list of avatars represents a different public figure in accordance with some embodiments, and where the modifying the sticker comprises changing an expression on the first avatar in the sticker using the first affordance in accordance with some embodiments.

Referring to block 624 of FIG. 6D, in some embodiments, the method comprises concurrently displaying the first avatar and an emotion slide bar on the display prior to providing the sticker to one or more other users. An example of this is illustrated in FIG. 16. First user selection of each different portion 1604 of the emotion slide bar 1602 displays a different emotion on the first avatar in the sticker from a discrete set of emotions. In some embodiments, the slide bar includes five or more portions each representing a different emotion, ten or more portions each representing a different emotion, or 25 or more portions each representing a different emotion. Responsive to receiving a user swipe of the emotion slide bar, the different emotion displayed on the version 258 of the first avatar in the sticker is changed to the emotion associated with the different portion of the emotion slide bar in which the user swipe ended. For instance, referring to FIG. 16, portion 1604-1 of the emotion slide bar 1602 is associated with the emotion "angry" while portion 1604-2 of the emotion slide bar 1602 is associated with some other emotion other than angry. Referring to block 626 of FIG. 6D, in some such embodiments, and as illustrated in FIG. 16, the avatar 238 includes a pair of eyes, a nose, and a set of lips, a pair of eyebrows, a pair of ears, and a body, and each respective emotion in the discrete set of emotions associated with the emotion slide bar 1602 specifies at least a first characteristic position for the set of lips of the first avatar and a second characteristic position for the pair of eyebrows of the first avatar to convey the associated emotion in the avatar 258 in the sticker. For example, as illustrated in FIG. 16, to convey the emotion "angry," the default (base) avatar 238 of the user is taken and the lips and eyebrows positions are changed to form an altered avatar 258 (of the default avatar 238) that conveys anger. In some embodiments, the lips and eyebrows positions are changed by overlaying layers onto the base avatar 238 with lips and eyebrows in altered positions to thereby form the altered avatar.

In some such embodiments, and as illustrated in FIG. 16, the avatar 238 includes a pair of eyes, a nose, and a set of lips, a pair of eyebrows, a pair of ears, and a body, and each respective emotion in the discrete set of emotions associated with the emotion slide bar 1602 specifies at least a first characteristic position for one of the pair of eyes, a nose, and a set of lips, a pair of eyebrows, a pair of ears, and a body of the first avatar and a second characteristic position for another of the pair of eyes, a nose, and a set of lips, a pair of eyebrows, a pair of ears, and a body of the first avatar to convey the associated emotion in the altered avatar 258. In some embodiments, these components of the first avatar in the sticker are changed by overlaying layers onto the base avatar 238 (the version of the avatar stored in the user profile of the first user) with the components in altered positions to thereby form an altered version of the first avatar in the sticker.

Figure 6E:
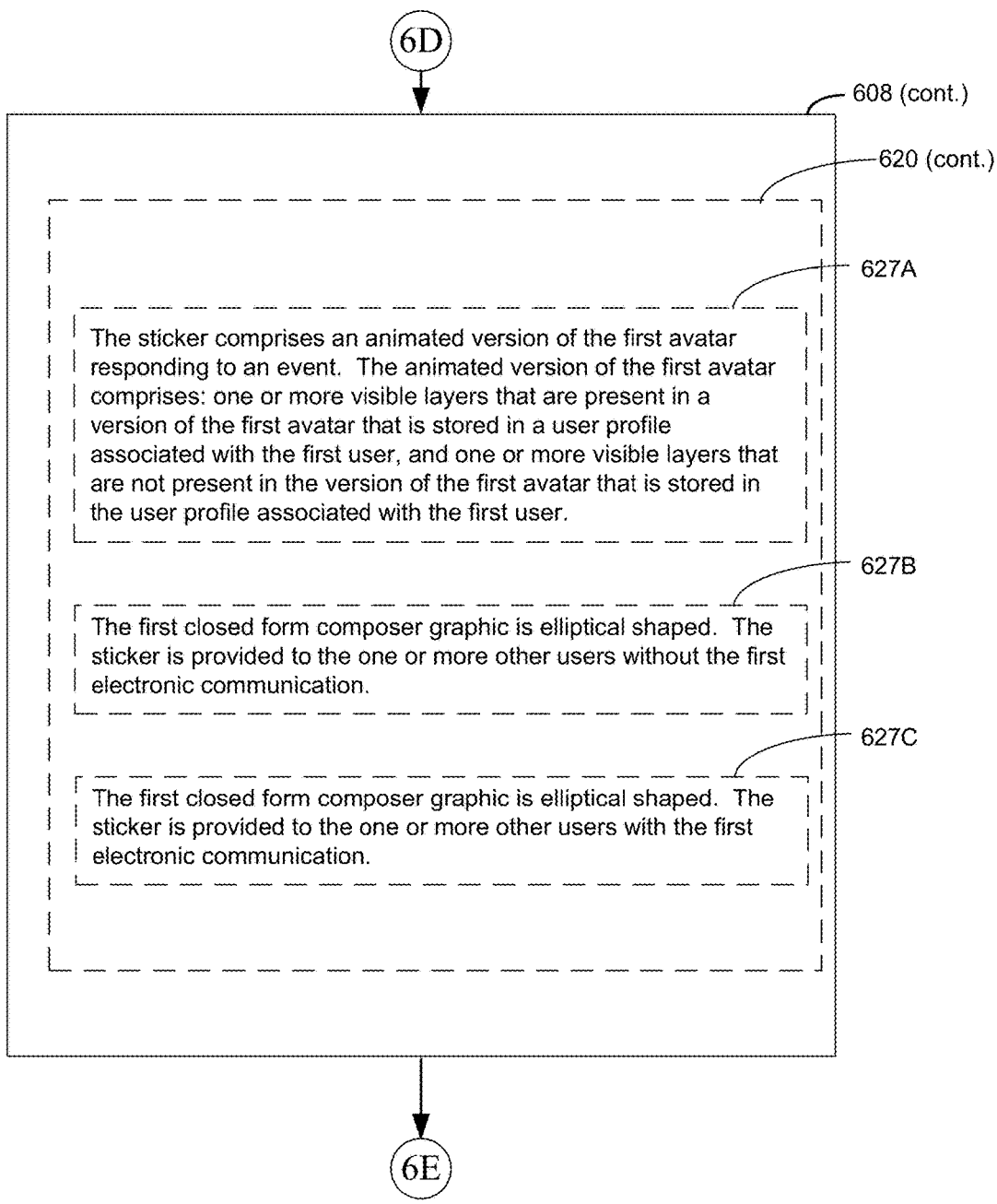

Referring to block 627A of FIG. 6E, and as illustrated in FIGS. 61 and 62, in some embodiments the sticker comprises an animated version of the first avatar 238 responding to an event. The animated version of the first avatar comprises: one or more visible layers that are present in a version of the first avatar that is stored in the user profile 246 associated with the first user, and one or more visible layers that are not present in the version of the first avatar that is stored in the user profile 246 associated with the first user. The purpose of the one or more visible layers that are not present in the first avatar 238 stored in the user profile 246 associated with the first user is to alter the expression of the first avatar 238 so that it is seen as "reacting" to the information conveyed in the first electronic communication (regardless of whether the contents of the first electronic communication are associated with the sticker when the user distributes the sticker to user contacts). As such, these additional layers can modify the expression of the base version of the avatar stored in the user profile of the first user. For instance, the one or more additional layers may overlay enlarged anatomical features over the base avatar 238, such as enlarged ears to convey a listening posture.

Referring to block 627B of FIG. 6E, in some embodiments the first closed form composer graphic is elliptical shaped as illustrated in FIGS. 24-59. In some such embodiments, the sticker is provided to the one or more other users without the first electronic communication.

Referring to block 627C of FIG. 6E, in some embodiments the first closed form composer graphic is elliptical shaped. In some such embodiments, the sticker is provided to the one or more other users with the first electronic communication.

In some optional embodiments the sticker 256 that includes the avatars is fused with the first electronic communication 252. In some such embodiments this constitutes combining a headline 270 that represents the first electronic communication 252 with the sticker 256. In some embodiments, the sticker 256 has a headline 270 which conveys a snippet or general synopsis of the original electronic communication 252. In some embodiments, the one or more avatars in the sticker are reacting to the headline 270 in a way that is characteristic of the users represented by the avatars. For instance, if the user is politically conservative, the avatar of the first user in a given sticker 256 would be reacting negatively to events that would generally be regarded as advancements in liberal policy and would be reacting positively to events that would generally be regarded as advancements in conservative policy.

Figure 13:
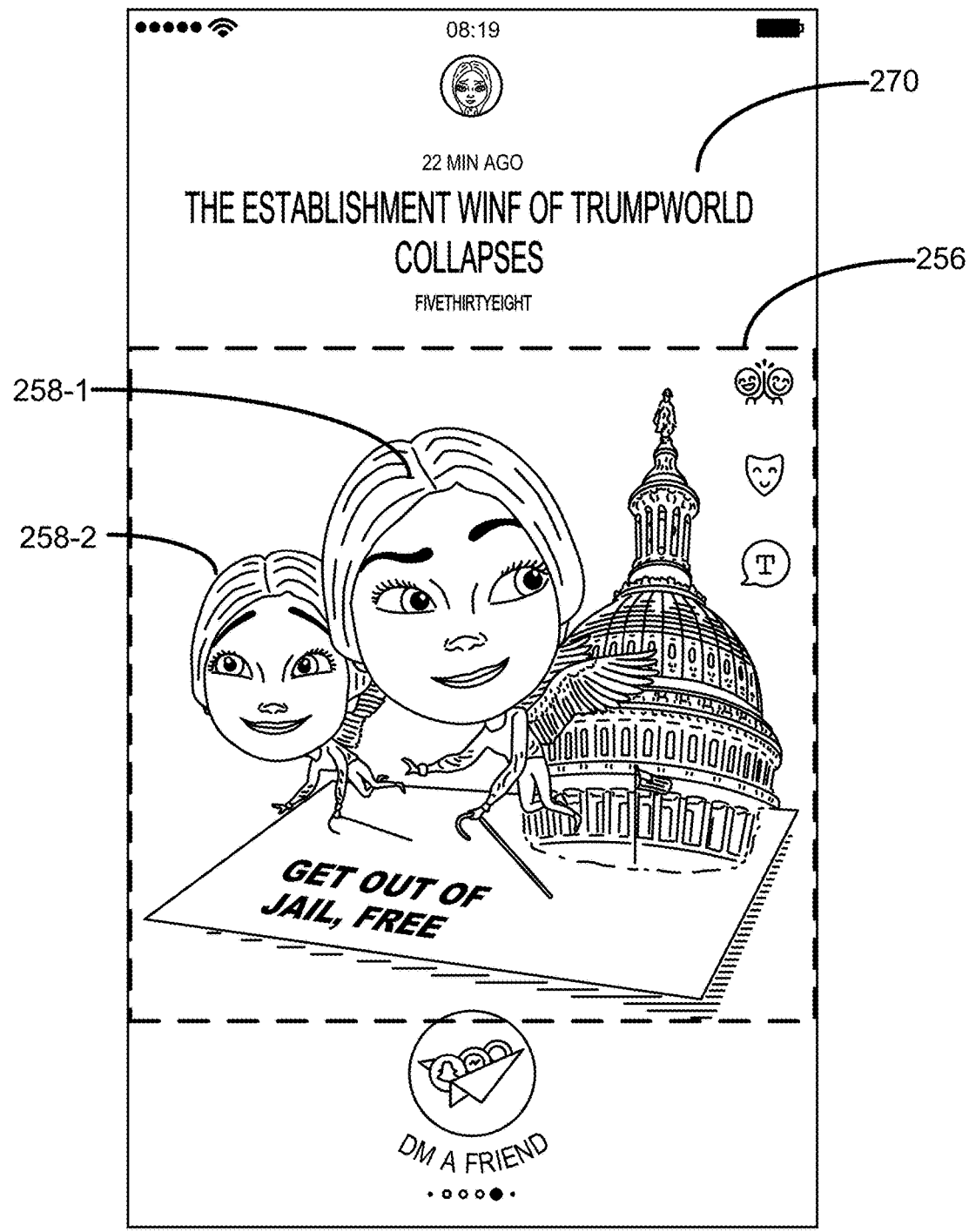
FIG. 13 illustrates a sticker comprising (i) a first avatar of a first user responsive to receiving an electronic communication, where the first avatar comprises one or more visible layers that are present in a version of the first avatar stored in the user profile of the first user and one or more visible layers that are not present in the version of the first avatar stored in the user provide of the first user and (ii) a second avatar associated with a different user in a contact list of the first user or an enumerated list of avatars where each avatar in the enumerated list of avatars represents a different public figure in accordance with some embodiments.

In alternative embodiments, the sticker 256 that includes the avatars is fused with the first electronic communication 252 by altogether replacing the first electronic communication 252 with a sticker 256 that includes a headline 270 that represents the first electronic communication 252. That is to say, in such embodiments, the sticker 256 encompasses the entirety of the displayed message in FIG. 13, not just the dashed box region. In still other embodiments, the sticker 256 that includes the avatars is fused with the first electronic communication 252 by combining a snippet from the original electronic communication 252 with the sticker 256. In still other embodiments, the sticker 256 that includes the avatars is fused with the first electronic communication 252 by combining the entirety of the original electronic communication 252 with the sticker 256, with the sticker 256 overlaying a portion of the original electronic communication 252. In still other embodiments, the sticker 256 that includes the avatars is fused with the first electronic communication 252 by combining the entirety of the original electronic communication 252 with the sticker 256, with the sticker 256 being appended to the original electronic communication 252 so that it does not overlay any part of the original electronic communication 252. In still other embodiments, the sticker 256 that includes the avatars is fused with the first electronic communication 252 by including a link on a portion in the sticker to an electronic address of the electronic communication. When a recipient of the sticker sent out by the first user selects the portion of the sticker that corresponds to the link, the electronic communication is accessed from the electronic address and displayed to the recipient. In some embodiments the sticker 256 is not fused with the first electronic communication 252 and all that is sent out by the first user is the sticker to select recipients without the first electronic communication.

Figure 6F:
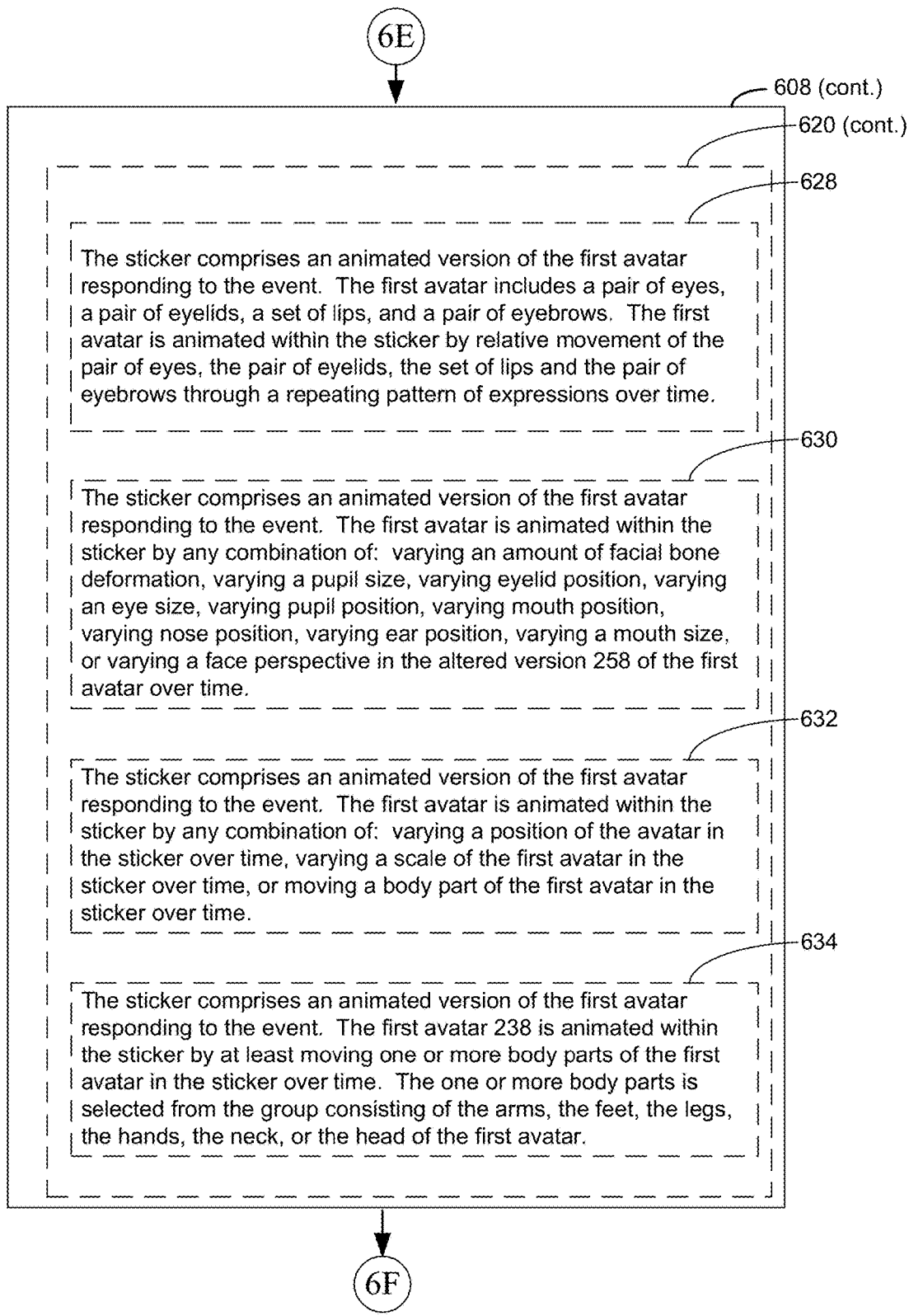

Referring to block 628 of FIG. 6F, in some embodiments, the sticker comprises an animated version of the first avatar responding to the event. In some such embodiments the sticker includes a pair of eyes, a pair of eyelids, a set of lips, and a pair of eyebrows. The first avatar is rendered dynamic within the sticker by relative movement of the pair of eyes, the pair of eyelids, the set of lips and the pair of eyebrows through a repeating pattern of expressions over time. For instance, referring to FIG. 17, in some embodiments, the first avatar is rendered dynamic by moving the eyebrows of the depicted avatar 258-1 within the sticker 256 through a repeating pattern over time. For example, the eyebrows of the depicted avatar 258-1 within the sticker 256 are posed within the sticker in a first position (e.g., lowered) for few milliseconds, then posed within the sticker in a second position (e.g., straight) for a few milliseconds, and then posed within the sticker in a third position (e.g., raised) for a few milliseconds. This sequence is then repeated with the eyebrows returning to the first position, and then cycling through the second and third position over and over again. In some embodiments, the repeating pattern has three discrete independent positions that are cycled through as outlined above. More typically, the repeating pattern has ten or more discrete independent positions that are cycled through, or one hundred or more discrete independent positions that are cycled through. In some embodiments, each position is depicted for at least one millisecond, at least 10 milliseconds, at least 100 milliseconds, or at least 250 milliseconds before moving on to the next position.

Referring to block 630 of FIG. 6F, in some the first avatar is rendered dynamic within the sticker by any combination of: varying an amount of facial bone deformation, varying a pupil size, varying eyelid position, varying an eye size, varying pupil position, varying mouth position, varying nose position, varying ear position, varying a mouth size, or varying a face perspective in the first avatar in the sticker over time.

In some embodiments, the first avatar 238 is rendered dynamic within the sticker by any combination of: varying an amount of facial bone deformation in the first avatar over time, varying a pupil size in the first avatar over time, varying eyelid position in the first avatar over time, varying an eye size in the first avatar over time, varying pupil position in the first avatar over time, varying mouth position in the first avatar over time, varying nose position in the first avatar over time, varying ear position in the first avatar over time, varying a mouth size in the first avatar over time, varying a face perspective in the first avatar over time, varying a position of the first avatar in the sticker over time, varying a scale of the first avatar in the sticker over time, and/or moving a body part of the first avatar in the sticker over time. In such embodiments, typically, this variation of the component (e.g., pupil size, eyelid position, eye size, etc.) of the first avatar constitutes a repeating pattern of component placement within the sticker where eventually each independent position in the pattern is revisited in the sticker over time.

Figure 17:
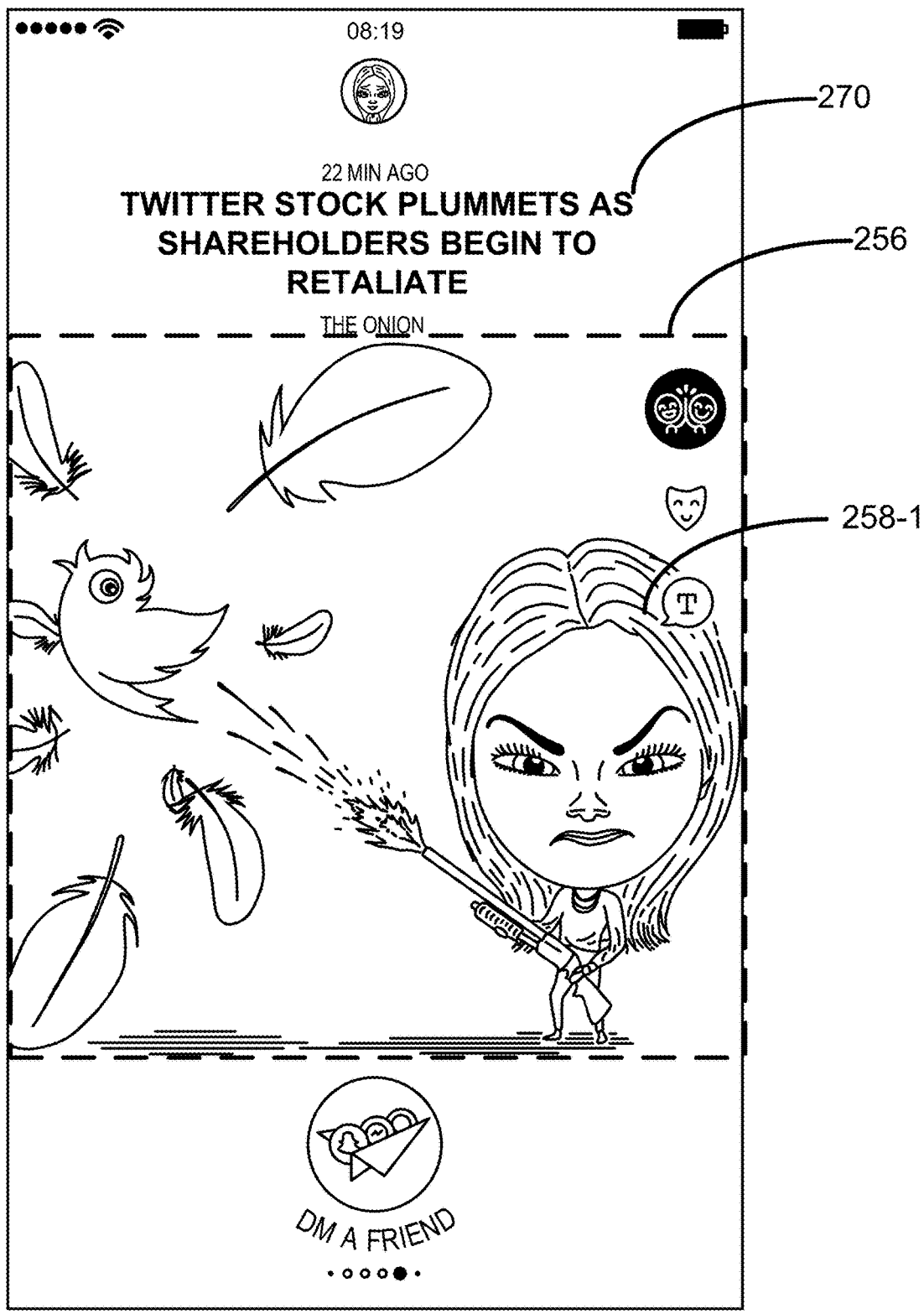
FIG. 17 illustrates providing a sticker to one or more other users using an application, where the sticker comprises: (i) a version of the first avatar associated with the first user responsive to the first user receiving the electronic communication, where the version of the first avatar in the sticker comprises one or more visible layers that are present in the version of the first avatar stored in a user profile associated with the first user and one or more visible layers that are not present in the version of the first avatar stored in the user profile of the first user and (ii) a second avatar associated with a different user in a contact list of the first user or an enumerated list of avatars where each avatar in the enumerated list of avatars represents a different public figure in accordance with some embodiments, and (iii) a prop or background scene in accordance with some embodiments.

As another example, referring to FIG. 17, in some embodiments, the first avatar is rendered dynamic (e.g., within the sticker) by changing the size of the eyes of the depicted avatar 258-1 within the sticker 256 over time, moving the eyelids of the depicted avatar 258-1 within the sticker 256 through a first repeating pattern over time, and moving the lips of the depicted avatar 258-1 within the sticker 256 through a second repeating pattern over time, and/or moving the eyebrows of the depicted avatar 258-1 within the sticker 256 through a third repeating pattern over time where the first, second, and third repeating pattern is the same or different. That is, they may have different numbers of independent positions that are cycled through, and on different timing schedules (e.g., each independent position of the first repeating pattern may be rendered in the sticker 256 for a different amount of time than each independent position of the second repeating pattern).

Referring to block 632 of FIG. 6F, in some embodiments the sticker comprises an animated version of the first avatar responding to an event associated with the first electronic communication. In such embodiments the first avatar is animated within the sticker by any combination of: varying a position of the avatar in the sticker over time, varying a scale of the first avatar in the sticker over time, or moving a body part of the first avatar in the sticker over time.

Referring to block 634 of FIG. 6F, in some embodiments the sticker comprises an animated version of the first avatar responding to an event associated with the first electronic communication. The first avatar 238 is animated within the sticker by at least moving one or more body parts of the first avatar in the sticker over time. The one or more body parts is selected from the group consisting of the arms, the feet, the legs, the hands, the neck, or the head of the first avatar.

Figure 6G:
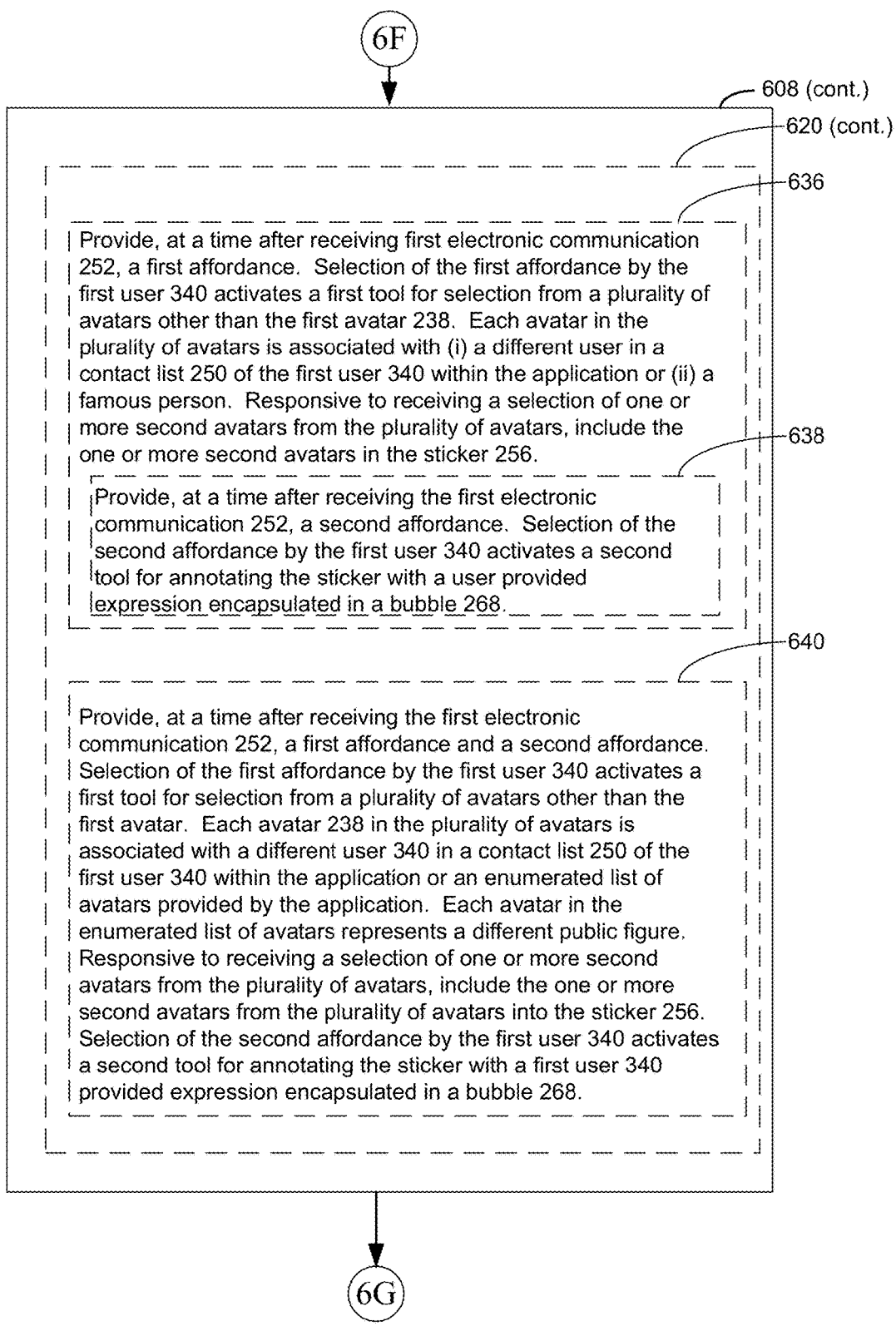
Figure 14:
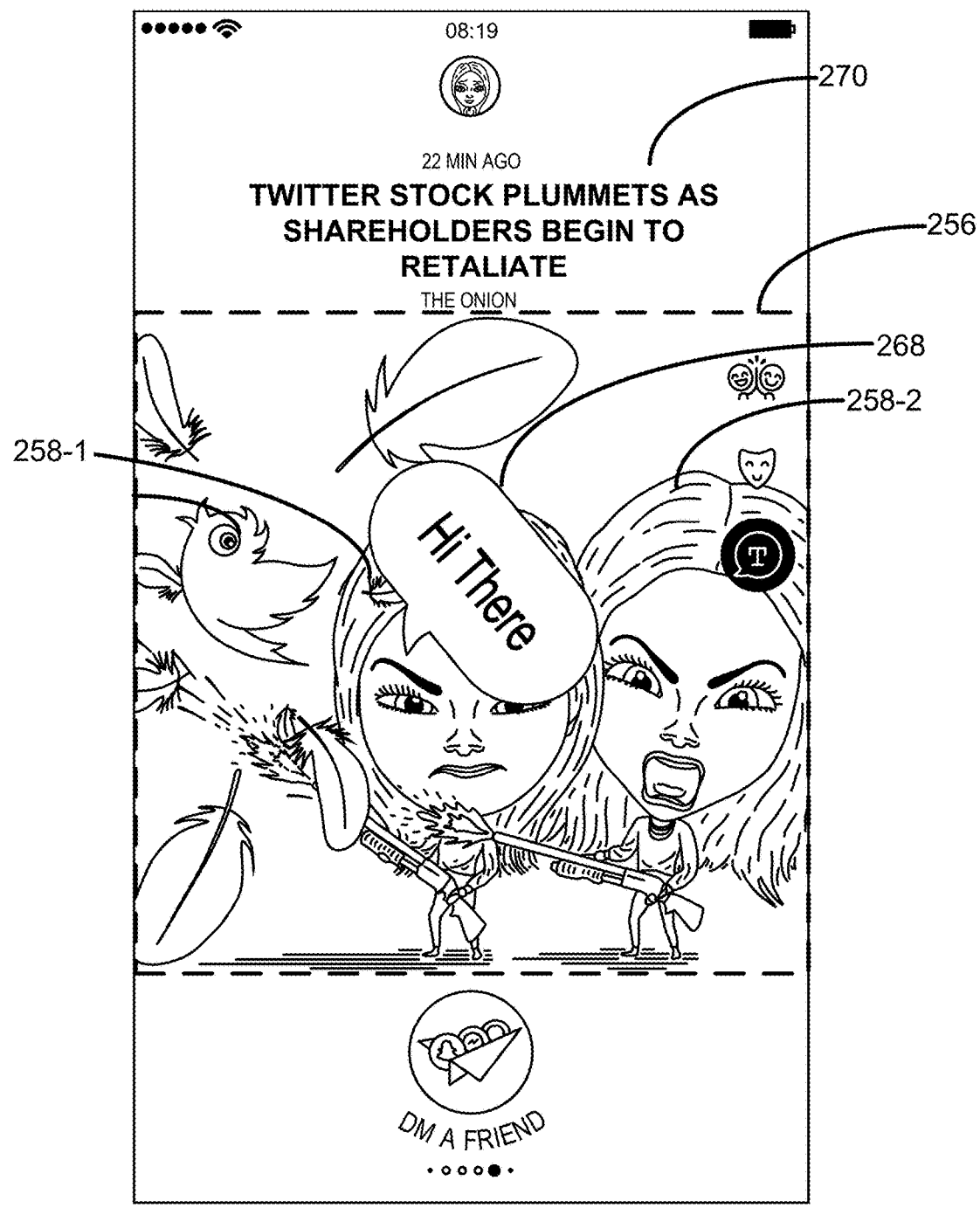
FIG. 14 illustrates providing a sticker to one or more other users using an application, where the sticker comprises: (i) the first avatar of the first user responsive to an event in a received electronic communication, where the first avatar comprises one or more visible layers that are present in a version of the first avatar that is stored in the user profile of the first sure and one or more visible layers that are not present in a version of the first avatar stored in the user profile of the first user and (ii) a second avatar associated with a different user in a contact list of the first user or an enumerated list of avatars where each avatar in the enumerated list of avatars represents a different public figure in accordance with some embodiments, and (iii) a first user provided expression encapsulated in a bubble in accordance with some embodiments.
Figure 15:
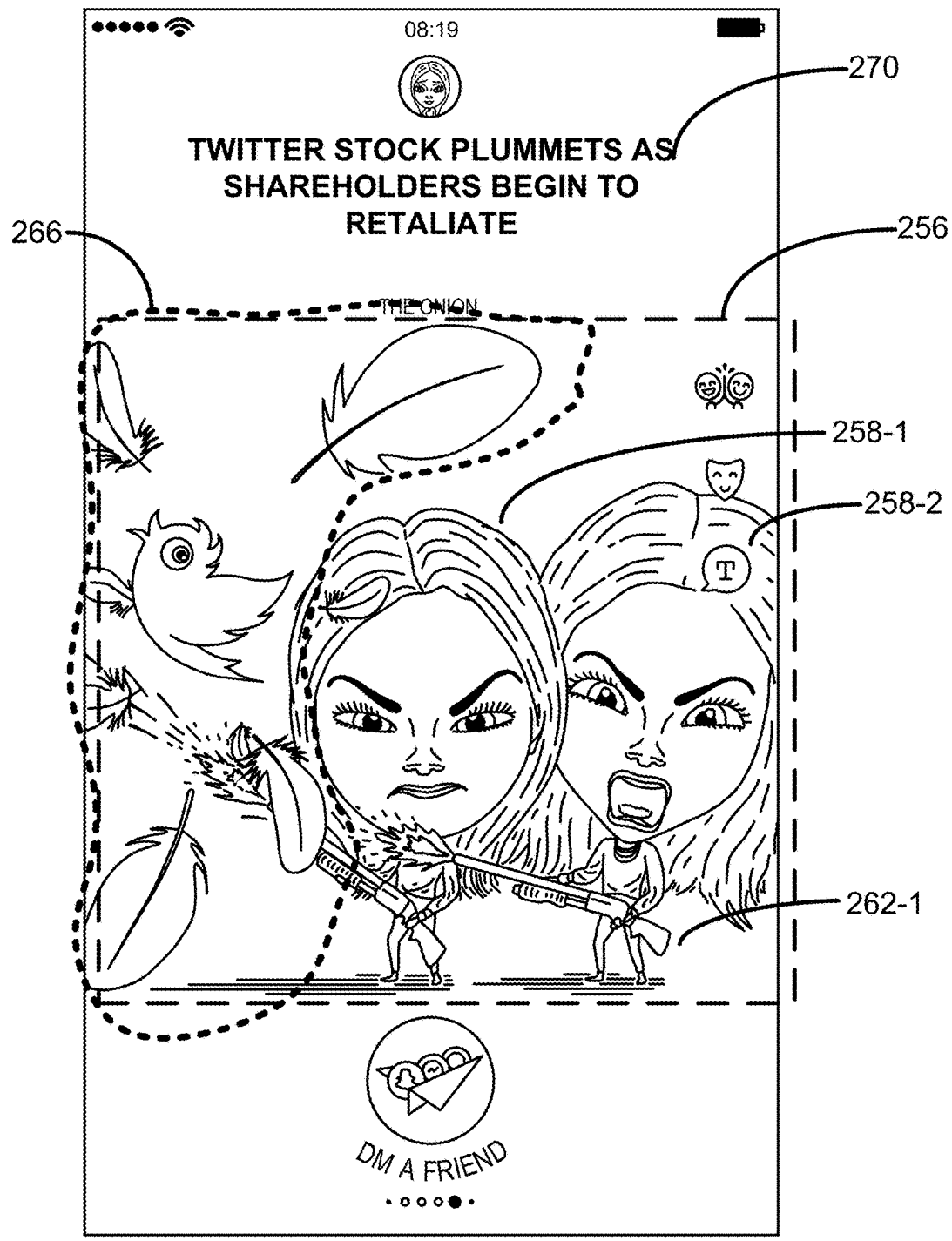
FIG. 15 illustrates providing a sticker to one or more other users using an application, where the sticker comprises: (i) the first avatar associated with the first user responsive to an event in a received electronic communication, where the first avatar in the sticker comprises one or more visible layers that are present in a version of the first avatar stored in a user profile of the first user and one or more visible layers that are not present in a version of the first avatar stored in the user profile of the first user and (ii) a second avatar associated with a different user in a contact list of the first user or an enumerated list of avatars where each avatar in the enumerated list of avatars represents a different public figure in accordance with some embodiments, and (iii) a prop or background scene in accordance with some embodiments.
Figure 18:
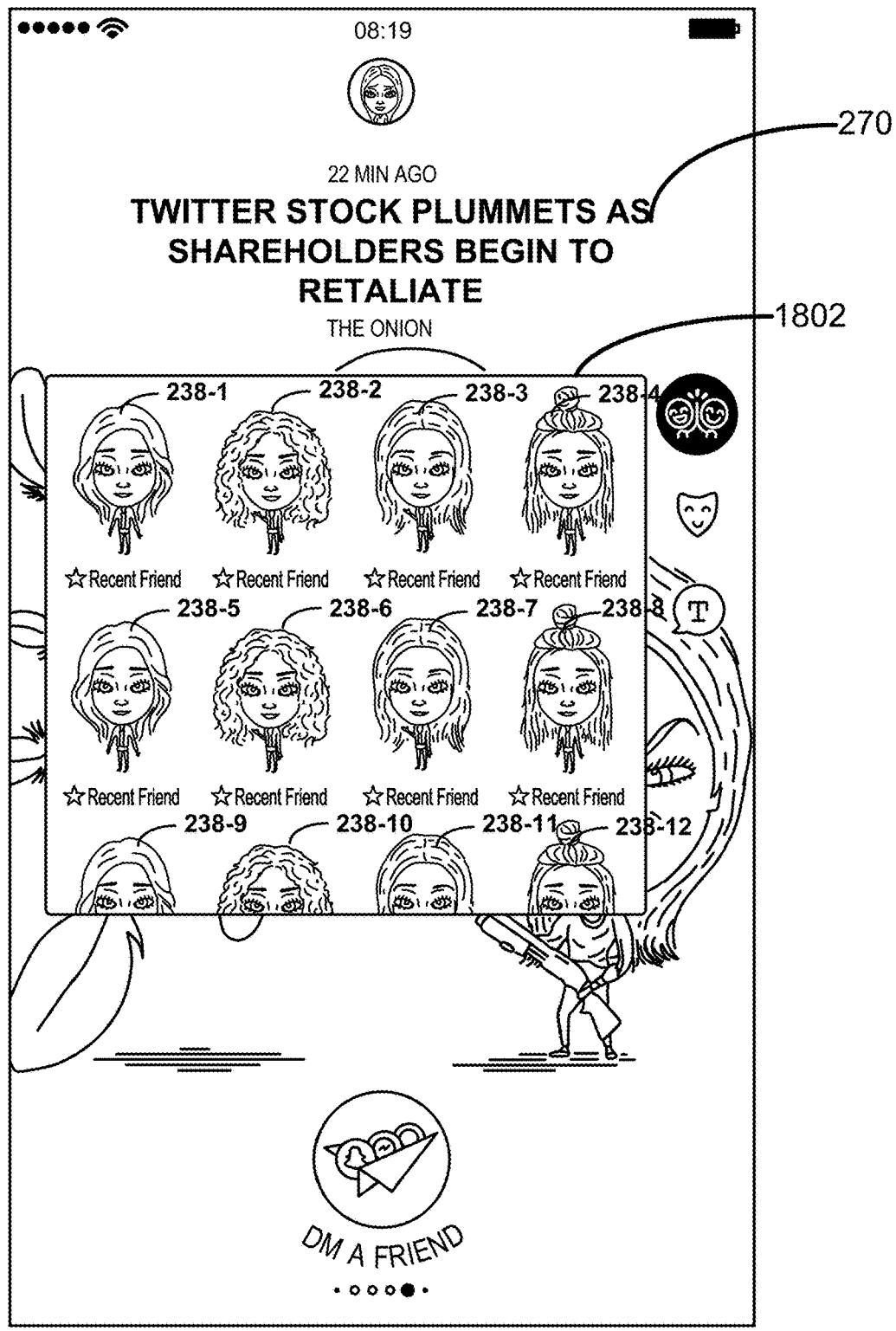
FIG. 18 illustrates providing a first affordance at a time after receiving a first electronic communication, where selection of the first affordance by the first user activates a first tool for selection from a plurality of second avatars other than a first avatar, where each second avatar in the plurality of second avatars is associated with a different user in a contact list of the first user within the application in accordance with some embodiments.

Referring to block 636 of FIG. 6G, in some embodiments the client application 236 provides at a time after receiving the first electronic communication 252 at the client application 236, a first affordance (e.g., a check box, a radio button, a slide bar, an input field, a radio button, a drop-down menu, a shopping cart, etc.). Selection of the first affordance by the first user 340 activates a first tool for selection from a plurality of avatars other than the first avatar 238. FIG. 18 illustrates an example first tool 1802 for selection from a plurality of second avatars 238 other than the first avatar 238. As illustrated in FIG. 18, each such second avatar 238 is associated with a different user in a contact list 250 of the first user within the client application 236. In some embodiments, additionally or instead of the contact list, an enumerated list of avatars is provided by the client application 236, where each avatar in the enumerated list of avatars represents a different public figure (e.g., figures that are generally known to substantial portions of the public, such as Barrack Obama, Donald Trump, etc.). In some embodiments, the enumerated list of avatars consists of two or more avatars each representing a different public figure. In some embodiments, the enumerated list of avatars consists of five or more avatars each representing a different public figure. In some embodiments, the enumerated list of avatars consists of ten or more avatars each representing a different public figure. In some embodiments, each avatar in the plurality of avatars is associated with (i) a different user in a contact list 250 of the first user 340 within the application or (ii) a famous person. Such a tool for adding additional avatars is accessed by selecting affordance 6102 in FIGS. 62 and 63. Responsive to receiving a selection of one or more second avatars from the plurality of avatars, the client application 236 compiles the one or more second avatars into the sticker 256. For instance, the tool has been to include the public figure "Santa Claus" into the sticker illustrated in FIGS. 62 and 63. Sticker 256 of FIG. 14 illustrates one such embodiment of the type of sticker 256 produced in accordance with block 438. The dashed box in FIG. 17 illustrates the sticker 256 prior to inclusion of one or more second avatars. In some embodiments, the user uses first tool 1802 illustrated in FIG. 18 to select one or more avatars from the user's contact list 250 and/or an enumerated list of public figures. FIG. 15 then illustrates the inclusion of one such additional avatar from the user's contact list 250 and/or an enumerated list of public figures in the sticker 256.

Referring to block 638 of FIG. 6G, in some embodiments, the client application 236 provides, at a time after receiving the first electronic communication 252, a second affordance (e.g., a check box, a radio button, a slide bar, an input field, a radio button, a drop-down menu, a shopping cart, etc.). Selection of the second affordance by the first user 340 activates a second tool for annotating the sticker with a user provided expression encapsulated in a bubble 268. FIG. 14 illustrates this result. The user has annotated the sticker with bubble 268 containing the message "Hi There."

Referring to block 640 of FIG. 6G, in some embodiments, the client application 236 provides, at a time after receiving the first electronic communication 252 at the client application 236, a first affordance and a second affordance (e.g., a check box, a radio button, a slide bar, an input field, a radio button, a drop-down menu, a shopping cart, etc.). Selection of the first affordance by the first user 340 activates a first tool for selection from a plurality of avatars other than the first avatar. Each avatar 238 in the plurality of avatars is associated with (i) a different user 340 in a contact list 250 of the first user 340 within the application or (ii) an enumerated list of avatars provided by the application. Each avatar in the enumerated list of avatars represents a different public figure. Responsive to receiving a selection of one or more second avatars from the plurality of avatars, the network communication module 234 compiles the one or more second avatars from the plurality of avatars into the sticker 256. Selection of the second affordance by the first user 340 activates a second tool for annotating the sticker with a first user 340 provided expression encapsulated in a bubble 268.

Figure 6H:
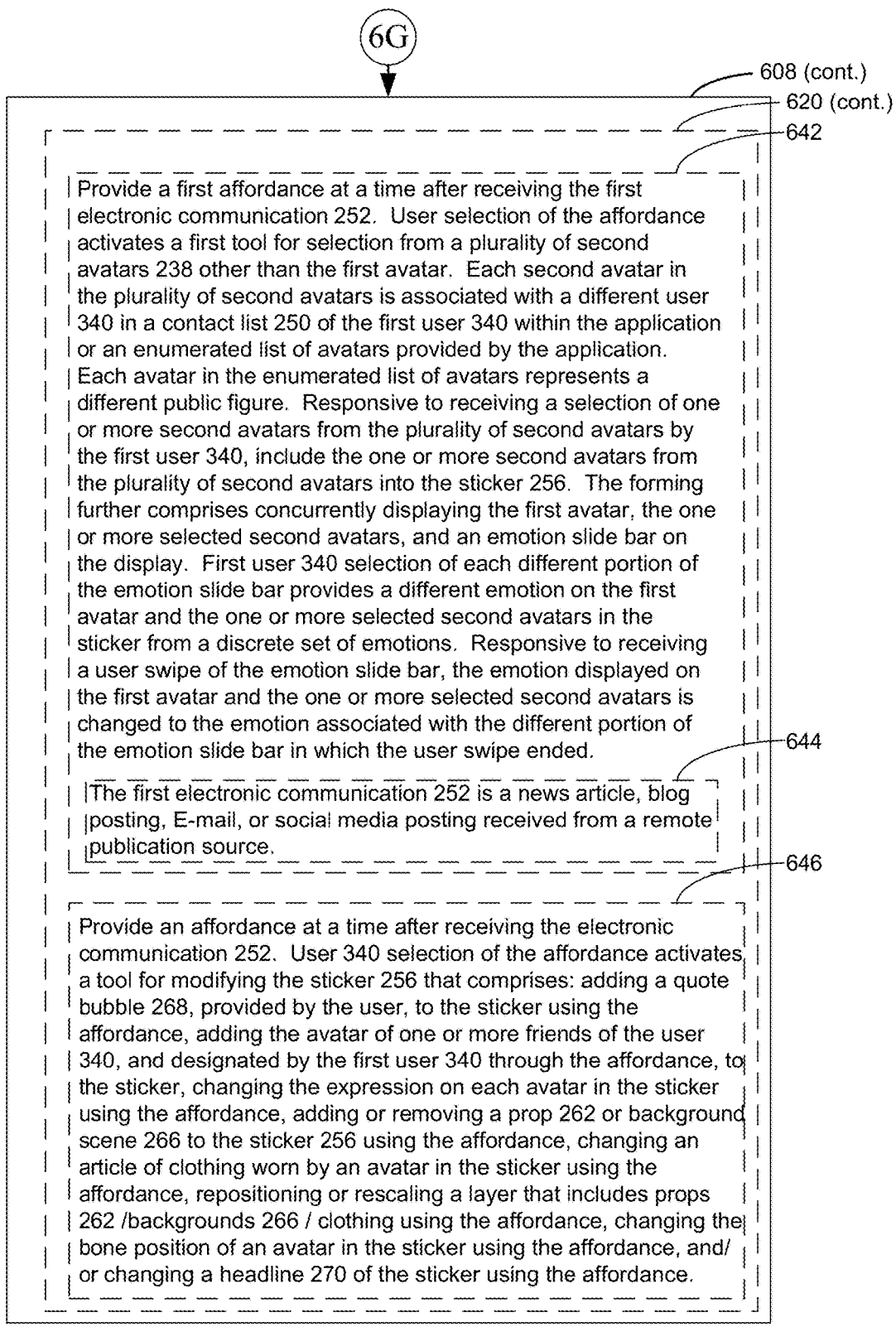

Referring to block 642 of FIG. 6H, in some embodiments, network communication module 234 provides a first affordance at a time after receiving the first electronic communication 252 at the client application 236. User selection of the affordance activates a first tool for selection from a plurality of second avatars 238 other than the first avatar. Each second avatar in the plurality of avatars is (i) associated with a different user 340 in a contact list 250 of the first user 340 within the application or (ii) an enumerated list of avatars provided by the application. Each avatar in the enumerated list of avatars represents a different public figure. Responsive to receiving a selection of one or more second avatars from the plurality of avatars by the first user 340, the client application 236 compiles the one or more second avatars from the plurality of avatars into the sticker 256. The forming further comprises concurrently displaying the first avatar, the one or more selected second avatars, and an emotion slide bar on the display. First user 340 selection of each different portion of the emotion slide bar provides a different emotion on the first avatar in the sticker and the one or more selected second avatars from a discrete set of emotions. An example of this is illustrated in FIG. 16. First user selection of each different portion 1602 of the emotion slide bar 1602 displays a different emotion on the first avatar and each second avatar in the one or more second avatars from a discrete set of emotions. Responsive to receiving a user swipe of the emotion slide bar 1602, the emotion displayed on the first avatar and the one or more selected second avatars in the sticker is changed to the emotion associated with the different portion 1604 of the emotion slide bar 1602 in which the user swipe ended. That is to say, in such embodiments, the emotion slide bar changes the emotion of each avatar 258 in the sticker 256 to the emotion associated with the different portion 1604 of the emotion slide bar 1602 last contacted by the user. In alternative embodiments, the user can use the emotion slide bar 1602 to change the emotion of a subset of the displayed avatars. For instance, referring to FIG. 16, in some embodiments, the user can use the emotion slide bar 1602 to change avatar 258-1 to a first emotion (a first portion of the emotion slide bar) and then use the emotion slide bar 1602 to change avatar 258-2 to a second emotion (a second portion of the emotion slide bar). Such embodiments require an avatar selection tool not shown in FIG. 16. Furthermore, it will be appreciated that there is no requirement that the emotion slide bar 1602 have a linear shape. In some embodiments, the emotion slide bar 1602 has a closed-form shape (e.g., polygon, elliptical or circular shape) and each different portion 1604 of the slide bar 1062 is associated with a different emotion that can be expressed on the altered avatar 258. Responsive to receiving a user swipe of the emotion slide bar, the emotion displayed on the first avatar, and in some embodiments the one or more selected second avatars, in the sticker is changed to the emotion associated with the different portion 1604 of the emotion slide bar 1602 in which the user swipe ended.

Referring to block 644 of FIG. 6H, in some embodiments the first electronic communication 252 is a news article received from a remote publication source. For instance, in some embodiments the remote publication source is CABLE NEWS NETWORK (CNN), FOX NEWS, REUTERS, or the ASSOCIATED PRESS and the news article is published by one of these remote publication sources over communication network 104. In some embodiments the first electronic communication 252 is a news article, a blog posting, an E-mail, or a social media posting received from a remote publication source.

Referring to block 646 of FIG. 6H, in some embodiments the client application 236 provides a first affordance (e.g., a check box, a radio button, a slide bar, an input field, a radio button, a drop-down menu, a shopping cart, etc.) at a time after receiving the first electronic communication 252 at the client application 236. Selection of the first affordance by the user 340 activates a tool for modifying the sticker 256. In some embodiments, the modifying the sticker 256 in accordance with block 646 comprises adding a quote bubble 268, provided by the first user, to the sticker using the first affordance. In some embodiments, the modifying the sticker 256 in accordance with block 646 comprises adding the avatar of one or more friends of the first user 340, and designated by the first user 340 through the first affordance, to the sticker. In some embodiments, the modifying the sticker 256 in accordance with block 646 comprises changing the expression on each avatar in the sticker using the first affordance. In some embodiments, the modifying the sticker 256 in accordance with block 646 comprises adding or removing a prop 262 or background scene 266 to the sticker 256 using the affordance. In some embodiments, the modifying the sticker 256 in accordance with block 646 comprises changing an article of clothing worn by an avatar in the sticker using the affordance. In some embodiments, the modifying the sticker 256 in accordance with block 646 comprises repositioning or rescaling a layer that includes props 262/backgrounds 266/clothing using the affordance. In some embodiments, the modifying the sticker 256 in accordance with block 646 comprises changing the bone position of an avatar in the sticker using the first affordance. In some embodiments, the modifying the sticker 256 in accordance with block 646 comprises changing a headline 270 of the sticker using the first affordance. In some embodiments, the modifying the sticker 256 in accordance with block 646 comprises making any combination of the changes enumerated in block 646 of FIG. 6H.

In some embodiments, the modifying the sticker 256 in accordance with block 646 comprises associating a sound construct 260, selected by the first user, to the sticker 256. In some embodiments, the sound construct 260 is sound recorded by the first user, such as a recorded message made by the first user. In some embodiments, the sound construct 260 is less than three seconds, less than 10 seconds, less than 30 seconds, less than one minute or less than 5 minutes of sound recorded in an uncompressed audio format, pulse-code modulation (PCM) format, waveform audio file (WAV) format, audio interchange file format (AIFF), MPEG-Audio Layer 3 (MP3) format, advanced audio coding (AAC) format, OGG (Vorbis) format, WINDOWS media audio (WMA) format, free lossless audio (FLAC) format, APPLE lossless audio codec (ALAC) format, WINDOWS media audio (WMA) format, or some other format. In some embodiments, the sound construct is a song or a part of a song. In some embodiments, the sound construct 260 comprises a sound effect, such as horns blowing, a crowd cheering, a crowd booing, or person crying, or a person laughing, etc.

In some embodiments, the modifying the sticker 256 in accordance with block 646 comprises adding or removing a prop 262 to the sticker using the affordance. For instance, FIG. 15 illustrates a prop 262 in the sticker 256. Non-limiting examples of props 262 a user can use to modify the sticker in accordance with block 446 includes furniture, tools, flags, balloons, signs, crosses, weapons, garbage cans, animals, cages, or other objects. In some embodiments, the user selects the prop 262 for inclusion in the sticker 256 from a stock panel of props offered by client application 236. In some embodiments, the user is able to add their own props 262 the stock panel of props offered by client application 236 for inclusion in the sticker 256 in accordance with block 446.

In some embodiments, the modifying the sticker 256 in accordance with block 646 comprises adding a background scene 266 to the sticker 256 using the affordance. FIG. 15 illustrates one such background scene 266, which is highlighted with a dotted line (which is not part of the sticker 256). The background scene 266 of FIG. 15, by way of illustration, includes birds being targeted with guns.

In some embodiments, the modifying the sticker 256 in accordance with block 646 comprises adding and/or changing a headline 270 of the sticker using the first affordance. FIG. 15 illustrates a headline 270. If the user does not edit the headline 270, the headline 270 is the sticker provided in the original default electronic communication 252 that the user selected at the outset.

It should be understood that the particular order in which the operations described above and illustrated in FIGS. 6A-6H have been described is merely exemplary and is not intended to indicate that the described order is the only order in which the operations could be performed. One of ordinary skill in the art would recognize various ways to reorder the operations described herein.

Thus FIG. 6 illustrates how client application 236 can be used to make use of pre-designed assets that will look just like the user. Moreover, by paying attention to the topical categories 248 in the user's profile in some embodiments, when the client application 236 presents a sticker representing a notable event, and optionally an electronic communication that provides information about the event, the sticker will include a version of the user's avatar mimicking the reaction the user would have to the event. In some embodiments client application 236 enables this by helping the user to create a base avatar 238 that looks just like the user, but then adds different interests (categories 248) to its brain (user profile 246) as discussed above in conjunction with FIG. 8 in some embodiments. So, in some embodiments, the user of client application 236 can add interests (categories 248) such as world events, politics, sports, Hollywood gossip, Silicon Valley technology, Wall Street, Music, Culture, and/or humor. Depending on those interests that the user adds to their brain, if any breaking events within those interests occur during a given epic (e.g., that day, the past hour, the past five minutes) the user will see their avatar 238, now altered in response to the event and in the form of an altered avatar 258 in "real time" (within an hour or two), where the altered avatar 258 appears to be reacting to the event. As an example, consider the case where the user has made an avatar 238 of themselves. The avatar 238 looks just like the user. Moreover, the user has added politics and sports to their brain (e.g., included topical categories 248 "politics" and "sports" to their user profile 246. Consider further that at 12 o'clock that day the Warriors win the championship. When the user opens up the client application 236 at 1 o'clock that day, the user will see their avatar 238, now in the form of an altered avatar 258 jumping on the court with Jeff Curry and Dray Mongreen wearing quick and long shirts. If the user likes this depiction, they can send it to other users.

In this way, client application 236 serves to present news and other events in an entertaining format where the user is watching a mini-clone of themselves, almost a mini-robot of themselves (in the form of altered avatar 258) reenact everything that happened in the world that day. This provides a more interesting way to consume news than traditional methods such as reading *The New York Times* or reading ESPN and so forth, and it is all based on entertainment and allowing the user to subconsciously retain the information that comes along with it and also share it with others.

In some embodiments, the client application 236 adds a quote bubble 268, provided by an entity other than the application or the first user 340, to the sticker 256, associates a sound construct 260, provided by an entity other than the application or the first user 340, to the sticker 256, or adds or removes a prop 262 or background scene 266, provided by an entity other than the application or the first user 340. By way of example, this other entity is a retailer, or other form of business organization that pays to have the quote bubble, sound construct, prop or background scene added to the sticker. In some embodiments, the prop or background scene is animated in the sticker meaning that is moves or changes shape within the picture over time. In some embodiments, the prop is animated in the sticker by causing the prop to launch off the sticker over time so that after a while the prop is no longer in the sticker.

Server Implementations and Bridge Tool.

A server implementation bridge tool in accordance with some aspects of the present disclosure is provided. In some embodiments, the server implementation bridge tool is a component of application server module 108 illustrated in FIGS. 1 and 3.

This aspect of the present disclosure provides a method of customizing avatars 238 responsive to a plurality of events in which a first event in the plurality of events is received. In some embodiments, the first event is a news article received from a remote publication source. In some embodiments, a first topical category 248 is determined for the first event from among a plurality of topical categories. Then, a plurality of assets is obtained responsive to the first event. The plurality of assets determines a position on a first avatar 238 in a scene over time. The first avatar 238 is associated with a first user 340 that has designated an interest in the first topical category 248.

Figure 19:
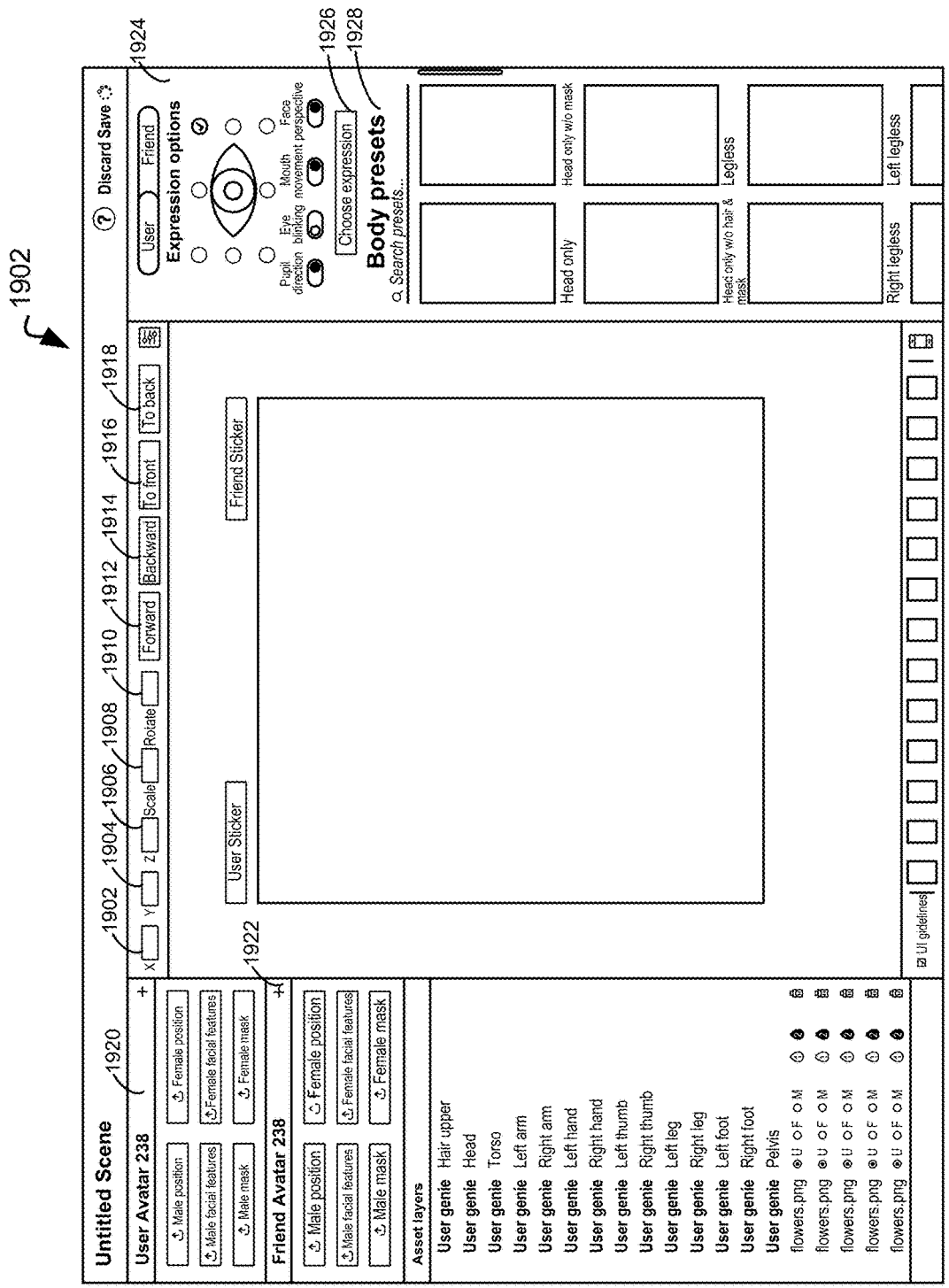
FIG. 19 illustrates a graphical user interface for obtaining a plurality of assets responsive to an event, where the plurality of assets determines a position of a portion of a first avatar in a scene over time (e.g., leg up, leg down, arm up, arm down, head to right, head to left, etc.), where the first avatar is associated with a first user, obtaining the first avatar from a user profile associated with the first user, and forming a sticker comprising a version of the first avatar, where the version of the first avatar comprises: (i) one or more visible layers that are present in a version of the first avatar stored in the user profile of the first user and (ii) one or more visible layers that are not present in the version of the first avatar stored in the user profile of the first user and that include all or a portion of the plurality of assets thereby forming a sticker in accordance with some embodiments.
Figure 20A:
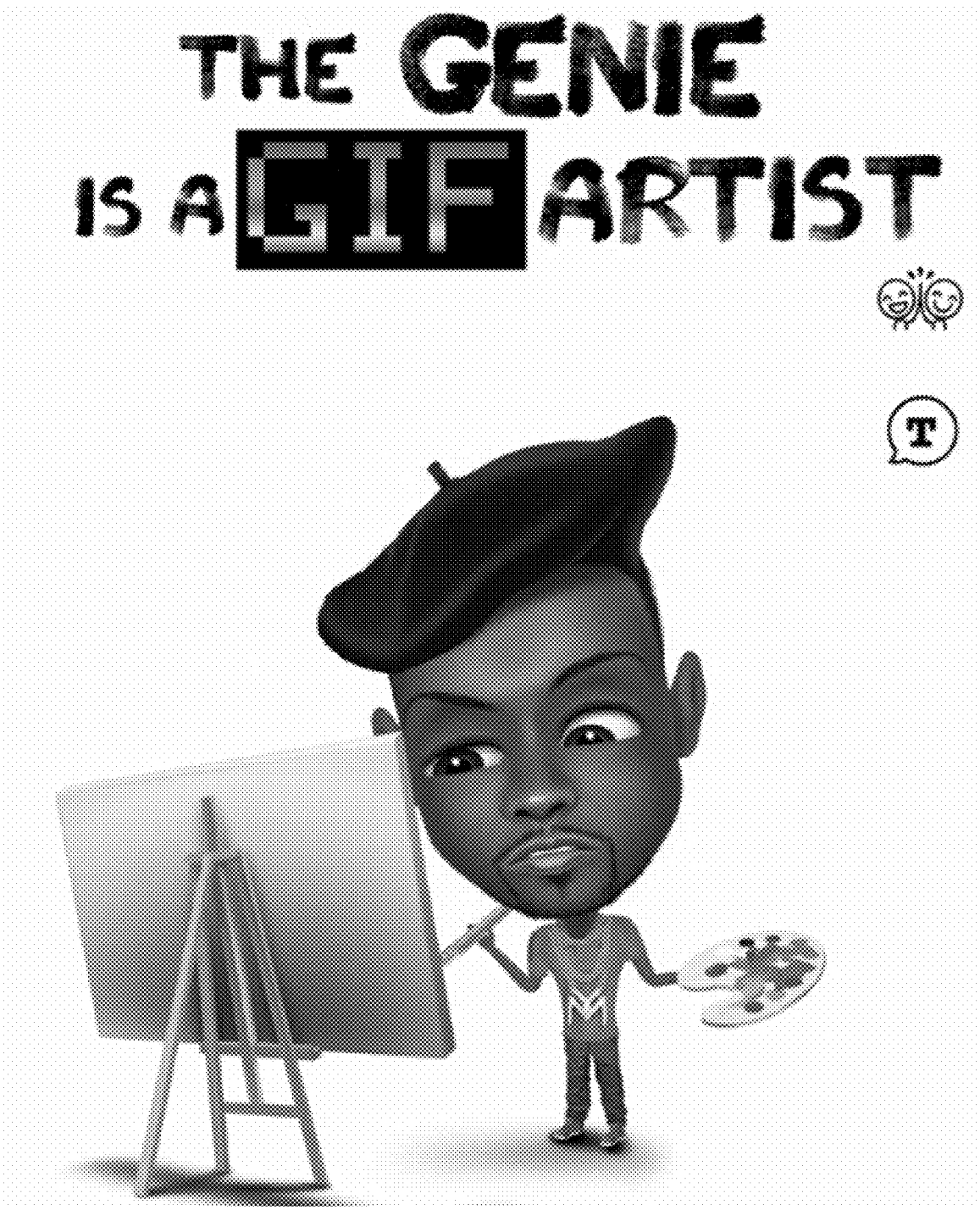
FIGS. 20A, 20B, 20C, and 20D collectively illustrate a sticker in which components within the sticker are animated in accordance with an embodiment of the present disclosure.
Figure 20B:
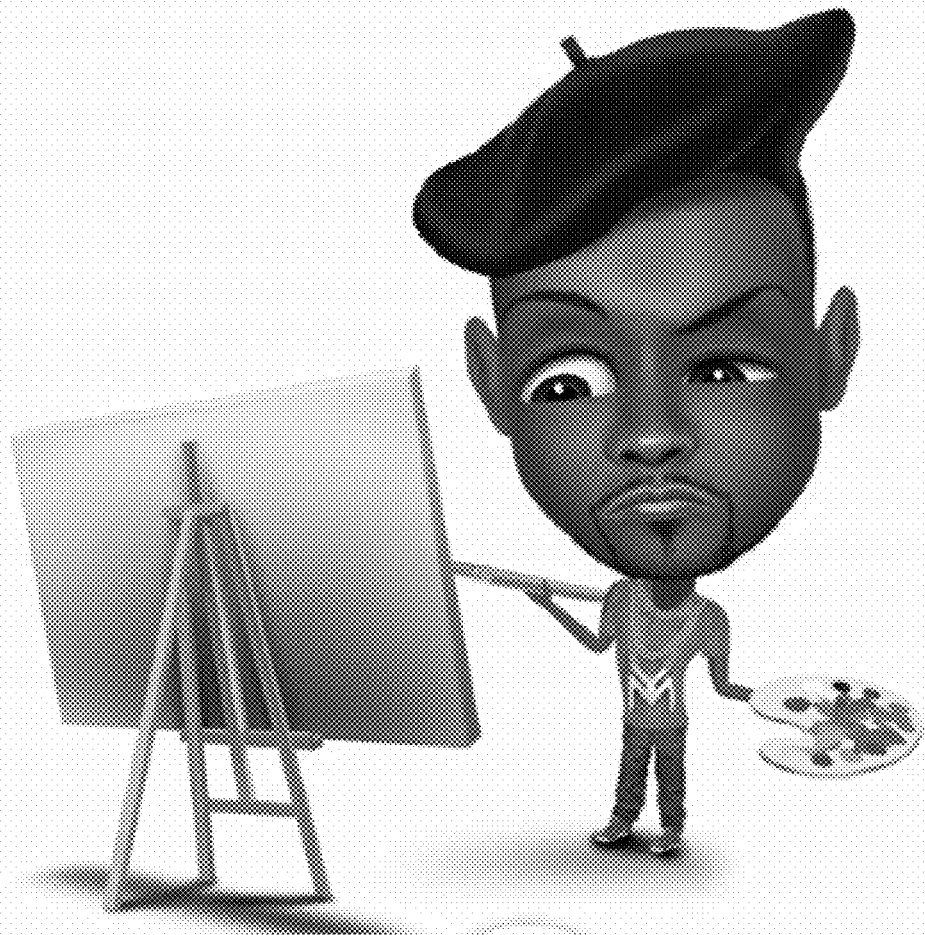
Figure 20C:
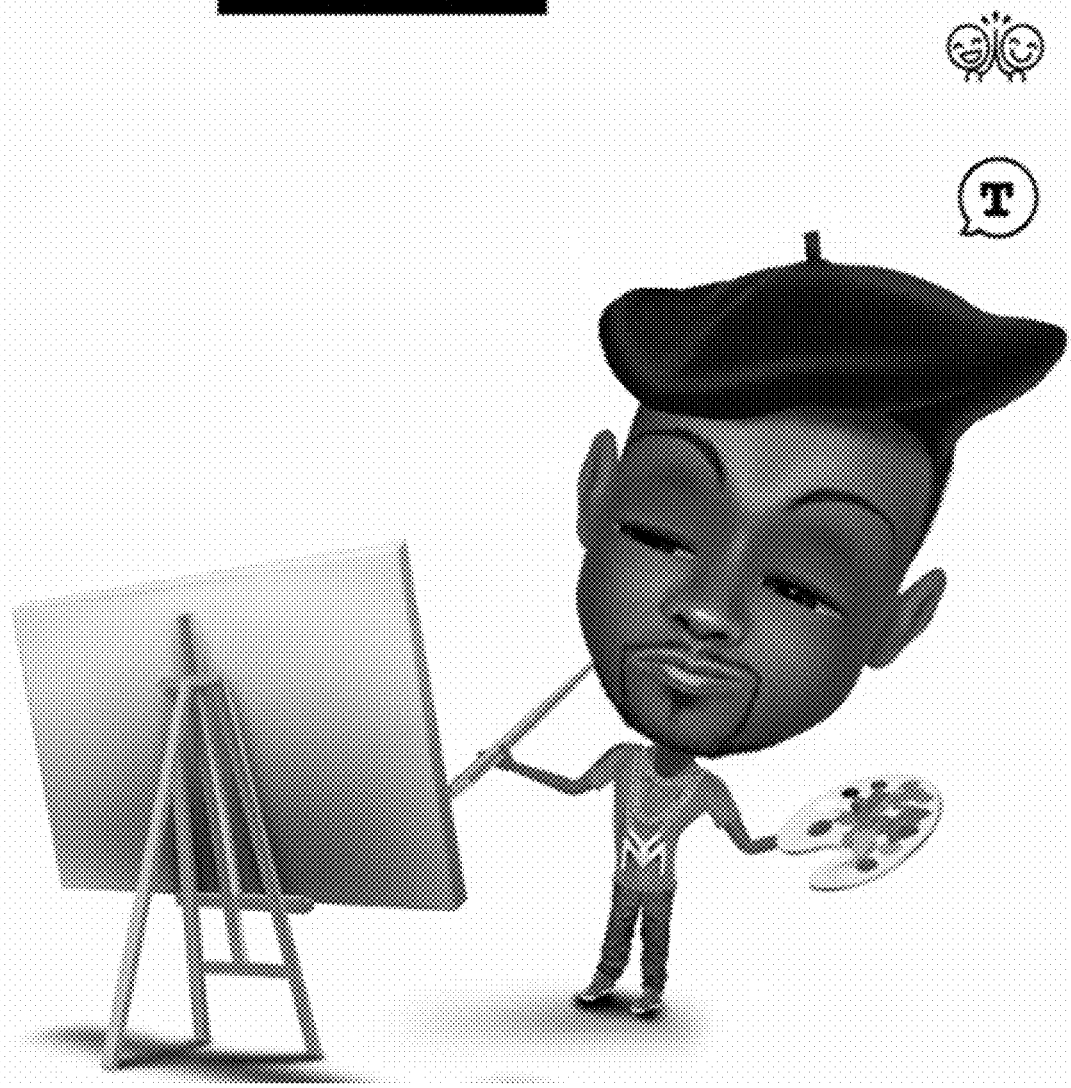
Figure 20D:
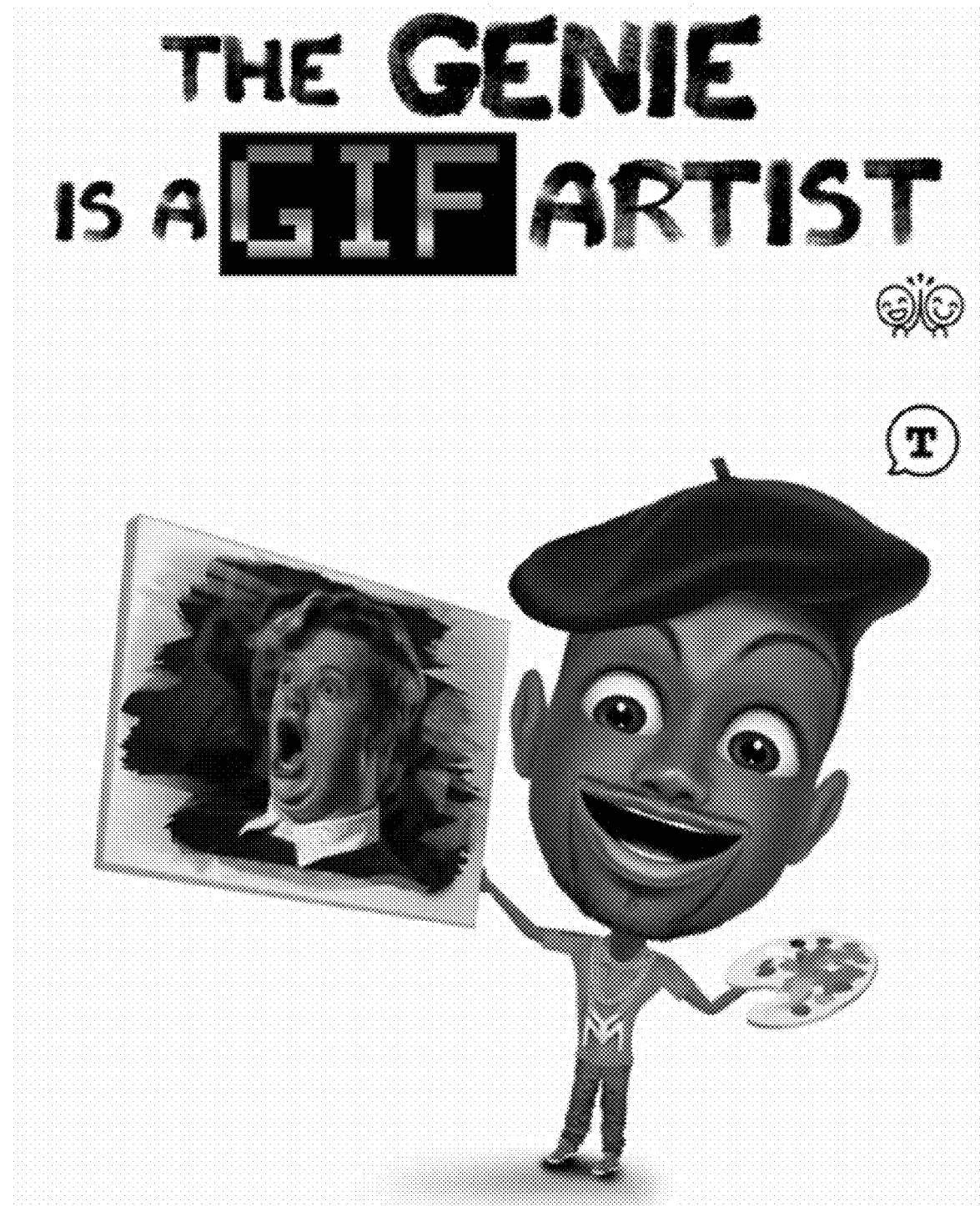
Figure 21A:
FIGS. 21A, 21B, 21C, 21D, 21E, 21F, and 21G collectively illustrate a sticker in which components within the sticker are animated in accordance with another embodiment of the present disclosure.
Figure 21B:
Figure 21C:
Figure 21D:
Figure 21E:
Figure 21F:
Figure 21G:

In response to an event, described in an electronic communication 252, a designer, illustrator, and/or animator operating in conjunction with server system 106 can design a sticker 256 that describes the event. For instance, consider the hypothetical event in which TWITTER stock plunges and that TWITTER stockholders have begun to retaliate. A designer, illustrator, and/or animator builds a sticker 256 that includes background 266 illustrated in FIG. 15, that is blue birds representing TWITTER being shot at. This sticker can then be imported into a the "Scene Builder" bridge tool 1902 illustrated in FIG. 19. In some embodiments, the initial template sticker 256 designed by a designer, illustrator, and/or animator in response to an electronic communication 252 concerning an event is designed in a commercial application such as ADOBE PHOTOSHOP. Regardless of its originating source, all the assets associated with the designed sticker 256 made responsive to the event in the electronic communication 252 are imported into the scene builder module 1902 for further modification by a designer, illustrator, and/or animator before sending the final product to an end client user as a sticker for the end client user to then modify and share with select contacts of the end client user.

In some embodiments, the assets associated with the designed sticker 256 made responsive to the event in the electronic communication 252 that are imported into the Scene Builder 1902 constitute a plurality of layers. Advantageously, the scene builder module allows a user to rearrange or adjust each of the assets. For instance, affordances X 1904, Y 1904, and Z 1906 respectively allow a user to independently position assets relative to each other along the X, Y, and Z Cartesian axes of the scene. Affordance 1908 allows the designer to independently scale each of the assets to different sizes within the scene, while affordance 1910 allows the designer to independently rotate each of the assets with respect to the overall scene. Affordances 1912, 1914, 1916, and 1918 respectively allow the designer to promote an asset forward relative to other assets, send an asset backward relative to other assets, bring an asset to the front before all other assets, and send an asset to the back behind all other assets. In some embodiments, a layer is a sprite sheet animation. A sprite sheet is a bitmap image file that contains several smaller graphics in a tiled grid arrangement. By compiling several graphics into a single data construct, the sticker, the enable animation of the layer in other applications that receive the sticker.

Advantageously, the bridge tool 1902 allows the designer to designate which layers within a sticker 256 will be visible to which users. This is useful, for instance, for customizing the sticker 256 in a gender specific manner. For instance, for each layer, the designer can designate permissions such as "show this layer to all our users," show this layer to male users, "show this layer to female users." This allows the designer to use bridge tool 1902 to have each user wear custom clothes, for instance the designer will make a male shirt in a layer that is only visible to male users, a female shirt in a layer that is only visible to female user, and so forth.

Advantageously further, the bridge tool 1902 can be used to tint a layer. Consider the case where the designer wants a sticker 256 where the altered avatar 258 has comically large hands. The designer can draw hands (or import an asset depicting hands) that are not part of the avatar's original hands. The designer then matches the user's avatar's skin colors, to tint the new hands to the user's skin color. The bridge tool 1902, or software working in conjunction with the bridge tool 1902 then, creates the sticker 256 containing the altered avatar 258 with a layer of tinting and then gender.

Panels 1920 "User Avatar" and 1922 "Friend Avatar" allow the designer to input the data from a commercial software package to position an avatar 238 to thereby form altered avatar 258. For instance, the designer can use panels 1920 and 1922 to adjust avatar body positions (e.g., place the avatar's arm up, place the avatar's leg up, etc.) The designer, illustrator, and/or animator can also upload other assets to do some facial modification. The designer, illustrator, and/or animator can also upload full avatar body movement/animations.

Expression options panel 1924 of the bridge tool 1902 allows the user to animate avatar facial expressions. Because very fast turnaround is needed between event notification and electronic communication distribution 252 with stickers 256 highly specific, but focused, animation tools are provided in some embodiments. Consider the case where the designer, response to an event, is designing a first sticker 256 where the altered avatar 258 is holding a golf club and the designer is designing a second sticker 256 where the altered avatar is holding a baseball bat. In both stickers 256 an animated expression may be desired: in the golf club sticker the designer wants to convey a face looking downwards whereas in the baseball sticker the designer wants to convey a face looking upwards. Advantageously, to support this type of avatar alteration, the disclosed systems and methods provide a library of animated expressions. In some embodiments there are more than 100 versions of each expression. The designer picks from among these expressions, which are accessed through panel 1924. For instance, as illustrated in panel 1924, the designer can quickly set which direction the altered avatar 258 eyes are focused, whether the eyes are blinking, mouth movement and face perspective. Thus, the designer can use panel 1924 to designate whether the pupils of the altered avatar 258 are to move or to be fixed. The designer can use panel 1924 to designate whether the eyes of the altered avatar 258 are to be able to blink or not. The designer can use panel 1924 to designate whether the mouth of the altered avatar 258 is to move or not. The designer can use panel 1924 to designate whether the face of the altered avatar 258 is to move or not. Further, the designer can use affordance 1926 to pick an actual expression from a library of expressions.

Furthermore, the bridge tool 1902 provides body presets 1928. Consider the case where the designer wants the altered avatar 258 to be parasailing in response to an event or to be in a spacesuit in response to an event. In such instances, body presets 1928 are invoked to insert only portions of the altered avatar 258 into a sticker 256 (e.g., "insert only the head" of the actual avatar into the sticker 256). Then the designer can just add a layer that includes a spacesuit. In this way, the avatar appears to be in a spacesuit. Likewise, body presets 1928 of bridge tool 1902 has presets for avatars without legs. This is useful in situations where the designer, for example, wants the altered avatar that will be appearing in a sticker 256 to be skates. In such an instance, the designer would make a gendered, painted asset, and then put on a legless avatar body to the asset in order to form a sticker 256 that conveys the image of an avatar on skates.

Thus, the bridge tool 1902 allows a designer to develop a sticker 256 for each user event possible. In some embodiments, the bridge tool 1902 provides over 3 million different avatar combinations. The bridge tool 1902 serves as a way to acquire assets from commercial packages that serve as the props 262, foreground elements 264, and background 266 of scenes. Moreover, the bridge tool 1902 allows for the rearrangement, scaling, and coloring of these components, and to determine which client user stickers 256 get which components (e.g., as in the gender example discussed above). One of the assets acquired is the base avatar 238 of each prospective client user. This base avatar 238 is then modified using the bridge tool 1902 to form the altered avatar 258 that appears to be reacting to the event associated with an electronic communication 252. The bridge tool is advantageously in the form of a computer graphic interface because designers prefer to work visually rather than programmatically. FIGS. 20 and 21 illustrate example animated stickers in accordance with an aspect of the present disclosure.

As such, the bridge tool 1902 enhances a workflow in which a news or other form of event breaks. When this occurs, a brief writer, within 10 to 15 minutes, writes up a description almost like a director on what the brief write thinks the sticker describing the event should look like. Then, a designer/illustrator makes the sticker and mocks it up, sketched it out within an hour. The designer can use the bridge tool 1902 tool once the sticker 256 is ready to be sent out to users so that such users can get the electronic communication 252 conveying the event and the proposed sticker 256 that shows the altered avatar 258 reacting to the event, within their respective client applications 236. In some embodiments, this entire work flow occurs within an hour or two of the breaking of the event.

Thus, consider the case where there are 100 client users that are all interested in the Golden State Warriors. Consider further that the Warriors win a game. It is determined that this is newsworthy. So, a summary of the game is made and the disclosed systems and methods are used to communicate this to the 100 relevant users. As such, a sticker is designed that conveys the Warriors winning, and then for each respective user of the 100 users, the respective user's avatar 238 is modified and incorporated, as an altered avatar 258, into the sticker 256 received by that user in conjunction with a headline in the sticker conveying that the Warriors won the game, where the altered avatar shows their favorable reaction to their favorite team winning a game. The avatars for those 100 people are all different, so the disclosed systems and methods must pull up each of the 100 different default avatars and change their expression in the manner specified by the bridge tool 1902 in order to form the 100 different stickers for the 100 different users. This scale is merely exemplary. In fact, in more typical instances, there are 1000 or more different targeted users for a given electronic communication, each requiring a unique sticker 256 using the disclosed techniques, there are 10,000 or more different targeted users for a given electronic communication, each requiring a unique sticker 256 using the disclosed techniques, 100,000 or more different targeted users for a given electronic communication, each requiring a unique sticker 256 using the disclosed techniques, or 1,000,000 or more different targeted users for a given electronic communication, each requiring a unique sticker 256 using the disclosed techniques. Thus, the disclosed systems and methods take what a designer has implemented through the bridge tool 1902 and outputs hundreds, thousand, tens of thousands, or millions of different stickers, one for each client user.

Thus, in typical embodiments, the bridge tool 1902 is focused on the component of an avatar 238 that have to do with expression, but doesn't have to do with hair color or skin color or all the other things that are coded in the base avatar 238 that were set up by the user, using for example the processes discussed above in conjunction with FIG. 6. In typical embodiments, the bridge tool 1902 modifies avatar body position, a gender layer, a tint layer, expression, or body presets. Thus, for example, consider the case where the Incredible Hulk has a new movie coming out and it is contemplated that a lot of stickers about the Incredible Hulk will be needed. An Incredible Hulk Body Preset can be added to bridge tool 1902 component 1928 that will take any user's avatar's skin color, whatever it is, and turn it green. So the designer in this tool, using Body Presets 1928, selects the Incredible Hulk body preset and the avatar 238 of every single user gets the selected body Preset: e.g., the body preset could constitute an added big nose, small nose, whatever, with the skin color turned green in forming the sticker 256 that includes the altered avatar 258 showing that user's avatar reacting an electronic communication pertaining to the Incredible Hulk movie. Thus, advantageously, the bridge tool 1902 can be used to specify several different things about the avatar that then get globally processed against many, many, many unique avatars that were each created by a user. As such, the designer does not have to go in and change everybody's avatar manually. They use the bridge tool 1902 to just change a unique set of features that are applied to each avatar 238 to thereby form the unique avatars 258 responsive to an event that are in the stickers 256. In some embodiments, the avatar 238 is put into a sticker verbatim, e.g., with no changes. More typically, the bridge tool 1902 is used to form altered avatars in which, for example, to hats have been put on them or wigs on them (e.g., to represent Donald Trump) clothing has been changes, etc.

In this way, the client application 236 is self-promoting in the sense that it is going to strike a chord with some client users—the altered avatar that comes out—and they will laugh and see themselves with this quite unique expression that is unique in that it is what their reaction would have been themselves as a person to an event. And then they will share it with other users. The ability to include the altered avatar of a friend just adds to the uniqueness of the sticker 256 that is derived. Further, the ability of the user to add a message in a bubble to the sticker 256 adds to the uniqueness of the sticker 256 that is derived for an event. As such, the discloses systems and methods are combining (1) a user's chosen avatar 238 for themselves coupled with a designer's modifications in reaction to something newsworthy, that newsworthy thing being something that the user themselves said was a category that they would interested in. Further, the user can add a friend or not add a friend. Further, the user can add a bubble or not add or not add a bubble message. The user can then share the sticker 256 with people on a timely basis in reaction to the news or other types of events.

Accordingly, in some embodiments the first avatar 238 is obtained from a user profile associated with the first user. Then a sticker 256 is formed comprising an altered version 258 of the first avatar. The altered version 258 of the first avatar comprises: (i) one or more visible layers that are present in the first avatar 238 and (ii) one or more visible layers that are not present in the first avatar and that include all or a portion of the plurality of assets thereby forming a sticker 256. In some embodiments the one or more visible layers that are not present in the first avatar 238 comprises a gender layer 244 that customizes the altered version 258 of the first avatar in accordance with a gender of the first user 340. In some embodiments, the one or more visible layers not present in the first avatar 238 and that include all or a portion of the plurality of assets comprises one or more assets that are tinted to a skin color of the first avatar 238 that is specified in the user profile 246 associated with the first user 340. In some embodiments the forming specifies the Cartesian coordinates of a body part of the first avatar 238 in a background scene 266 over time. In some embodiments, the body part is a torso, a hand, a finger, a thumb, a pelvis, a foot, a leg, or an arm of the first avatar 238.

In some embodiments, the altered version 258 of the first avatar includes a pair of eyes, a pair of eyelids, a set of lips, and a pair of eyebrows. The altered version 258 of the first avatar is rendered dynamic within the sticker 256 by relative movement of the pair of eyes, the pair of eyelids, the set of lips and the pair of eyebrows with respect to the altered version 258 of the first avatar through a repeating pattern of expressions over time.

In some embodiments, the altered version 258 of the first avatar is rendered dynamic within the sticker 256 by any combination of: varying an amount of facial bone deformation, varying a pupil size, varying eyelid position, varying an eye size, varying pupil position, varying mouth position, varying nose position, varying ear position, varying a mouth size, or varying a face perspective in the altered version 258 of the first avatar, thereby effecting a repeating pattern of expressions over time.

In some embodiments, the altered version 258 of the first avatar is rendered dynamic within the sticker 256 by any combination of: varying a position of the altered version 258 of the first avatar in the sticker 256 over time, varying a scale of the altered version 258 of the first avatar in the sticker 256 over time, or moving a body part of the altered version 258 of the first avatar in the sticker 256 over time.

In some embodiments, the altered version 258 of the first avatar is rendered dynamic within the sticker 256 by at least moving one or more body parts of the altered version 258 of the first avatar in the sticker 256 over time, where the one or more body parts is selected from the group consisting of the arms, the feet, the legs, the hands, the neck, or the head of the altered version 258 of the first avatar.

In some embodiments, the sticker 256 is provided to the first user along with a first electronic communication 252 that describes the first event.

In some embodiments, the method further comprises previewing the sticker 256 prior to providing the sticker 256 to the first user (e.g., using the bridge tool 1902).

In some embodiments, the above described steps are performed for each respective user in a plurality of users that has user that has designated an interest in the first topical category 248. For instance, in some embodiments, more than 1000 users, more than 10,000 users, or more than 100,000 users have designated an interest in the first topical category 248.

In some embodiments the above described processes are performed for a second event in the plurality of events, where the second event has a different topical category 248 than the first event.

Additional Embodiments

Methods for customizing avatars and including them in stickers have been disclosed. Reference is now made to additional embodiments of the present disclosure.

Figure 4:
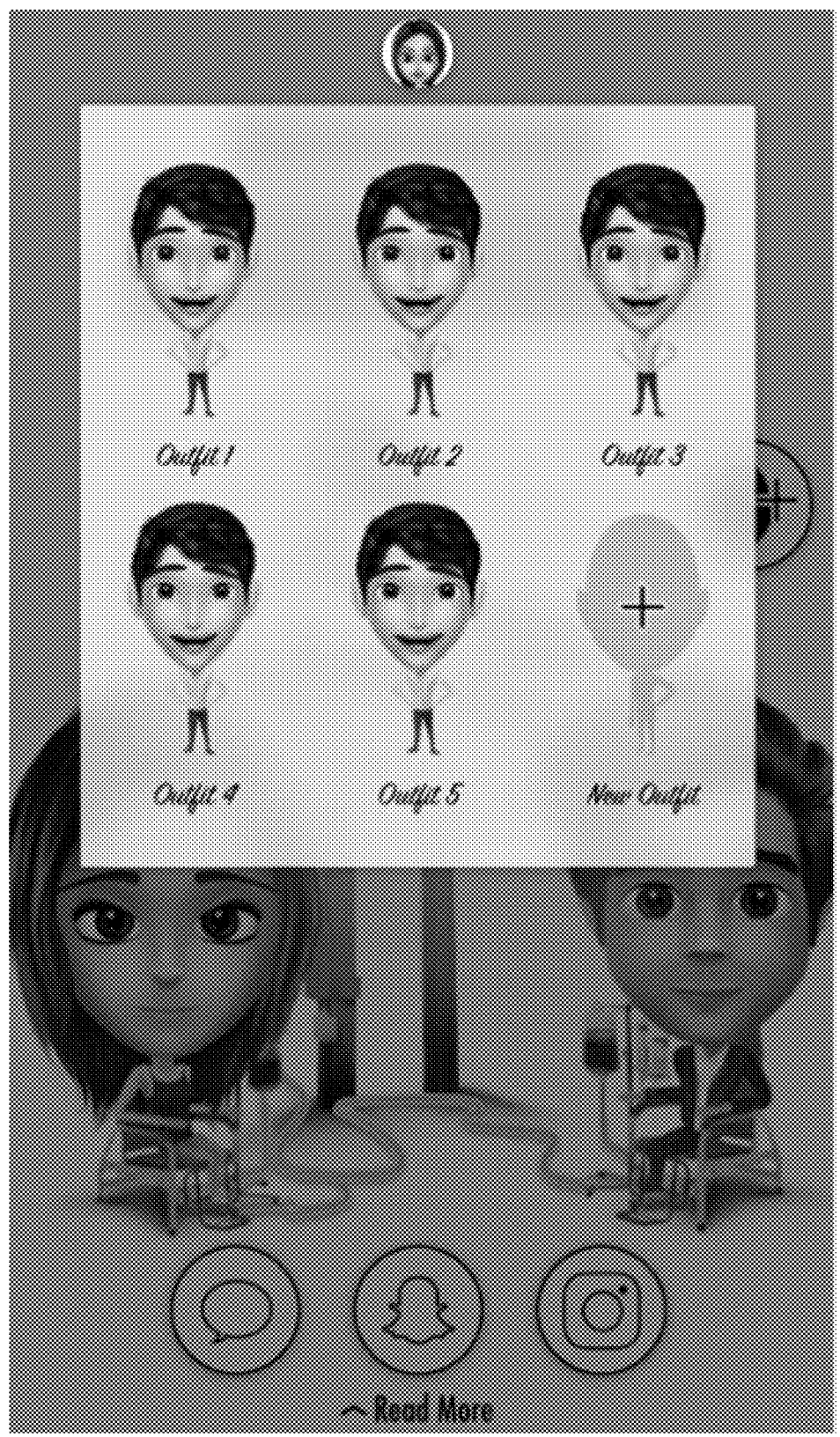
FIG. 4 illustrates how a user can store an outfit (e.g., upper garment, lower garment), such as workout clothes or formal wear, to use in stickers in accordance with the present disclosure.

FIG. 4 illustrates how a user can store an outfit (e.g., upper garment, lower garment), such as workout clothes or formal wear, to use in stickers in accordance with the present disclosure.

Figure 5:
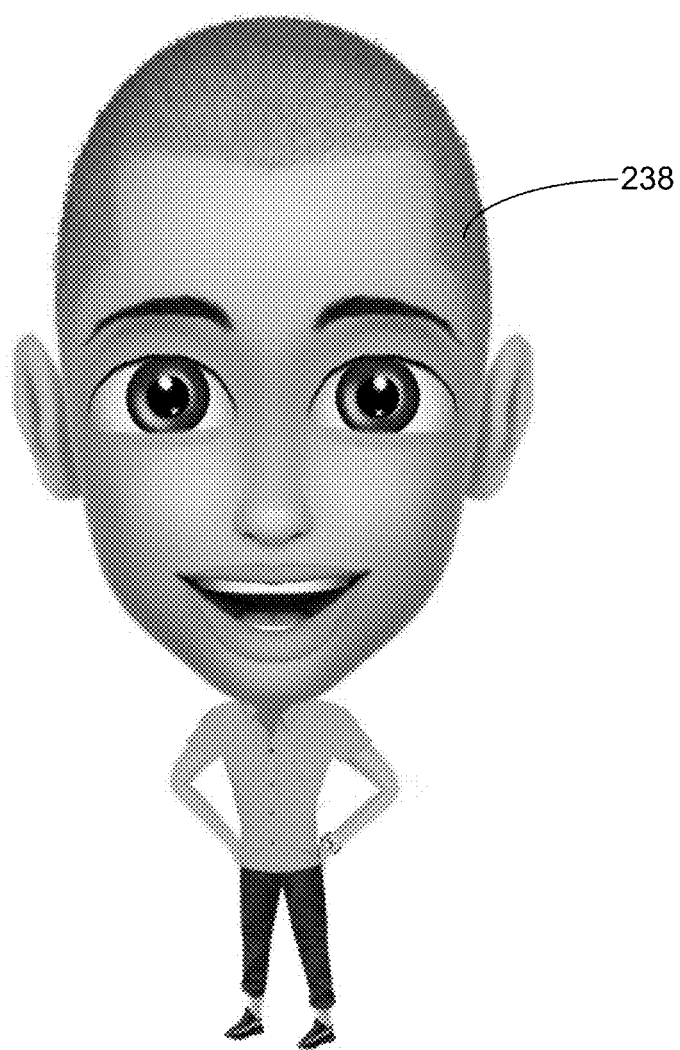
FIG. 5 illustrates a customized genie (avatar) in accordance with an embodiment of the present disclosure.

FIG. 5 illustrates a customized genie (avatar) 238 of a first user after the user has customized the avatar in accordance with the methods described above in conjunction with FIG. 6. As used herein, the terms "genie" and avatar are used interchangeably.

Figure 7:
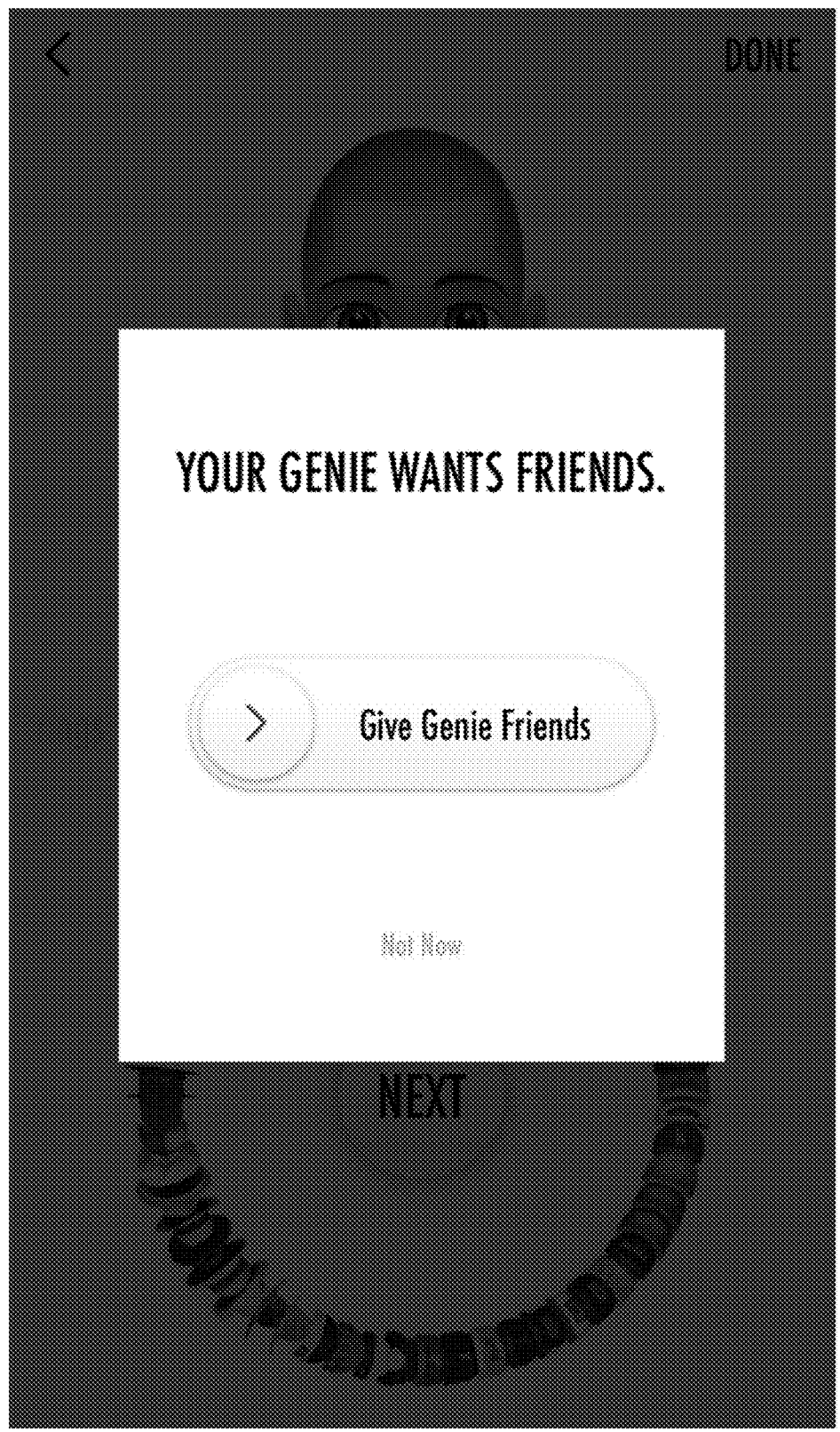
FIG. 7 illustrates a message that is displayed to the user to facilitate obtaining friends of the user in accordance with an embodiment of the present disclosure.

FIG. 7 illustrates a message that is displayed to the user to facilitate obtaining friends of the user in accordance with an embodiment of the present disclosure.

FIG. 22 illustrates a message that is provided to a user prior to associating a value of a trait with an avatar, where the value of the trait is associated with a corresponding position of a corresponding first closed form composer graphic, and where the corresponding position was selected by the user in accordance with an embodiment of the present disclosure.

Figure 39:
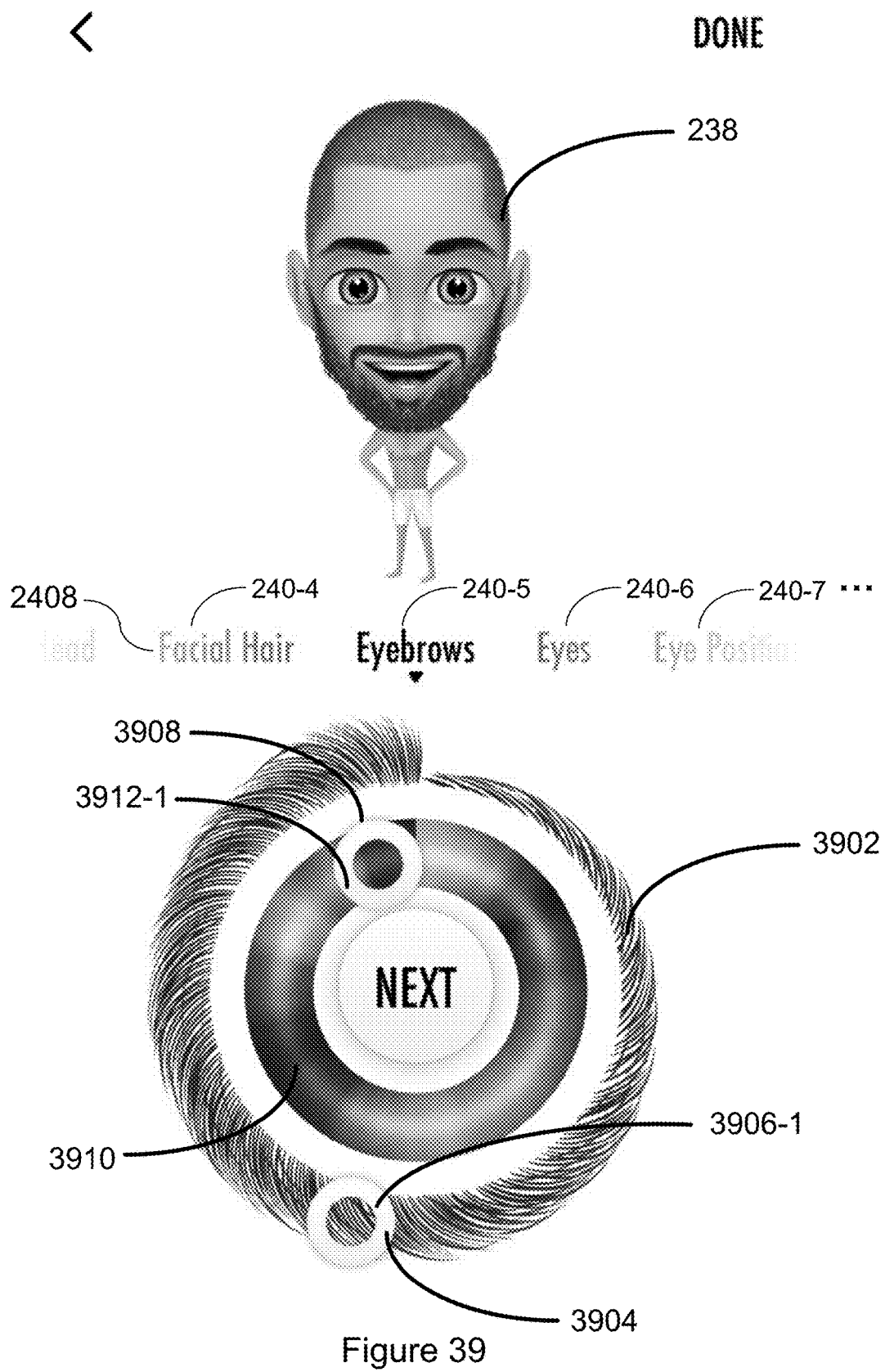
FIG. 39 illustrates concurrently displaying a first avatar, associated with a first user, a first closed form composer graphic, and a second closed form composer graphic on a display, where each different position on the first closed form composer graphic provides a different value for the trait eyebrow length, and each different portion of the second closed form composer graphic provides a different value for the trait eyebrow color, and where the user has selected a first position on the first closed form composer graphic and thus a first eyebrow length for the avatar, and where the user has selected a first position on the second closed form composer graphic and thus a first eyebrow color for the avatar in accordance with an embodiment of the present disclosure.

FIG. 39 illustrates concurrently displaying a first avatar 238, associated with a first user, a first closed form composer graphic 3902, and a second closed form composer graphic 3910 on a display. Each different position on the first closed form composer graphic 3902 provides a different value for the trait eyebrow length. Each different position of the second closed form composer graphic 3910 provides a different value for the trait eyebrow color. The user has selected a first position 3906-1 on the first closed form composer graphic 3902 using drag handle 3904 and thus a first eyebrow length for the avatar. The user has selected a first position 3912-1 on the second closed form composer graphic 3910 using the drag handle 3908 and thus a first eyebrow color for the avatar in accordance with an embodiment of the present disclosure.

Figure 40:
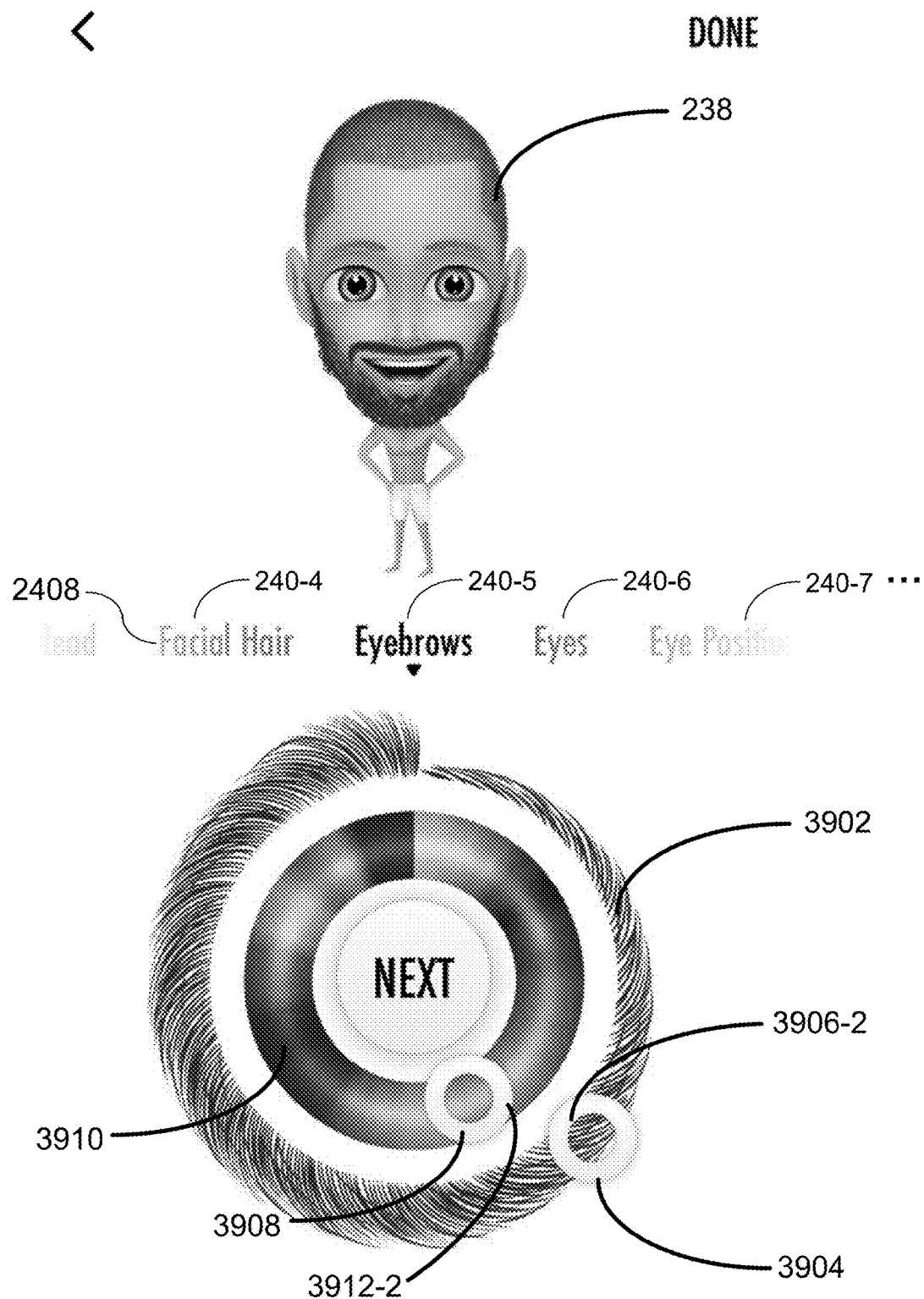
FIG. 40 illustrates concurrently displaying a first avatar, associated with a first user, a first closed form composer graphic, and a second closed form composer graphic on a display, where each different position on the first closed form composer graphic provides a different value for the trait eyebrow length, and each different portion of the second closed form composer graphic provides a different value for the trait eyebrow color, and where the user has selected a second position on the first closed form composer graphic and thus a second eyebrow length for the avatar, and where the user has selected a second position on the second closed form composer graphic and thus a second eyebrow color for the avatar in accordance with an embodiment of the present disclosure.

FIG. 40 illustrates concurrently displaying a first avatar 238, associated with a first user, a first closed form composer graphic 3902, and a second closed form composer graphic 3910 on a display. Each different position on the first closed form composer graphic 3902 provides a different value for the trait eyebrow length. Each different portion of the second closed form composer graphic 3910 provides a different value for the trait eyebrow color. The user has selected a second position 3906-2 on the first closed form composer graphic 3902 using drag handle 3904 and thus a second eyebrow length for the avatar. The user has selected a second position 3912-2 on the second closed form composer graphic 3910 using handle 3908 and thus a second eyebrow color for the avatar in accordance with an embodiment of the present disclosure.

Figure 41:
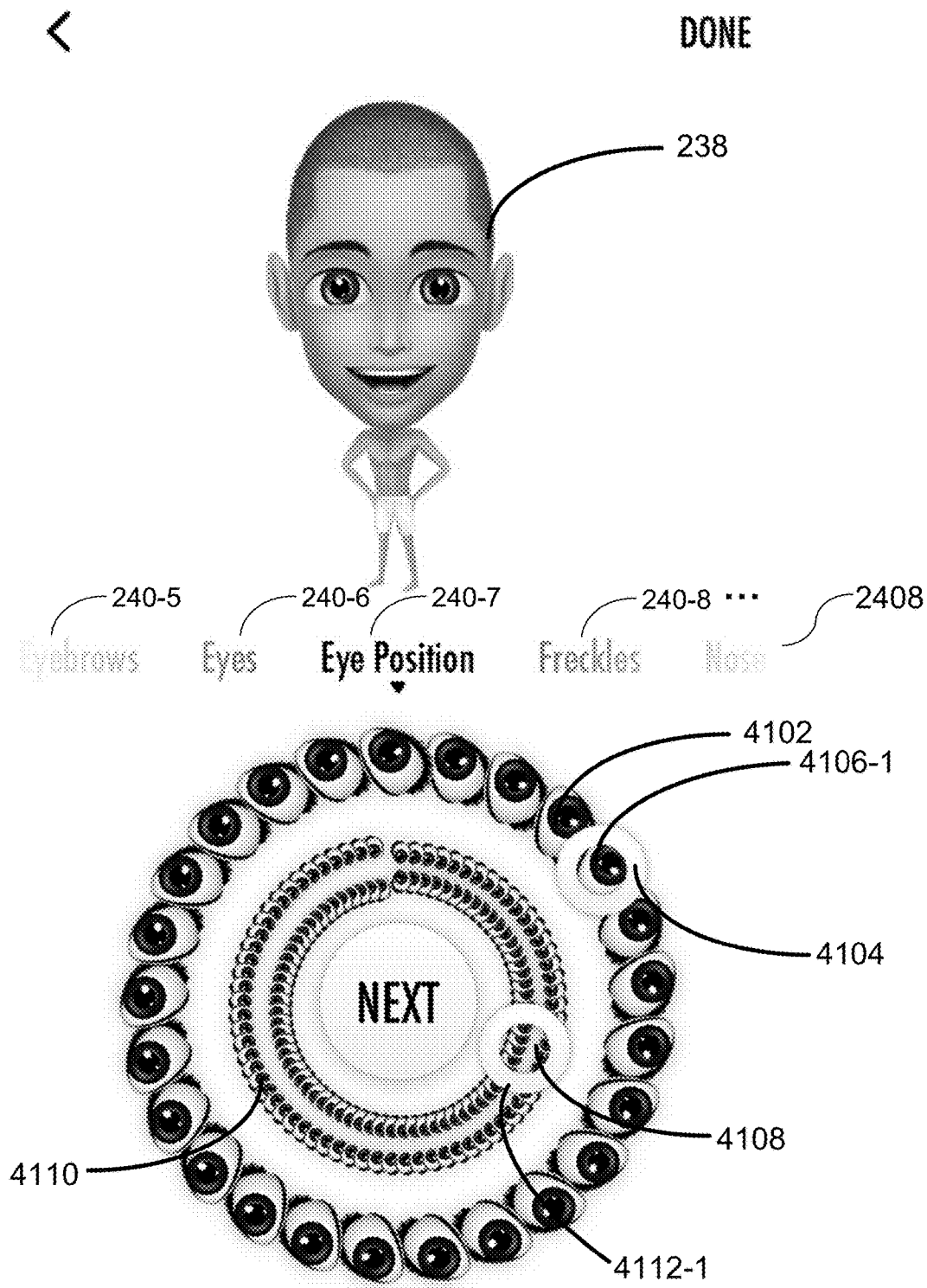
FIG. 41 illustrates concurrently displaying a first avatar, associated with a first user, a first closed form composer graphic, and a second closed form composer graphic on a display, where each different position on the first closed form composer graphic provides a different value for the trait rotation of the eyes, and each different portion of the second closed form composer graphic provides a different value for the trait distance between eyes, and where the user has selected a first position on the first closed form composer graphic and thus a first rotation of the eyes for the avatar, and where the user has selected a first position on the second closed form composer graphic and thus a first distance between eyes for the avatar in accordance with an embodiment of the present disclosure.
Figure 42:
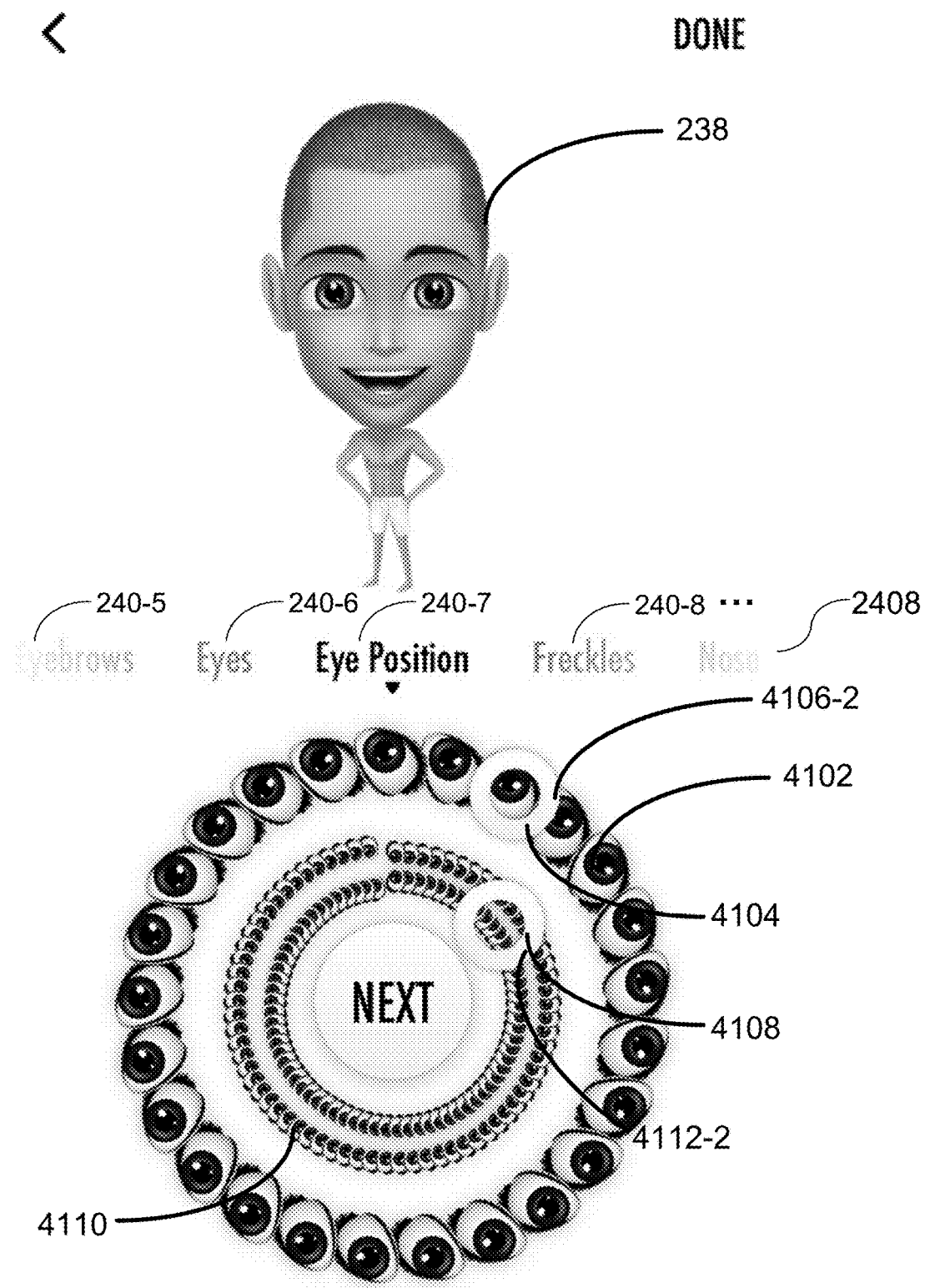
FIG. 42 illustrates concurrently displaying a first avatar, associated with a first user, a first closed form composer graphic, and a second closed form composer graphic on a display, where each different position on the first closed form composer graphic provides a different value for the trait rotation of the eyes, and each different portion of the second closed form composer graphic provides a different value for the trait distance between eyes, and where the user has selected a second position on the first closed form composer graphic and thus a second rotation of the eyes for the avatar, and where the user has selected a second position on the second closed form composer graphic and thus a second distance between eyes for the avatar in accordance with an embodiment of the present disclosure.
Figure 43:
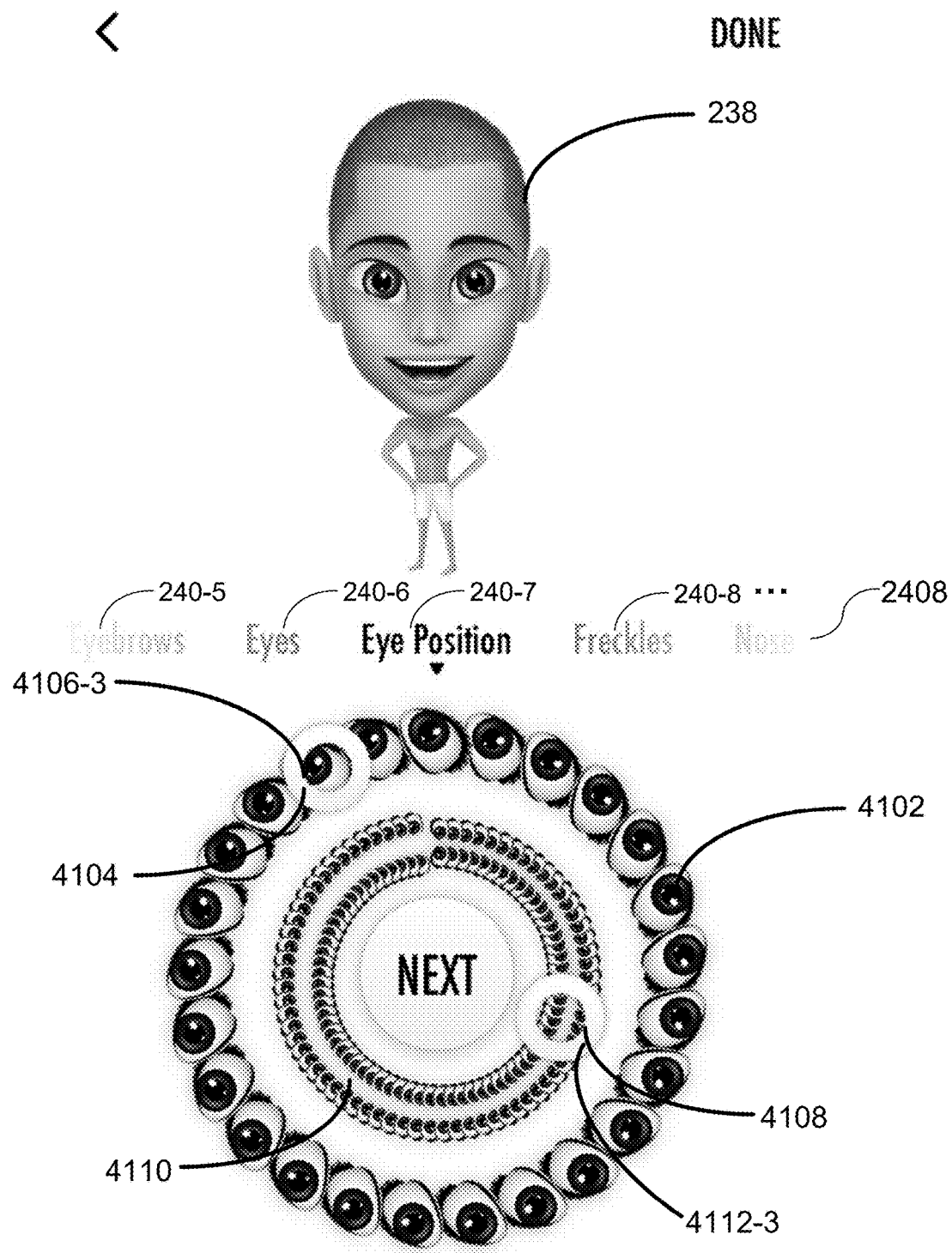
FIG. 43 illustrates concurrently displaying a first avatar, associated with a first user, a first closed form composer graphic, and a second closed form composer graphic on a display, where each different position on the first closed form composer graphic provides a different value for the trait rotation of the eyes, and each different portion of the second closed form composer graphic provides a different value for the trait distance between eyes, and where the user has selected a third position on the first closed form composer graphic and thus a third rotation of the eyes for the avatar, and where the user has selected a third position on the second closed form composer graphic and thus a third distance between eyes for the avatar in accordance with an embodiment of the present disclosure.

FIG. 41 illustrates concurrently displaying a first avatar, associated with a first user, a first closed form composer graphic 4102, and a second closed form composer graphic 4110 on a display. Each different position on the first closed form composer graphic 4102 provides a different value for the trait rotation of the eyes. Each different portion of the second closed form composer graphic 4110 provides a different value for the trait distance between eyes. The user has selected a first position 4106-1 on the first closed form composer graphic 4102 using drag handle 4104 and thus a first rotation of the eyes for the avatar. The user has selected a first position 4112-1 on the second closed form composer graphic 4110 using drag handle 4108 and thus a first distance between eyes for the avatar 238 in accordance with an embodiment of the present disclosure. FIG. 42 illustrates concurrently displaying a first avatar 238, associated with a first user, the first closed form composer graphic 4102, and the second closed form composer graphic 4110 on the display. The user has selected a second position 4106-2 on the first closed form composer graphic 4102 using drag handle 4104 and thus a second rotation of the eyes for the avatar. The user has selected a second position 4112-2 on the second closed form composer graphic 4110 using drag handle 4108 and thus a second distance between eyes for the avatar in accordance with an embodiment of the present disclosure. FIG. 43 illustrates concurrently displaying a first avatar 238, associated with a first user, the first closed form composer graphic 4102, and the second closed form composer graphic 4110 on a display. The user has selected a third position 4106-3 on the first closed form composer graphic 4102 using drag handle 4104 and thus a third rotation of the eyes for the avatar. The user has selected a third position 4112-3 on the second closed form composer graphic 4110 using drag handle 4108 and thus a third distance between eyes for the avatar in accordance with an embodiment of the present disclosure.

Figure 44:
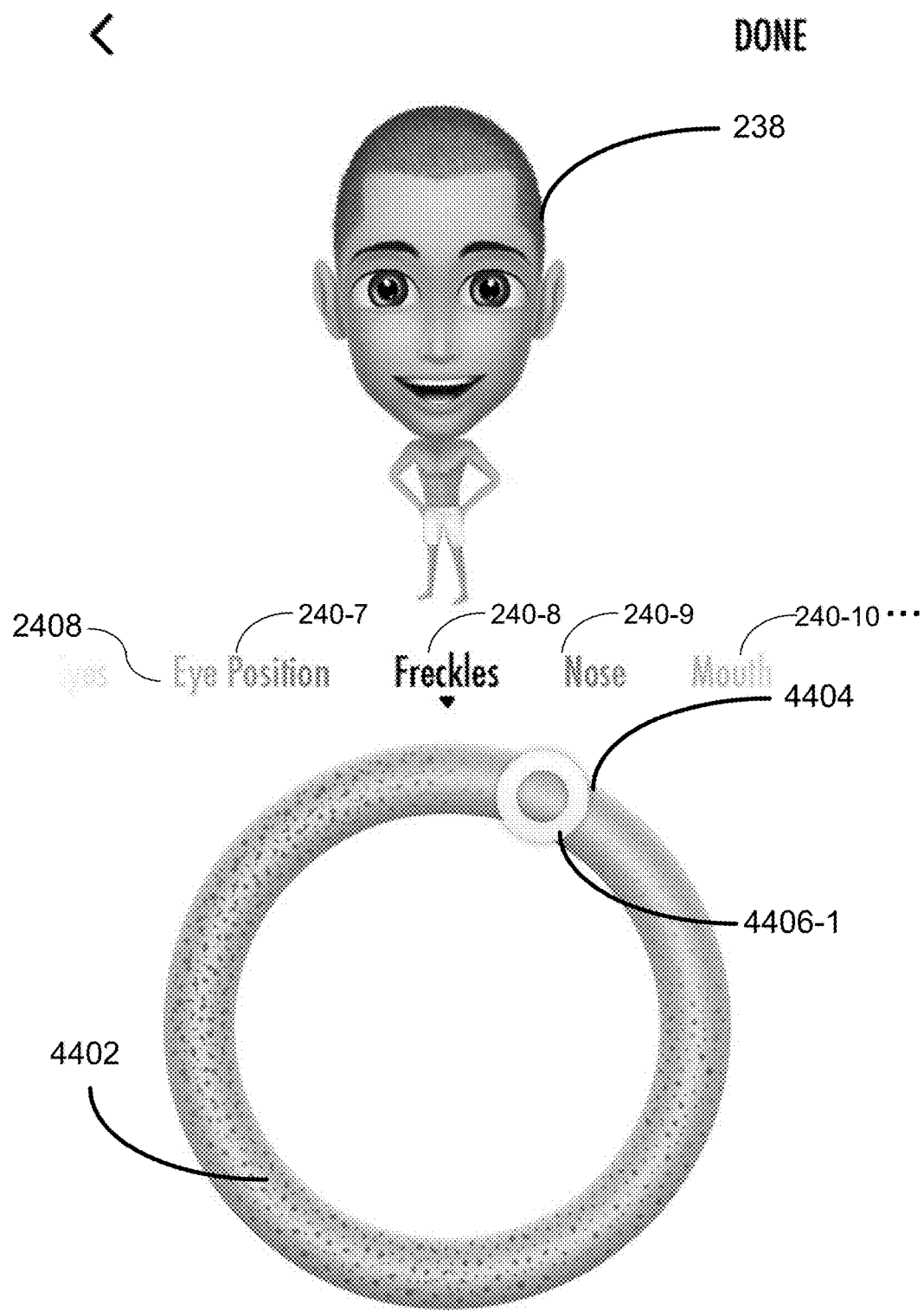
FIG. 44 illustrates concurrently displaying a first avatar, associated with a first user, and a first closed form composer graphic, on a display, where each different position on the first closed form composer graphic provides a different value for the trait an amount of freckles and where the user has selected a first position on the first closed form composer graphic and thus a first amount of freckles for the avatar in accordance with an embodiment of the present disclosure.

FIG. 44 illustrates concurrently displaying a first avatar 238, associated with a first user, and a first closed form composer graphic 4402 on a display. Each different position on the first closed form composer graphic 4402 provides a different value for the trait an amount of freckles. The user has selected a first position 4406-1 on the first closed form composer graphic 4402 using drag handle 4404 and thus a first amount of freckles for the avatar 238 in accordance with an embodiment of the present disclosure.

Figure 45:
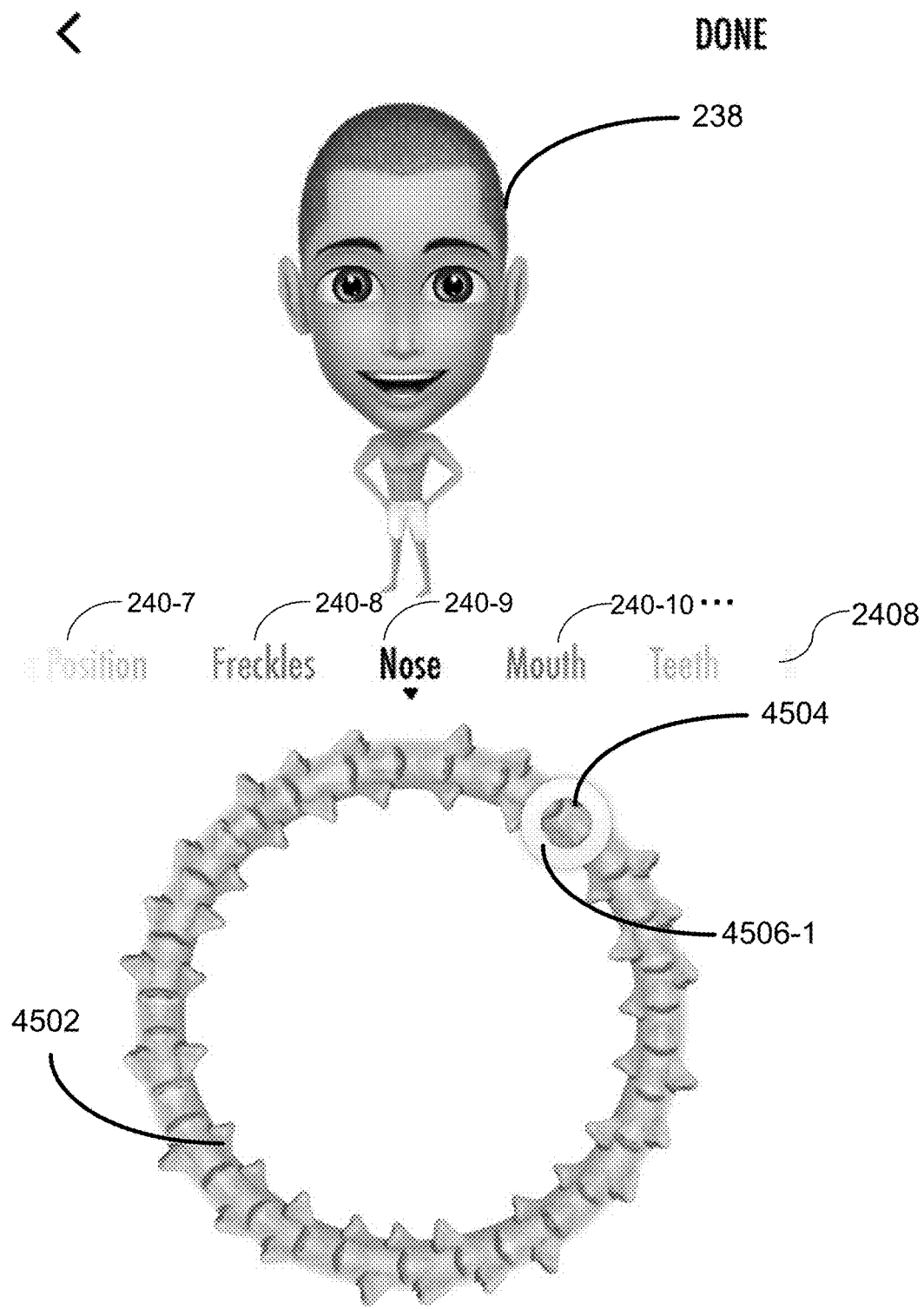
FIG. 45 illustrates concurrently displaying a first avatar, associated with a first user, and a first closed form composer graphic, on a display, where each different position on the first closed form composer graphic provides a different value for the trait a nose style and where the user has selected a first position on the first closed form composer graphic and thus a first nose style for the avatar in accordance with an embodiment of the present disclosure.
Figure 46:
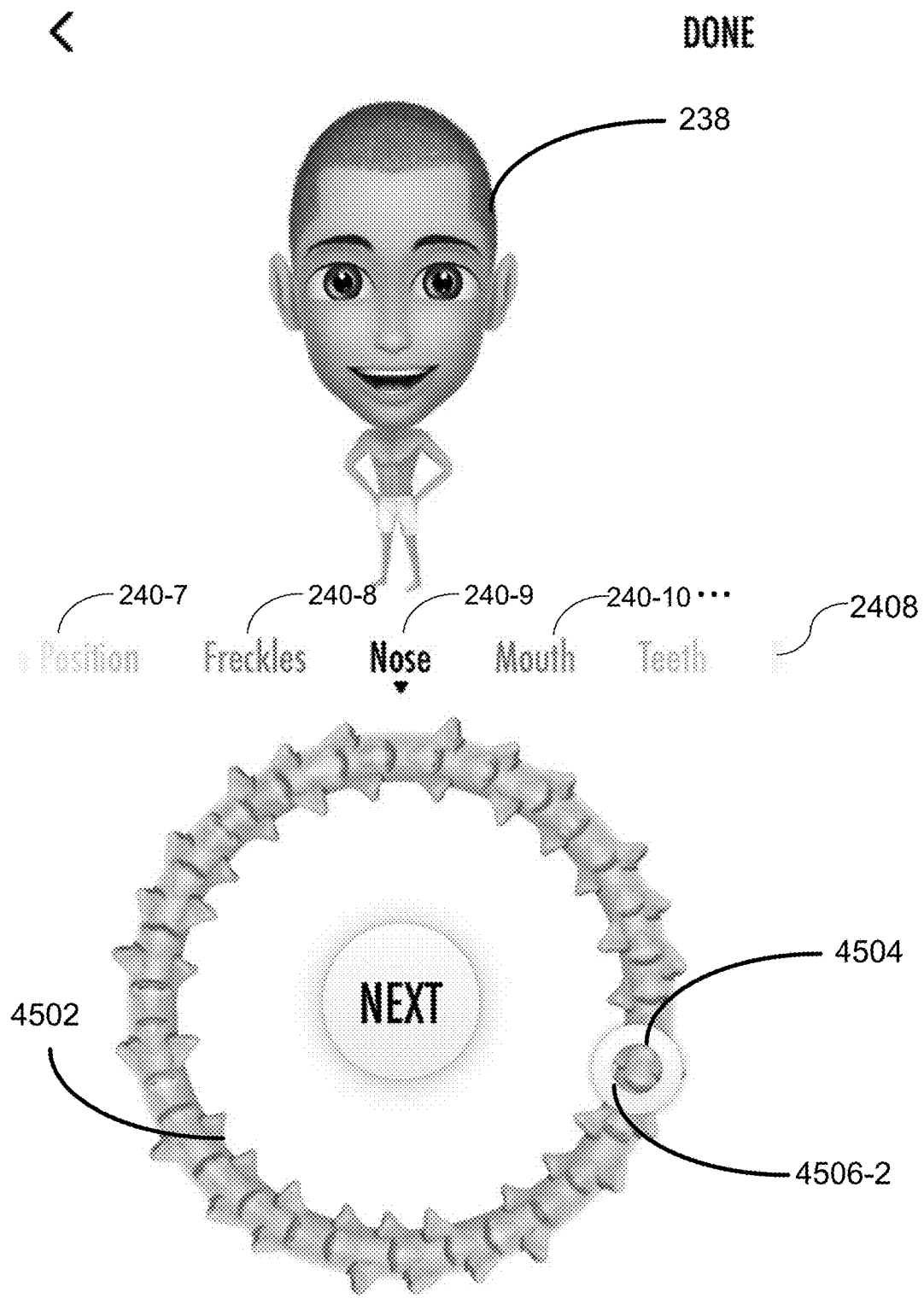
FIG. 46 illustrates concurrently displaying a first avatar, associated with a first user, and a first closed form composer graphic, on a display, where each different position on the first closed form composer graphic provides a different value for the trait a nose style and where the user has selected a second position on the first closed form composer graphic and thus a second nose style for the avatar in accordance with an embodiment of the present disclosure.

FIG. 45 illustrates concurrently displaying a first avatar 238, associated with a first user, and a first closed form composer graphic 4502 on a display. Each different position on the first closed form composer graphic 4502 provides a different value for the trait a nose style. The user has selected a first position 4506-1 on the first closed form composer graphic 4502 using drag handle 4504 and thus a first nose style for the avatar 238 in accordance with an embodiment of the present disclosure. FIG. 46 illustrates how the user has selected a second position 4506-2 on the first closed form composer graphic 4502 using drag handle 4504 and thus a second nose style for the avatar 238 in accordance with an embodiment of the present disclosure.

Figure 47:
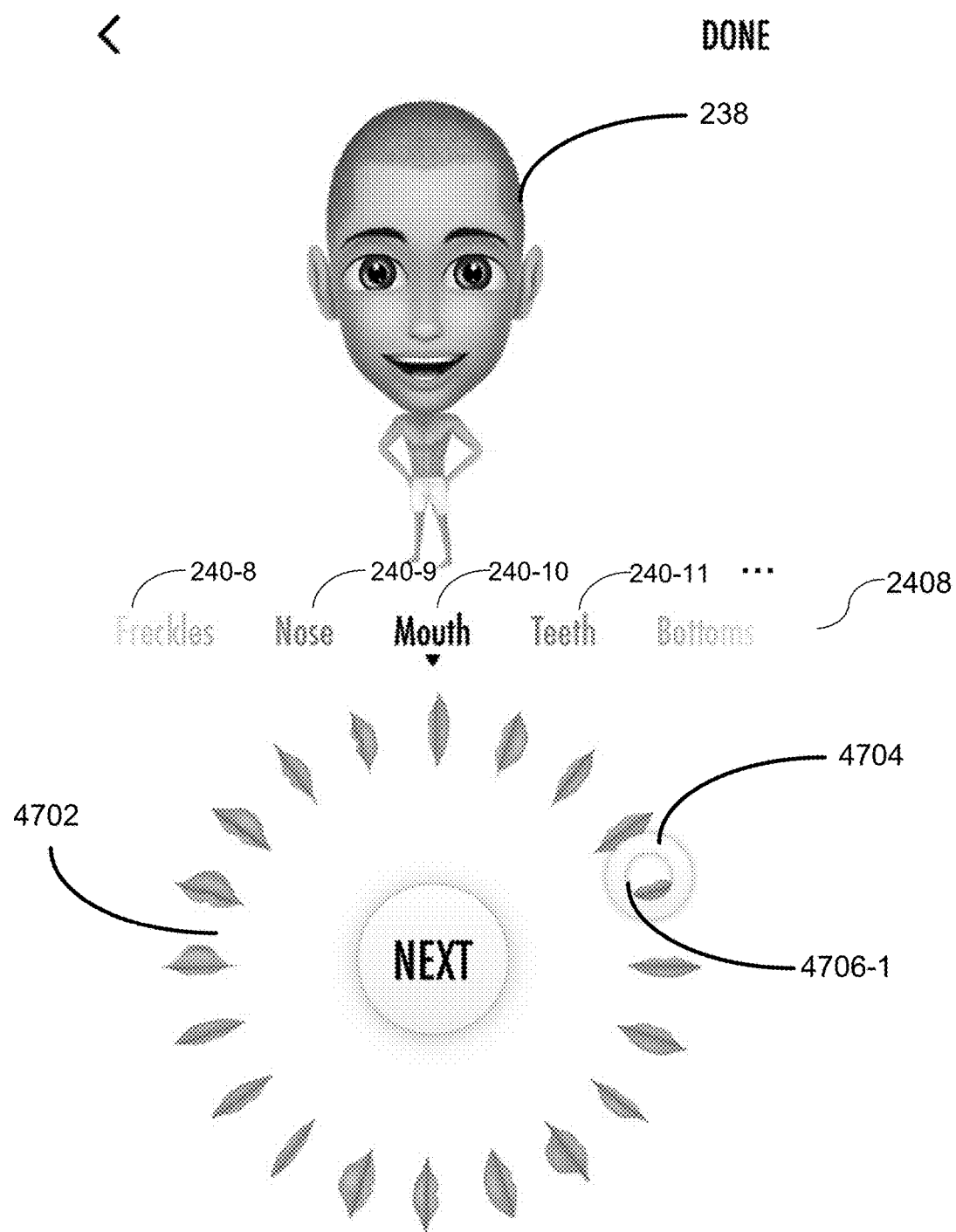
FIG. 47 illustrates concurrently displaying a first avatar, associated with a first user, and a first closed form composer graphic, on a display, where each different position on the first closed form composer graphic provides a different value for the trait a mouth size or a mouth shape or a lip style or a lip size and where the user has selected a first position on the first closed form composer graphic and thus a first mouth size, mouth shape, lip style, or lip size for the avatar in accordance with an embodiment of the present disclosure.
Figure 48:
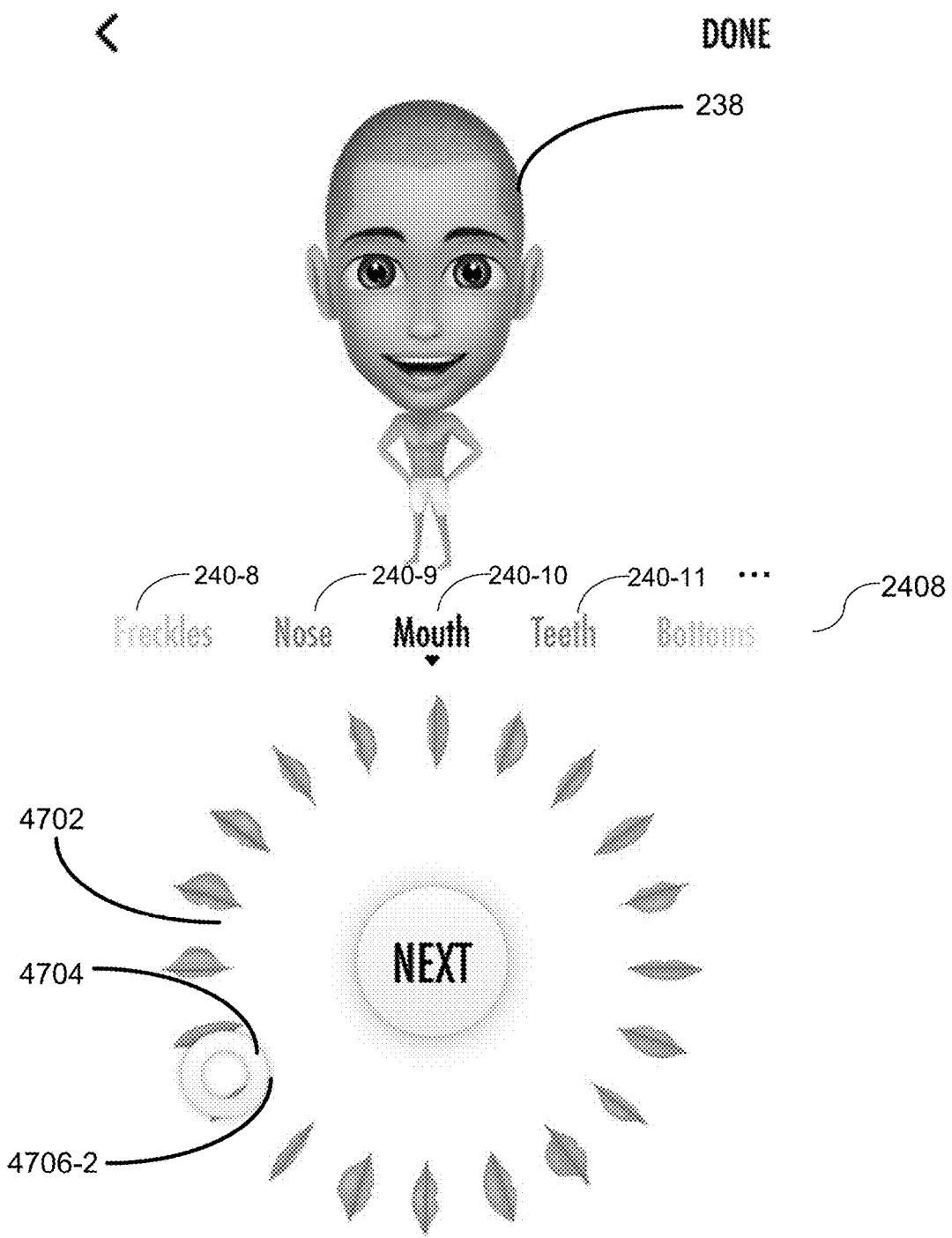
FIG. 48 illustrates concurrently displaying a first avatar, associated with a first user, and a first closed form composer graphic, on a display, where each different position on the first closed form composer graphic provides a different value for the trait a mouth size or a mouth shape or a lip style or a lip size and where the user has selected a second position on the first closed form composer graphic and thus a second mouth size, mouth shape, lip style, or lip size for the avatar in accordance with an embodiment of the present disclosure.

FIG. 47 illustrates concurrently displaying a first avatar 238, associated with a first user, and a first closed form composer graphic 4702 on a display. Each different position on the first closed form composer graphic 4702 provides a different value for the trait a mouth size or a mouth shape or a lip style or a lip size. The user has selected a first position 4706-1 on the first closed form composer graphic 4702 using handle 4704 and thus a first mouth size, mouth shape, lip style, or lip size for the avatar 238 in accordance with an embodiment of the present disclosure. FIG. 48 illustrates where the user has selected a second position 4706-2 on the first closed form composer graphic 4702 using handle 4704 and thus a second mouth size, mouth shape, lip style, or lip size for the avatar 238 in accordance with an embodiment of the present disclosure.

Figure 49:
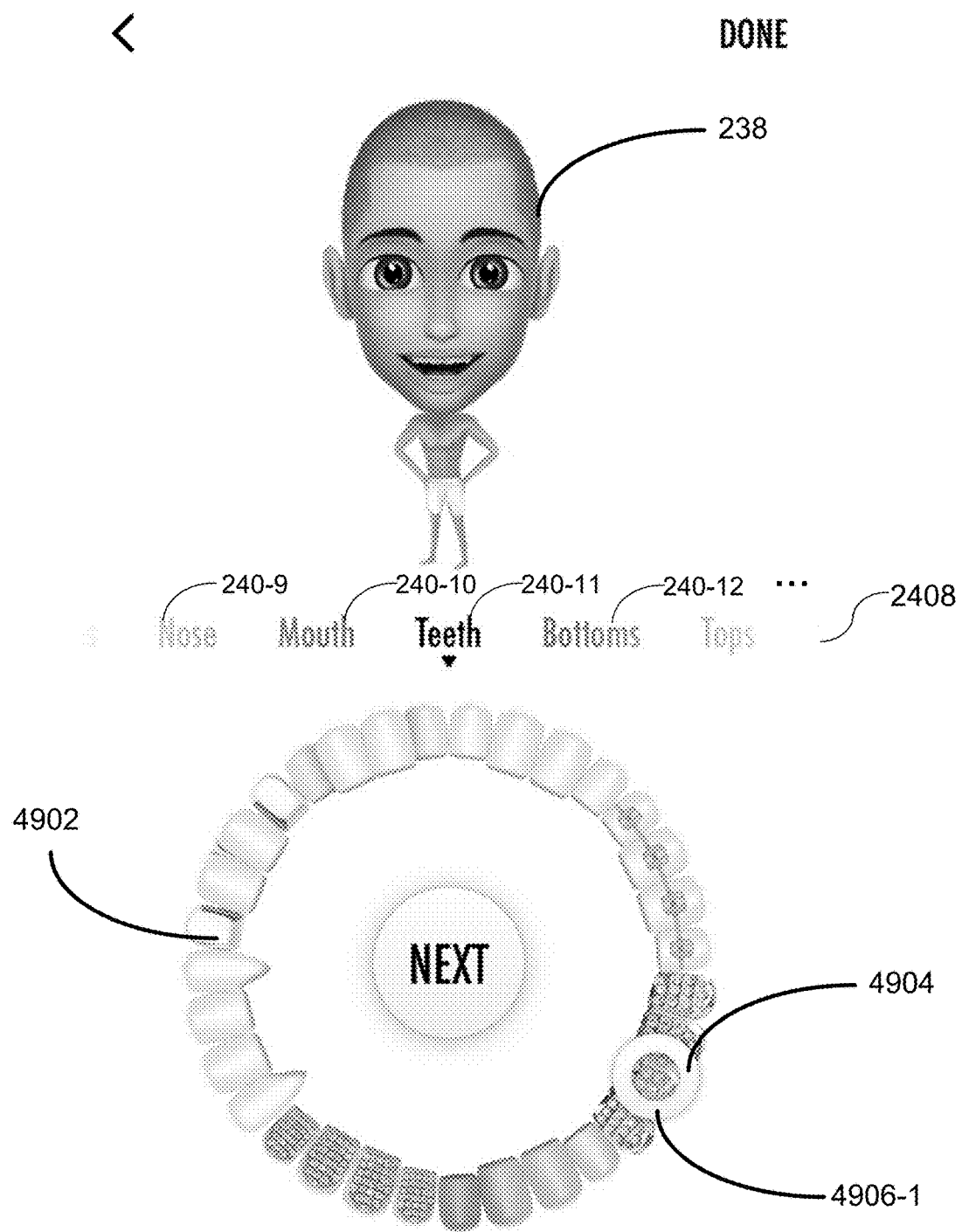
FIG. 49 illustrates concurrently displaying a first avatar, associated with a first user, and a first closed form composer graphic, on a display, where each different position on the first closed form composer graphic provides a different value for the trait a teeth style or a teeth color and where the user has selected a first position on the first closed form composer graphic and thus a first teeth style or teeth color for the avatar in accordance with an embodiment of the present disclosure.
Figure 50:
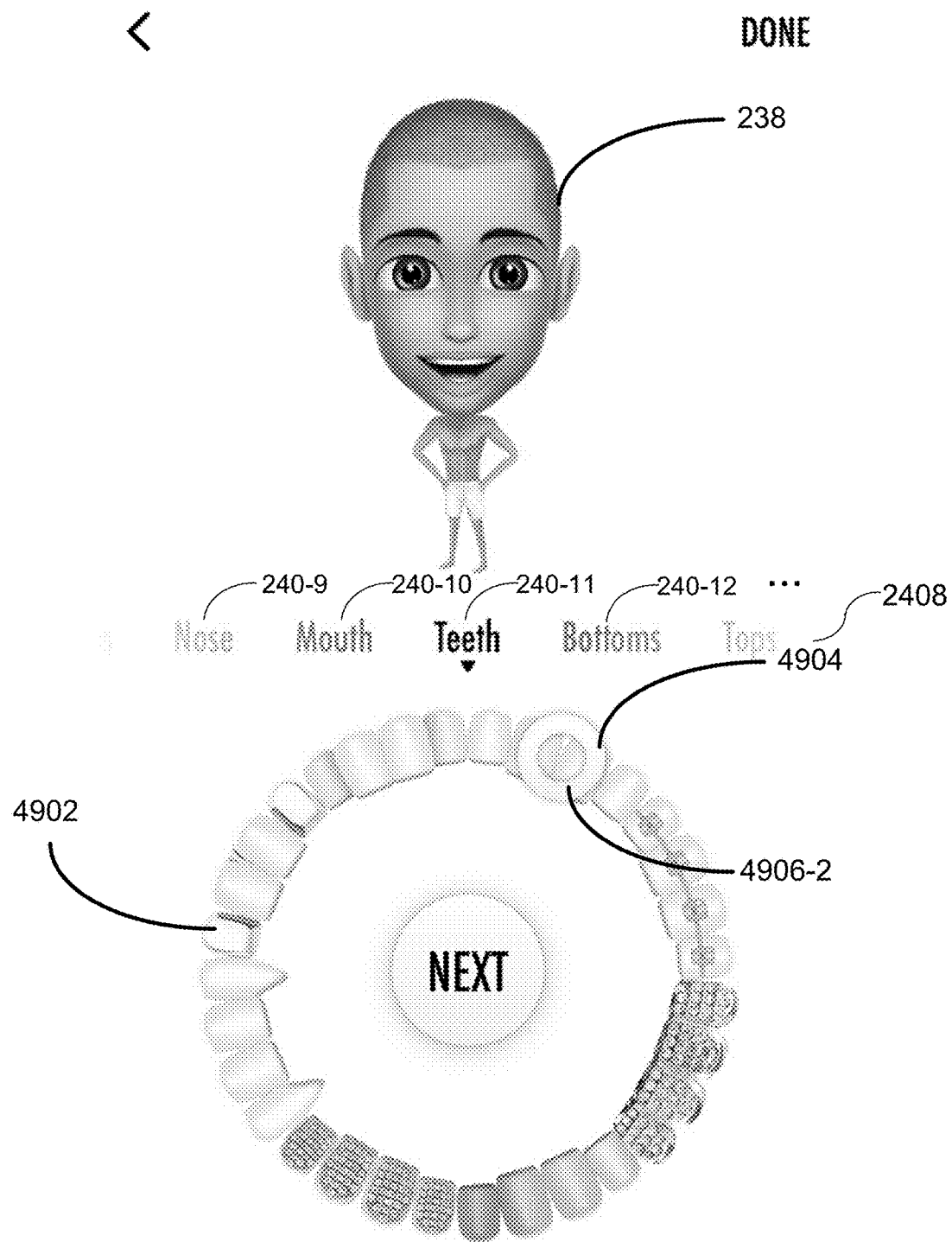
FIG. 50 illustrates concurrently displaying a first avatar, associated with a first user, and a first closed form composer graphic, on a display, where each different position on the first closed form composer graphic provides a different value for the trait a teeth style or a teeth color and where the user has selected a second position on the first closed form composer graphic and thus a second teeth style or teeth color for the avatar in accordance with an embodiment of the present disclosure.

FIG. 49 illustrates concurrently displaying a first avatar 238, associated with a first user, and a first closed form composer graphic 4902, on a display. Each different position on the first closed form composer graphic 4902 provides a different value for the trait a teeth style or a teeth color. The user has selected a first position 4906-1 on the first closed form composer graphic 4002 using drag handle 4904 and thus a first teeth style or teeth color for the avatar in accordance with an embodiment of the present disclosure. FIG. 50 illustrates where the user has selected a second position 4906-2 on the first closed form composer graphic 4902 using drag handle 4904 and thus a second teeth style or teeth color for the avatar 238 in accordance with an embodiment of the present disclosure.

Figure 54:
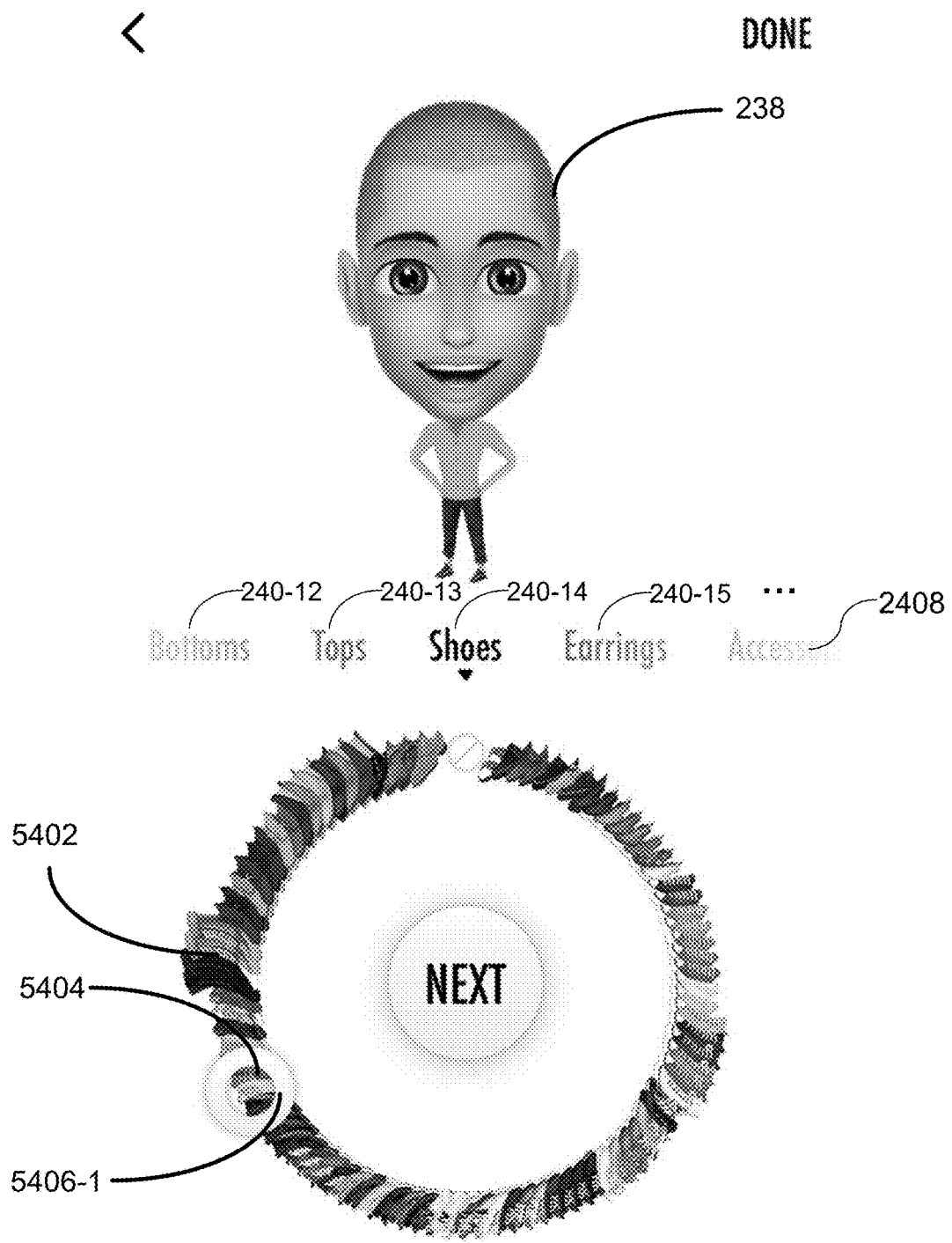
FIG. 54 illustrates concurrently displaying a first avatar, associated with a first user, and a first closed form composer graphic, on a display, where each different position on the first closed form composer graphic provides a different value for the trait shoes and where the user has selected a first position on the first closed form composer graphic and thus a pair of shoes worn by the avatar in accordance with an embodiment of the present disclosure.

FIG. 54 illustrates concurrently displaying a first avatar 238, associated with a first user, and a first closed form composer graphic 5402 on a display. Each different position on the first closed form composer graphic 5402 provides a different value for the trait shoes. The user has selected a first position 5406-1 on the first closed form composer graphic 5402 using drag handle 5404 and thus a pair of shoes corresponding to this position 5406-1 to be worn by the avatar 238 in accordance with an embodiment of the present disclosure.

Figure 55:
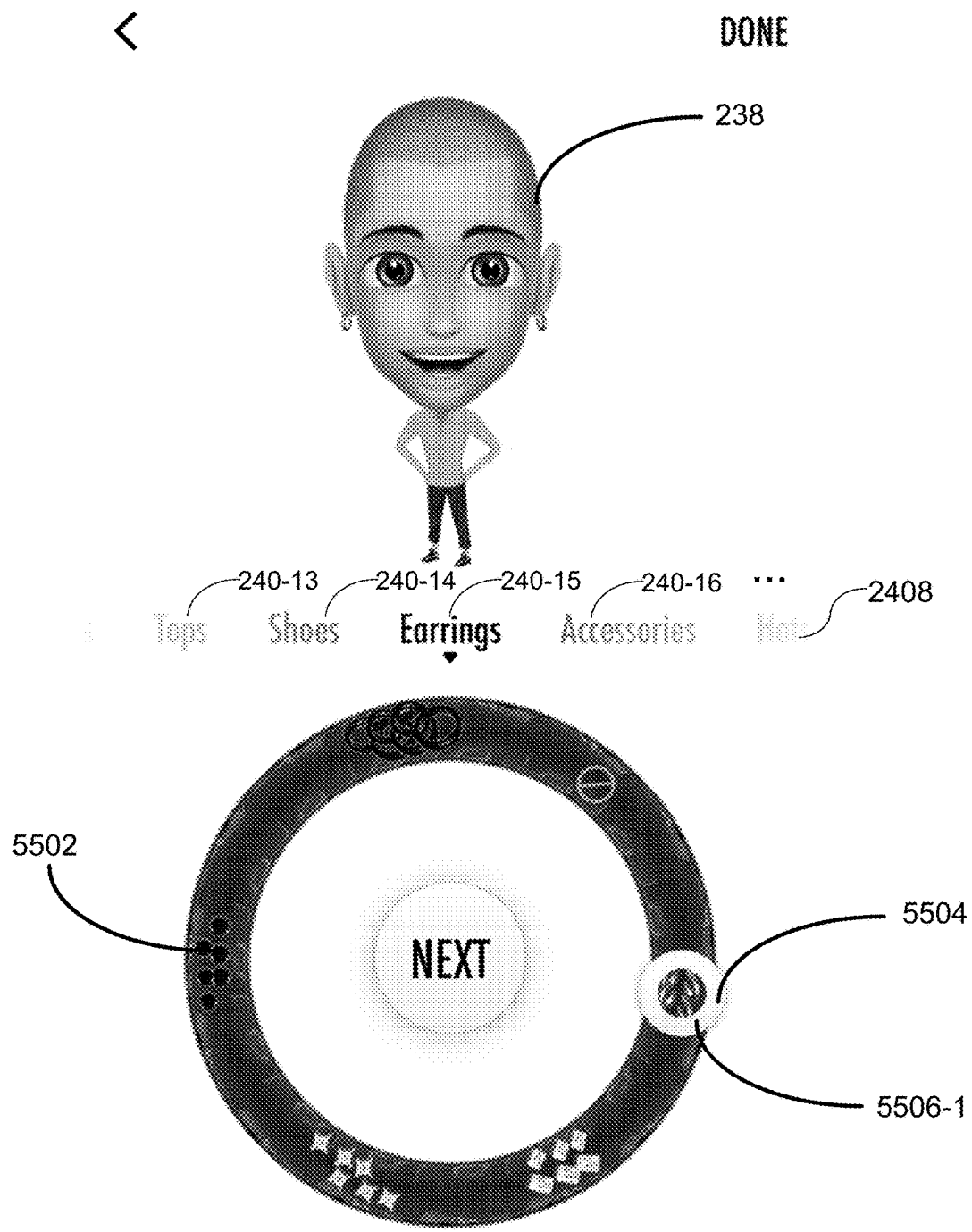
FIG. 55 illustrates concurrently displaying a first avatar, associated with a first user, and a first closed form composer graphic, on a display, where each different position on the first closed form composer graphic provides a different value for the trait earrings and where the user has selected a first position on the first closed form composer graphic and thus a first set of earrings worn by the avatar in accordance with an embodiment of the present disclosure.

FIG. 55 illustrates concurrently displaying a first avatar 238, associated with a first user, and a first closed form composer graphic 5502 on a display. Each different position on the first closed form composer graphic 5502 provides a different value for the trait earrings. The user has selected a first position 5506-1 on the first closed form composer graphic 5502 using drag handle 5504 and thus a first set of earrings corresponding to position 5506-1 to be worn by the avatar 238 in accordance with an embodiment of the present disclosure.

Figure 59:
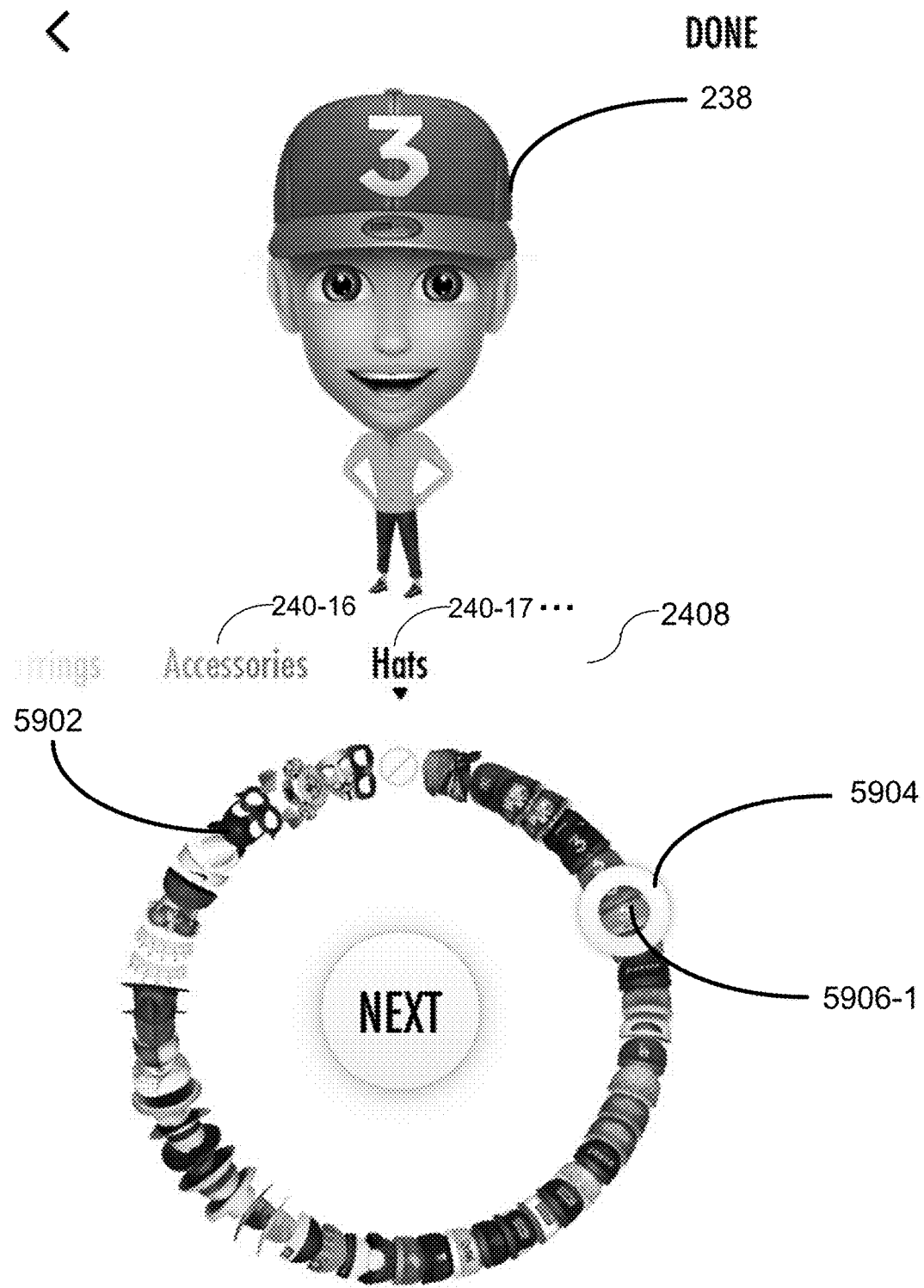
FIG. 59 illustrates concurrently displaying a first avatar, associated with a first user, and a first closed form composer graphic, on a display, where each different position on the first closed form composer graphic provides a different value for the trait hat and where the user has selected a first position on the first closed form composer graphic and thus a first hat worn by the avatar in accordance with an embodiment of the present disclosure.

FIG. 59 illustrates concurrently displaying a first avatar 238, associated with a first user, and a first closed form composer graphic 5902 on a display. Each different position on the first closed form composer graphic 5902 provides a different value for the trait hat. The user has selected a first position 5906-1 on the first closed form composer graphic 5092 using drag handle 5904 and thus a first hat corresponding to position 5906-1 to be worn by the avatar 238 in accordance with an embodiment of the present disclosure.

Figure 60:
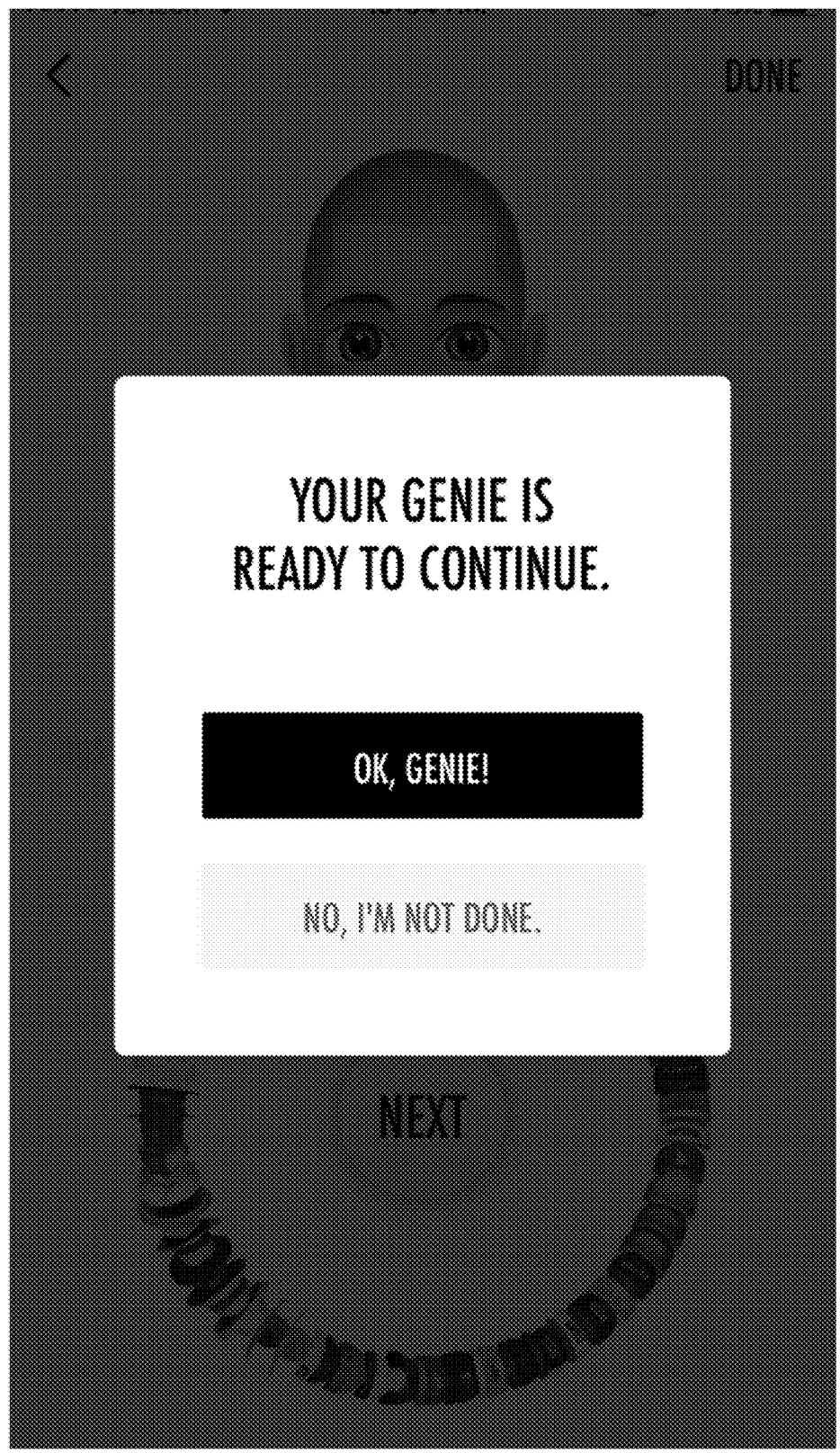
FIG. 60 illustrates a message that is displayed to the user after the user has customized their avatar in accordance with an embodiment of the present disclosure.

FIG. 60 illustrates a message that is displayed to the user after the user has customized their avatar in accordance with an embodiment of the present disclosure.

Figure 63:
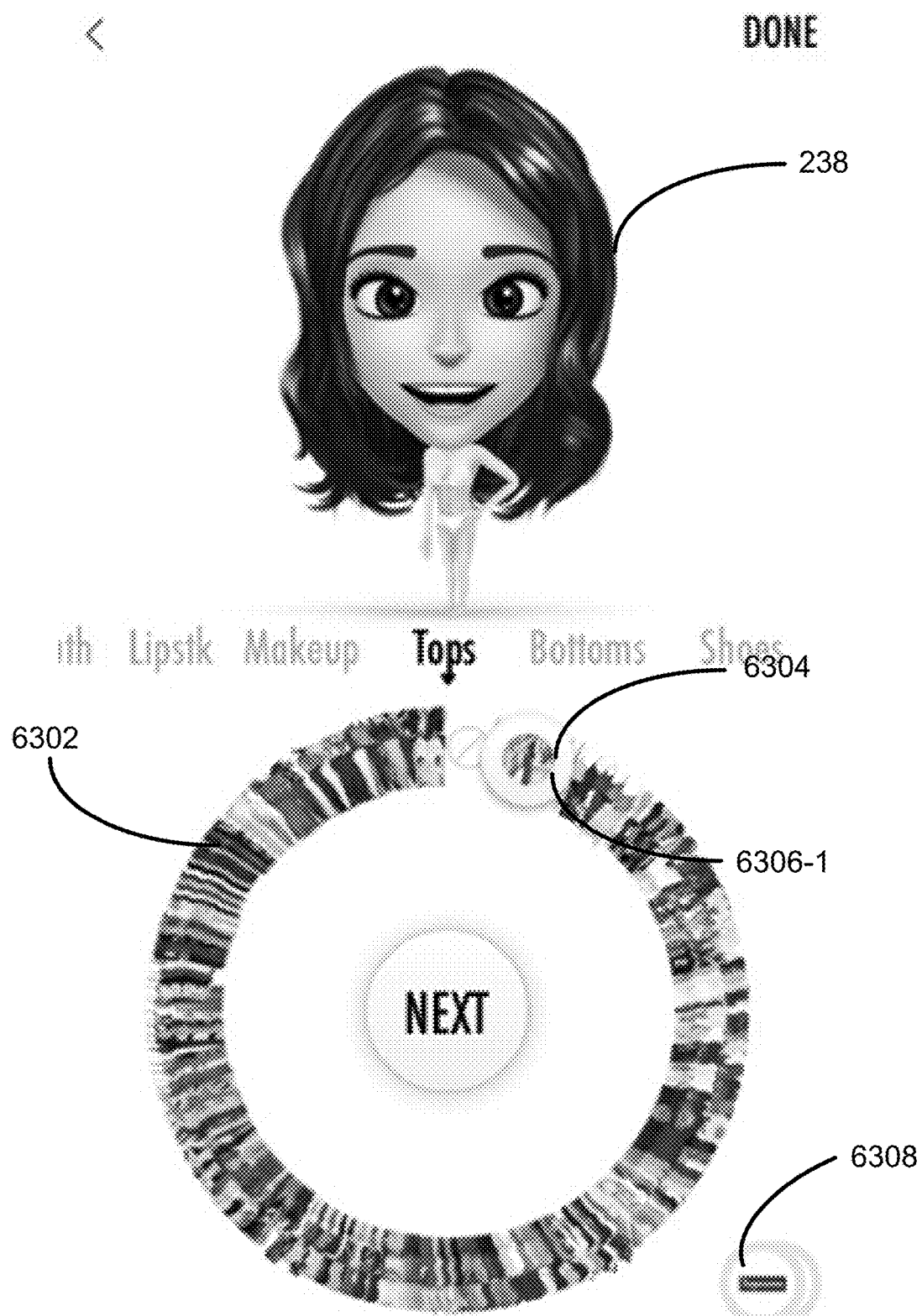
FIG. 63 illustrates concurrently displaying a first avatar, associated with a first user, and a first closed form composer graphic, on a display, where each different position on the first closed form composer graphic provides a different value for the trait of an upper garment and where the user has selected a first position on the first closed form composer graphic and thus a first upper garment for the avatar, and where the user can access a plurality of brand composer graphics which contain clothing items of a specific type (brand) in order to make more choices available to a user without adding too many options to a single composer graphic in accordance with an embodiment of the present disclosure.
Figure 64:
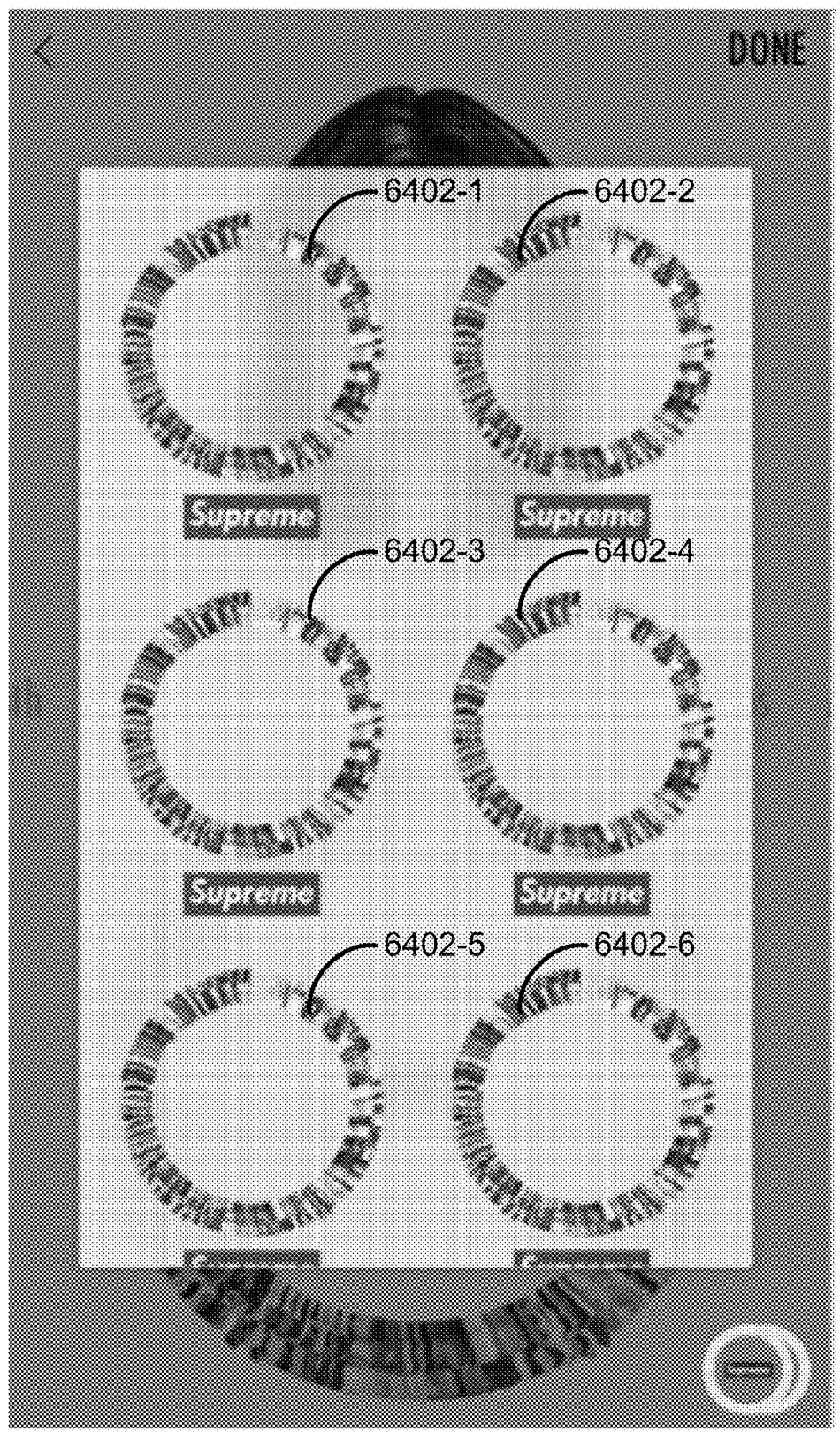
FIG. 64 illustrates a plurality of brand composer graphics which contain clothing items of a specific type (brand) in order to make more choices available to a user without adding too many options to a single composer graphic in accordance with an embodiment of the present disclosure.

FIG. 63 illustrates concurrently displaying a first avatar 238, associated with a first user, and a first closed form composer graphic 6302 on a display. Each different position on the first closed form composer graphic 6302 provides a different value for the trait of an upper garment. The user has selected a first position 6306-1 on the first closed form composer graphic 6302 using drag handle 6304 and thus a first upper garment for the avatar. Moreover, through affordance 6308 the user can access a plurality of brand composer graphics which contain clothing items of a specific type (brand) in order to make more choices available to a user without adding too many options to a single composer graphic in accordance with an embodiment of the present disclosure. FIG. 64 illustrates a plurality of such brand composer graphics 6402 which each contain clothing items of a specific type (brand) in order to make more choices available to a user without adding too many options to a single composer graphic in accordance with an embodiment of the present disclosure. Upon selection of a particular composer graphic 6402 (e.g., 6402-2), process control turns to FIG. 65 where the selected composer graphic 6402 is displayed. FIG. 65 illustrates concurrently displaying the first avatar, associated with the first user, and the closed form composer graphic selected in FIG. 64 (e.g., 6402-2) on a display. Each different position on the closed form composer graphic 6402-2 provides a different value for the trait of an upper garment of a particular brand. The user has selected a first position 6506-1 on the closed form composer graphic 6402-1 using drag handle 6504 and thus a first upper garment corresponding to the first position 6506-1 for the avatar. The closed form graphic 6402-2 is a first brand composer graphic in a plurality of brand composer graphics (e.g., as illustrated in FIG. 64) which contain clothing items of a specific type (brand), where the user has selected the first brand composer graphic as discussed above in conjunction with FIG. 64.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

in accordance with an application on a first electronic device associated with a first user, the first electronic device comprising one or more processors, memory, and a display:

concurrently displaying a first avatar, associated with the first user, and a first closed form composer graphic on the display, wherein each different position on the first closed form composer graphic provides a different value for a first trait associated with the first closed form composer graphic, and wherein the method comprises executing a first procedure comprising:

(i) displaying on the first avatar the first trait set at a value associated with a respective position on the first closed form composer graphic selected by the first user without user intervention responsive to the user selection of the respective position on the first closed form composer graphic, and (ii) associating the value of the first trait with the first avatar that is associated with the position of the first closed form composer graphic that was selected by the first user, wherein the associating displays on the first avatar the first trait set at the selected value of the first trait.

2. The method of claim 1, wherein the displaying (i) is repeated for each position of the first closed form composer graphic contacted by the first user until a first break in user contact with the first closed form composer graphic is detected, and the position of the first closed form composer graphic that is selected by the first user is the position of the first closed form composer graphic that was last contacted by the first user when the first break was detected.

3. The method of claim 1, the method further comprising:

concurrently displaying the first avatar and a second closed form composer graphic on the display after the first trait is selected, wherein each different position of the second closed form composer graphic provides a different value for a second trait associated with the second closed form composer graphic, and wherein the method further comprises executing a second procedure comprising:

(i) displaying on the first avatar the second trait set at a value associated with a respective position of the second closed form composer graphic selected by the first user without user intervention responsive to the user selection of the respective position of the second closed form composer graphic, and (ii) associating the value of the first trait with the first avatar that is associated with the position of the second closed form composer graphic that was selected by the first user, wherein the associating displays on the first avatar the second trait set at the selected value of the second trait.

4. The method of claim 3, wherein the displaying (i) is repeated for each position of the second closed form composer graphic contacted by the first user until a break in user contact with the second closed form composer graphic is detected, and the position of the second closed form component that is selected by the first user is the position of the second closed form composer graphic that was last contacted by the first user when the break with the second closed form composer graphic was detected.

5. The method of claim 1, wherein the first trait is one of skin color, hair style, hair color, head shape, ear size, facial hair length, facial hair color, eyebrow length, eyebrow color, eye pupil color, eye pupil size, eye size, rotation of the eyes, distance between eyes, an amount of freckles, a nose style, a nose size, a mouth size, a mouth shape, a lip style, a lip size, a lip color, a height of the mouth on the face, a teeth style, a teeth size, a teeth color, a lower garment, an upper garment, a shoe style, a shoe color, earrings, an accessory worn by the first avatar, or a hat worn by the first avatar.

6. The method of claim 5, wherein the first trait is an accessory worn by the first avatar, and wherein the accessory is a pair of eye glasses, a watch, a pair of earphones, a pair of earmuffs, a scarf, a necklace, a mask, or a bracelet.

7. The method of claim 5, wherein the first trait is a lower garment and wherein the lower garment is a pair of shorts, a pair of long pants, or a skirt.

8. The method of claim 5, wherein the first trait is an upper garment and wherein the upper garment is a shirt, a vest, or a jacket.

9. The method of claim 1, wherein the first trait is one of height of the eyes on the face, amount of face wrinkles, an amount of cheek indents/dimples, an amount of face pimples, stomach thickness, overall body height, an arm length, a leg length, a foot size, a height of the nose on the face, an absence or presence of a facial blush, an absence or presence of an eyeshadow, or an eye shadow color.

10. The method of claim 1, the method further comprising:

receiving a specification of a gender of the first avatar; and including a gender layer on the first avatar from the set of male gender and female gender responsive to the specification of gender from the first user.

11. The method of claim 1, the method further comprising:

receiving a selection of one or more topical categories from an enumerated plurality of topical categories; and associating the one or more topical categories with the first avatar.

12. The method of claim 1, the method further comprising:

receiving a first electronic communication within the application, wherein the first electronic communication is associated with a sticker comprising an animated or static version of the first avatar responding to an event associated with the first electronic communication; and providing the sticker to one or more other users using the application.

13. The method of claim 12, wherein the sticker comprises an animated version of the first avatar responding to an event, and wherein the animated version of the first avatar comprises:

one or more visible layers that are present in a version of the first avatar that is stored in a user profile associated with the first user, and one or more visible layers that are not present in the version of the first avatar that is stored in the user profile associated with the first user.

14. The method of claim 12, the method further comprising, prior to providing the sticker to one or more other users:

concurrently displaying the first avatar and an emotion slide bar on the display, wherein first user selection of each different portion of the emotion slide bar displays a different emotion on the first avatar from a discrete set of emotions, and responsive to receiving a user swipe of the emotion slide bar, the different emotion displayed on the version of the first avatar in the sticker is changed to the emotion associated with the different portion of the emotion slide bar in which the user swipe ended.

15. The method of claim 14, wherein
the first avatar includes a pair of eyes, a pair of eyelids, a set of lips, and a pair of eyebrows, and
each respective emotion in the discrete set of emotions specifies at least a first characteristic position for the set of lips of the first avatar and a second characteristic position for the pair of eyebrows of the first avatar.

16. The method of claim 12, wherein
the sticker comprises an animated version of the first avatar responding to the event,
the first avatar includes a pair of eyes, a pair of eyelids, a set of lips, and a pair of eyebrows, and
the first avatar is animated within the sticker by relative movement of the pair of eyes, the pair of eyelids, the set of lips and the pair of eyebrows through a repeating pattern of expressions over time.

17. The method of claim 12, wherein
the sticker comprises an animated version of the first avatar responding to the event,
the first avatar is animated within the sticker by any combination of: varying an amount of facial bone deformation, varying a pupil size, varying an eyelid position, varying an eye size, varying a pupil position, varying a mouth position, varying a nose position, varying an ear position, varying a mouth size, or varying a face perspective in the first avatar over time.

18. The method of claim 12, wherein
the sticker comprises an animated version of the first avatar responding to the event, and
the first avatar is animated within the sticker by any combination of: varying a position of the avatar in the sticker over time, varying a scale of the first avatar in the sticker over time, or moving a body part of the first avatar in the sticker over time.

19. The method of claim 12, wherein
the sticker comprises an animated version of the first avatar responding to the event, and
the first avatar is animated within the sticker by at least moving one or more body parts of the first avatar in the sticker over time, wherein the one or more body parts is selected from the group consisting of the arms, the feet, the legs, the hands, the neck, or the head of the first avatar.

20. The method of claim 12, the method further comprising:
providing, at a time after receiving the first electronic communication, a first affordance, wherein selection of the first affordance by the first user activates a first tool for selection from a plurality of avatars other than the first avatar, wherein each avatar in the plurality of avatars is associated with (i) a different user in a contact list of the first user within the application or (ii) a famous person; and
responsive to receiving a selection of one or more second avatars from the plurality of avatars, including the one or more second avatars in the sticker.

21. The method of claim 20, the method further comprising:
providing, at a time after receiving the first electronic communication, a second affordance, wherein selection of the second affordance by the first user displays a second tool for annotating the sticker with a user provided expression encapsulated in a bubble.

22. The method of claim 12, wherein the method further comprises:
providing, at a time after receiving the first electronic communication, a first affordance and a second affordance, wherein
selection of the first affordance by the first user displays a first tool for selection from a plurality of avatars other than the first avatar, wherein each avatar in the plurality of avatars is associated with a different user in a contact list of the first user within the application or an enumerated list of avatars provided by the application, wherein each avatar in the enumerated list of avatars represents a different public figure, and responsive to receiving a selection of one or more second avatars from the plurality of avatars, including the one or more second avatars from the plurality of avatars in the sticker; and
selection of the second affordance by the first user activates a second tool for annotating the sticker with a first user provided expression encapsulated in a bubble.

23. The method of claim 12, wherein the method further comprises:
providing, at a time after receiving the first electronic communication, a first affordance, wherein
selection of the first affordance by the first user activates a first tool for selection from a plurality of second avatars other than the first avatar, wherein each second avatar in the plurality of second avatars is associated with a different user in a contact list of the first user within the application or an enumerated list of avatars provided by the application wherein each avatar in the enumerated list of avatars represents a different public figure, and responsive to receiving a selection of one or more second avatars from the plurality of second avatars by the first user, including the one or more second avatars from the plurality of second avatars into the sticker; and
concurrently displaying the first avatar, the one or more selected second avatars, and an emotion slide bar on the display, wherein
first user selection of each different portion of the emotion slide bar provides a different emotion on the first avatar in the sticker and the one or more selected second avatars from a discrete set of emotions, and
responsive to receiving a user swipe of the emotion slide bar, the emotion displayed on the first avatar and the one or more selected second avatars in the sticker is changed to the emotion associated with the different portion of the emotion slide bar in which the user swipe ended.

24. The method of claim 12, wherein the first electronic communication is a news article, blog posting, E-mail, or social media posting received from a remote source.

25. The method of claim 12, wherein the method further comprises:
providing, at a time after receiving the first electronic communication, a first affordance, wherein selection of the first affordance by the first user activates a first tool for modifying the sticker, wherein the modifying the sticker comprises:
adding a quote bubble, provided by the first user, to the sticker using the first affordance,
adding the avatar of one or more friends of the first user, and designated by the first user through the first affordance, to the sticker,
changing the expression on each avatar in the sticker using the first affordance, adding or removing a prop or background scene to the sticker using the first affordance, changing an article of clothing worn by an avatar in the sticker using the first affordance, repositioning or rescaling a layer that includes props/backgrounds/clothing using the first affordance, changing the bone position of an avatar in the sticker using the first affordance, or changing a headline of the sticker using the first affordance.

26. The method of claim 12, wherein
the first closed form is elliptical shaped, and
the sticker is provided to the one or more other users without the first electronic communication.

27. The method of claim 12, wherein
the first closed form is elliptical shaped, and
the sticker is provided to the one or more other users with the first electronic communication.

28. A non-transitory computer readable storage medium storing an application having a first avatar representing a first user, the application comprising instructions for:
concurrently displaying a first avatar, associated with the first user, and a first closed form composer graphic on the display, wherein each different position on the first closed form composer graphic provides a different value for a first trait associated with the first composer graphic, and wherein the method comprises executing a first procedure comprising:
(i) displaying on the first avatar the first trait set at a value associated with a respective position of the first closed form composer graphic selected by the first user without user intervention responsive to the user selection of the respective position of the first closed form composer graphic, and
(ii) associating the value of the first trait with the first avatar that is associated with the position of the first closed form composer graphic that was selected by the first user, wherein the associating displays on the first avatar the first trait set at the selected value of the first trait.

29. A computer system for customizing a first avatar responsive to an event in an application having a first avatar representing a first user, the computer system comprising at least one processor, a display, and memory storing at least one program for execution by the at least one processor, the at least one program comprising instructions for:
concurrently displaying a first avatar, associated with the first user, and a first closed form composer graphic on the display, wherein each different position on the first closed form composer graphic provides a different value for a first trait associated with the first composer graphic, and wherein the method comprises executing a first procedure comprising:
(i) displaying on the first avatar the first trait set at a value associated with a respective position of the first closed form composer graphic selected by the first user without user intervention responsive to the user selection of the respective position of the first closed form composer graphic, and
(ii) associating the value of the first trait with the first avatar that is associated with the position of the first closed form composer graphic that was selected by the first user, wherein the associating displays on the first avatar the first trait set at the selected value of the first trait.

30. The method of claim 1, wherein the first avatar includes a pair of eyes, a nose, a set of lips, a pair of eyebrows, a pair of ears, and a body.

* * * * *